United States Patent
Andrews et al.

(10) Patent No.: US 11,618,055 B2
(45) Date of Patent: *Apr. 4, 2023

(54) METHODS FOR PROVIDING FLEXIBLE AND/OR ELASTIC COATINGS ON OILFIELD OPERATIONAL COMPONENTS

(71) Applicant: S+S INDUSTRIES TECHNOLOGY LLC, Wilmington, DE (US)

(72) Inventors: Greg Andrews, Wilmington, DE (US); George D. Andrews, Wilmington, DE (US); Jeff Capell, Wilmington, DE (US)

(73) Assignee: S+S INDUSTRIES TECHNOLOGY LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,370

(22) Filed: Nov. 1, 2022

(65) Prior Publication Data

US 2023/0069130 A1    Mar. 2, 2023

Related U.S. Application Data

(63) Continuation of application No. 17/225,743, filed on Apr. 8, 2021, now Pat. No. 11,559,826.

(Continued)

(51) Int. Cl.

| | |
|---|---|
| B05D 1/02 | (2006.01) |
| B05D 7/00 | (2006.01) |
| B05D 7/16 | (2006.01) |
| B05D 7/26 | (2006.01) |
| B05D 5/00 | (2006.01) |
| C09D 183/06 | (2006.01) |
| E21B 41/00 | (2006.01) |
| C09D 5/00 | (2006.01) |
| E21B 43/26 | (2006.01) |
| B05D 1/18 | (2006.01) |
| B05D 1/38 | (2006.01) |
| B05D 7/14 | (2006.01) |
| B05D 7/22 | (2006.01) |
| E21B 33/03 | (2006.01) |
| C09D 7/20 | (2018.01) |
| C09D 7/63 | (2018.01) |
| C09D 7/62 | (2018.01) |
| C08K 5/5425 | (2006.01) |
| C09D 5/08 | (2006.01) |

(Continued)

(52) U.S. Cl.
CPC .............. *B05D 7/586* (2013.01); *B05D 1/02* (2013.01); *B05D 1/18* (2013.01); *B05D 1/38* (2013.01); *B05D 3/12* (2013.01); *B05D 5/00* (2013.01); *B05D 7/14* (2013.01); *B05D 7/16* (2013.01); *B05D 7/22* (2013.01); *B05D 7/222* (2013.01); *B05D 7/225* (2013.01); *B05D 7/26* (2013.01); *B05D 7/544* (2013.01); *B05D 7/546* (2013.01); *B05D 7/584* (2013.01); *C08K 5/5425* (2013.01); *C09D 5/002* (2013.01); *C09D 5/082* (2013.01); *C09D 5/084* (2013.01); *C09D 7/20* (2018.01); *C09D 7/61* (2018.01); *C09D 7/62* (2018.01); *C09D 7/63* (2018.01); *C09D 159/00* (2013.01); *C09D 163/04* (2013.01); *C09D 183/04* (2013.01); *C09D 183/06* (2013.01); *C23F 11/18* (2013.01); *E21B 33/03* (2013.01); *E21B 34/04* (2013.01); *E21B 34/06* (2013.01); *E21B 41/00* (2013.01); *E21B 43/2607* (2020.05); *B05D 2202/00* (2013.01); *B05D 2202/10* (2013.01); *B05D 2254/00* (2013.01); *B05D 2350/60* (2013.01); *B05D 2401/10* (2013.01); *B05D 2504/00* (2013.01); *C08G 59/022* (2013.01); *C08G 59/063* (2013.01); *C08K 3/11* (2018.01); *C08K 3/36* (2013.01); *C08K 5/541* (2013.01); *C08K 5/544* (2013.01); *C08K 5/5415* (2013.01); *C08K 5/5435* (2013.01); *C09D 163/00* (2013.01); *E21B 17/02* (2013.01); *E21B 43/26* (2013.01)

(58) Field of Classification Search
CPC . B05D 7/586; B05D 5/00; C08K 3/11; C08K 3/36; C09D 5/002; C09D 183/06
See application file for complete search history.

(56) References Cited

U.S. PATENT DOCUMENTS

| | | |
|---|---|---|
| 4,681,818 A | 7/1987 | Unnam et al. |
| 4,701,380 A | 10/1987 | Narula et al. |

(Continued)

FOREIGN PATENT DOCUMENTS

| | | |
|---|---|---|
| CN | 203066924 | 7/2013 |
| CN | 112280484 | 1/2021 |

(Continued)

OTHER PUBLICATIONS

International Search Report and Written Opinion for PCT/US21/70365, dated Aug. 6, 2021.

(Continued)

*Primary Examiner* — Edward J Cain
(74) *Attorney, Agent, or Firm* — Womble Bond Dickinson (US) LLP

(57) ABSTRACT

Coating compositions for coating an oilfield operational component, and related methods, may include in some aspects a coating composition having a trifunctional silane, a silanol, and a filler. The coating composition may be applied to a surface of the oilfield operational component that is configured to be exposed to a fluid. The coating composition may be applied to at least partially cover or coat the surface. The coating composition may be configured to chemically bond with a cured primer composition that includes an epoxy.

30 Claims, 23 Drawing Sheets

Related U.S. Application Data

(60) Provisional application No. 63/008,035, filed on Apr. 10, 2020, provisional application No. 63/008,038, filed on Apr. 10, 2020, provisional application No. 63/008,042, filed on Apr. 10, 2020, provisional application No. 63/008,046, filed on Apr. 10, 2020, provisional application No. 63/008,049, filed on Apr. 10, 2020, provisional application No. 63/065,542, filed on Aug. 14, 2020, provisional application No. 63/065,545, filed on Aug. 14, 2020, provisional application No. 63/065,565, filed on Aug. 14, 2020, provisional application No. 63/065,577, filed on Aug. 14, 2020, provisional application No. 63/065,591, filed on Aug. 14, 2020, provisional application No. 63/198,044, filed on Sep. 25, 2020.

(51) Int. Cl.

| | | |
|---|---|---|
| C09D 183/04 | (2006.01) | |
| E21B 34/06 | (2006.01) | |
| C09D 159/00 | (2006.01) | |
| C23F 11/18 | (2006.01) | |
| C09D 7/61 | (2018.01) | |
| B05D 3/12 | (2006.01) | |
| C09D 163/04 | (2006.01) | |
| E21B 34/04 | (2006.01) | |
| C08K 3/36 | (2006.01) | |
| C08K 3/11 | (2018.01) | |
| C08K 5/541 | (2006.01) | |
| C08K 5/5415 | (2006.01) | |
| C08K 5/544 | (2006.01) | |
| E21B 17/02 | (2006.01) | |
| C09D 163/00 | (2006.01) | |
| C08G 59/02 | (2006.01) | |
| C08G 59/06 | (2006.01) | |
| C08K 5/5435 | (2006.01) | |

(56) References Cited

U.S. PATENT DOCUMENTS

| | | |
|---|---|---|
| 4,906,523 A | 3/1990 | Bilkadi et al. |
| 5,011,900 A | 4/1991 | Yukimoto et al. |
| 5,212,017 A | 5/1993 | Meder |
| 5,295,541 A | 3/1994 | Ng et al. |
| 5,922,473 A | 7/1999 | Muthiah et al. |
| 6,144,106 A | 11/2000 | Bearinger et al. |
| 7,033,673 B2 | 4/2006 | Wiedemann et al. |
| 7,186,945 B2 | 3/2007 | He et al. |
| 7,842,139 B2 | 11/2010 | Peterson et al. |
| 8,034,153 B2 | 10/2011 | Marchiando et al. |
| 8,091,227 B2 | 1/2012 | Hong |
| 8,118,561 B2 | 2/2012 | Bruce et al. |
| 8,323,423 B2 | 12/2012 | Peterson et al. |
| 8,434,399 B2 | 5/2013 | Gambier et al. |
| 8,616,245 B2 | 12/2013 | Albert et al. |
| 8,950,485 B2 | 2/2015 | Wilkins et al. |
| 9,127,545 B2 | 9/2015 | Kajaria |
| 9,206,335 B2 | 12/2015 | Hager et al. |
| 9,556,338 B2 | 1/2017 | Jing et al. |
| 9,739,130 B2 | 8/2017 | Young |
| 10,151,188 B2 | 12/2018 | Kajaria et al. |
| 10,526,862 B2 | 1/2020 | Witkowski et al. |
| 10,851,265 B2 | 12/2020 | Chen et al. |
| 11,149,167 B1 | 10/2021 | Andrews et al. |
| 11,198,794 B2 | 12/2021 | Andrews et al. |
| 2004/0006190 A1 | 1/2004 | Sakamoto et al. |
| 2004/0157961 A1 | 8/2004 | Tullos et al. |
| 2004/0225079 A1 | 11/2004 | Wiedemann et al. |
| 2005/0019589 A1 | 1/2005 | Wiedemann et al. |
| 2007/0051510 A1 | 3/2007 | Veneruso et al. |
| 2007/0190244 A1 | 8/2007 | Corbett, Sr. et al. |
| 2008/0083530 A1 | 4/2008 | Boyd |
| 2008/0090010 A1 | 4/2008 | Zhang et al. |
| 2010/0028690 A1 | 2/2010 | Park et al. |
| 2010/0331769 A1 | 12/2010 | Nisato et al. |
| 2011/0158807 A1 | 6/2011 | Hong |
| 2011/0198413 A1 | 8/2011 | Thompson et al. |
| 2012/0264847 A1 | 10/2012 | Thorlaksen et al. |
| 2013/0032411 A1 | 2/2013 | John et al. |
| 2013/0315855 A1 | 11/2013 | Bishoff et al. |
| 2013/0319220 A1 | 12/2013 | Luharuka et al. |
| 2014/0020901 A1 | 1/2014 | Kajaria |
| 2015/0152318 A1 | 6/2015 | Travis |
| 2015/0292297 A1 | 10/2015 | Kajaria |
| 2016/0168970 A1 | 6/2016 | Kajaria et al. |
| 2020/0408067 A1 | 12/2020 | Mudigere et al. |

FOREIGN PATENT DOCUMENTS

| | | |
|---|---|---|
| EP | 0242899 | 10/1987 |
| EP | 0572148 | 12/1993 |
| EP | 1046689 | 4/2000 |
| EP | 1008613 | 6/2000 |
| GB | 951231 | 3/1964 |
| WO | 9839391 | 9/1998 |
| WO | 9967336 | 12/1999 |
| WO | 0005308 | 2/2000 |
| WO | 2010008577 | 1/2010 |
| WO | 2014067807 | 5/2014 |
| WO | 2020176272 | 9/2020 |

OTHER PUBLICATIONS

International Search Report and Written Opinion for PCT/US21/70366, dated Jun. 8, 2021.
International Search Report and Written Opinion for PCT/US21/70367, dated Jun. 8, 2021.
International Search Report and Written Opinion for PCT/US21/70368, dated Jun. 8, 2021.
International Search Report and Written Opinion for PCT/US21/70369, dated Jun. 30, 2021.
International Search Report and Written Opinion for PCT/US21/70370, dated Jul. 1, 2021.
Duque et al., Theory of T Junctions and Symmetric Tilt Grain Boundaries in Pure and Mixed Polymer Systems, Journal of Chemical Physics 117, 10315, 2002.
Crosslinked Macromolecular Systems by Wlodzimierz Klonowski, BioLingua Research, Inc., (https://www.google.com/books/edition/_/cMmlgsRwD24C?hl=en&gbpv=1&pg=PP), pp. 61-69, 2009.
Baroud et al., Multiphase Flows in Microfluidics, Comptes Rendus Physique, 547-555, 2004.
SiSiB® Silicone Resins website (https://www.powerchemical.com/silicone_resin/silicone_resin.html), 2014.
Elkem Silicone Resin website (https://www.elkem.com/silicones/technologies/fluids/resin/), 2021.
English abstract of CN 104277681 A (Jan. 14, 2015).
CHE 286/486 Polymer Science and Technology, Silicones and Sol-gel Chemistry, from website Aug. 4, 2003.
Coating Chemicals, CYTEC, from website Aug. 4, 2003.
Fumed Metal Oxides, Cabot Corporation, from website Mar. 11, 2003.
Introduction, Background Information on Hexamethyldisilazane, from website Mar. 11, 2003.
3-0134 Polymer, Dow Corning, from website Mar. 11, 2003.
Aeorcoat K, Analytical Services & Materials, Inc., Data Sheet # AEROK-B, Dec. 2002.
Coating of Rain Erosion Test Articles, Analytical Services & Materials, Inc., Final Report, Apr. 5, 2002.
Dale Flackett, One Part Silicone Sealants, Gelest, Inc., Landrum, South Carolina.
M. Atlar et al., The effect of a foul release coating on propeller performance.
M. Atlar et al., Calculation of the effects of new generation coatings on high speed propeller performance.

(56) References Cited

OTHER PUBLICATIONS

Intersleek, Elastomeric Foul Release Coatings, International Marine Coatings, from website Aug. 4, 2003.
Epon Resin, Resolution Performance Products, Resins and Versatics Online Literature, from website Aug. 4, 2003.

METHODS FOR PROVIDING FLEXIBLE AND/OR ELASTIC COATINGS ON OILFIELD OPERATIONAL COMPONENTS

PRIORITY CLAIMS

This is a continuation of U.S. Non-Provisional application Ser. No. 17/225,743, filed Apr. 8, 2021, titled "METHODS FOR PROVIDING FLEXIBLE AND/OR ELASTIC COATINGS ON OILFIELD OPERATIONAL COMPONENTS," which claims priority to and the benefit of, under 35 U.S.C. § 119(e), U.S. Provisional Application No. 63/008,035, filed Apr. 10, 2020, titled "COATING COMPOSITIONS, COATED OILFIELD OPERATIONAL COMPONENTS, AND RELATED METHODS FOR OILFIELD OPERATIONS," U.S. Provisional Application No. 63/008,038, filed Apr. 10, 2020, titled "METHODS FOR PROTECTING OILFIELD OPERATIONAL COMPONENTS FROM DAMAGE FROM FLUID FLOW," U.S. Provisional Application No. 63/008,042, filed Apr. 10, 2020, titled "COATING AND METHODS FOR EXTENDING SERVICE LIFE OF OILFIELD OPERATIONAL COMPONENTS," U.S. Provisional Application No. 63/008,046, filed Apr. 10, 2020, titled "METHODS FOR PREPARING COATING COMPOSITIONS FOR PROTECTING OILFIELD OPERATIONAL COMPONENTS," U.S. Provisional Application No. 63/008,049, filed Apr. 10, 2020, titled "METHODS FOR PROVIDING FLEXIBLE AND/OR ELASTIC COATINGS ON OILFIELD OPERATIONAL COMPONENTS," U.S. Provisional Application No. 63/065,542, filed Aug. 14, 2020, titled "COATED OILFIELD OPERATIONAL COMPONENTS AND METHODS FOR PROTECTING AND EXTENDING THE SERVICE LIFE OF OILFIELD OPERATIONAL COMPONENTS," U.S. Provisional Application No. 63/065,545, filed Aug. 14, 2020, titled "METHODS FOR PROTECTING OILFIELD OPERATIONAL COMPONENTS FROM DAMAGE FROM FLUID FLOW," U.S. Provisional Application No. 63/065,565, filed Aug. 14, 2020, titled "COATING AND METHODS FOR EXTENDING SERVICE LIFE OF OILFIELD OPERATIONAL COMPONENTS," U.S. Provisional Application No. 63/065,577, filed Aug. 14, 2020, titled "METHODS FOR PREPARING COATING COMPOSITIONS FOR PROTECTING OILFIELD OPERATIONAL COMPONENTS," U.S. Provisional Application No. 63/065,591, filed Aug. 14, 2020, titled "METHODS FOR PROVIDING FLEXIBLE AND/OR ELASTIC COATINGS ON OILFIELD OPERATIONAL COMPONENTS," and U.S. Provisional Application No. 63/198,044, filed Sep. 25, 2020, titled "COATED OILFIELD OPERATIONAL COMPONENTS AND METHODS FOR PROTECTING AND EXTENDING THE SERVICE LIFE OF OILFIELD OPERATIONAL COMPONENTS," the disclosures of all of which are incorporated herein by reference in their entireties.

FIELD OF THE DISCLOSURE

This disclosure relates to coated oilfield operational components, methods for protecting oilfield operational components, and methods for extending the service life of oilfield operational components.

BACKGROUND

Oilfield operations involve the use of numerous components subjected to harsh use. For example, many components are part of systems that supply fluid at high flow rates, high pressures, and other usage and environmental conditions as will be understood by those in the art. As an example, fracking operations involve providing fracking fluid at high flow rates and high pressures sufficient to fracture a reservoir formation to allow hydrocarbons to more easily flow from the formation toward a well for production. For example, typical flow rates may range from about 1,500 to about 4,000 gallons per minute, and typical pressures may range from about 7,500 to about 15,000 pounds per square inch. Such high rates of flow and high pressures may result in significant wear to components associated with the fluid flow. Further, current fracking operations may involve as much as two-to-three times more hydraulic horsepower for delivering fracking fluid to a formation than similar operations performed a decade ago. This increase has often resulted in drastically reducing the service life of fluid handling components of the fracking operation. In addition, fracking fluids may contain substances or particles that are corrosive and abrasive in nature, which increases wear rates of components exposed to the flow of fracking fluid. Moreover, components may include internal passages and structures that increase the effects of the flow of fluid through the component, such as elbows, valves, seals, and pump impellers, which may be exposed to the effects of cavitation. As a result, components associated with oilfield operations often experience high wear rates, resulting in the need for replacement, which leads to significant expense associated with replacement costs and downtime. Thus, it may be desirable to develop systems and methods to extend the service life of oilfield components. At least some examples described herein may address one or more of the above-noted possible issues, as well as possibly others.

SUMMARY

As referenced above, components associated with oilfield operations often experience high wear rates, resulting in the need for replacement, which leads to significant expense associated with replacement costs and downtime. For example, many components are part of systems that supply fluid at high flow rates, high pressures, and other usage and environmental conditions as will be understood by those in the art. High flow rates and high pressures may result in significant wear to components associated with the fluid flow. In addition, fracking fluids may contain substances or particles that are corrosive and abrasive in nature, which increases wear rates of components exposed to the flow of fracking fluid. Moreover, components may include internal passages and structures, such as elbows, valves, seals, and pump impellers, that increase the effects of the flow of fluid through the component, and which may be exposed to the effects of cavitation.

The present disclosure is generally directed to coatings, oilfield operational components, and related methods that may significantly reduce the wear rates associated with oilfield operational components. In some examples, the coatings and methods may protect the oilfield operational components by absorbing and/or dissipating energy of fracking fluid as the fracking fluid passes through the components. In some examples, the coatings and methods may protect the oilfield operational components from kinetic energy associated with particles in the fracking fluid and/or impact energy associated with cavitation of the fracking fluid as it flows through the oilfield operational components.

In a first aspect, an oilfield operational component configured to be used in an oilfield operation may include a component body including a surface positioned to be exposed to fluid flow during an oilfield operation. The oilfield operational component may also include a coating at least partially covering the surface of the component body to enhance wear resistance of the component body, such that the oilfield operational component exhibits a comparison factor indicative of an increased resistance to wear greater than about 2. The coating may include a primer applied to the surface of the component body, and a coating composition at least partially coating the primer. The coating composition may include trifunctional silane, silanol fluid, and filler. The coating composition may be positioned to chemically bond with the primer.

In another aspect, a method for protecting an oilfield operational component exposed to flow of an oilfield fluid may include applying a primer composition to the oilfield operational component. The method also may include at least partially curing the primer composition to form a primer layer, such that the primer layer is at least partially mechanically bonded to the oilfield operational component. The method further may include applying a coating composition to the primer layer, and at least partially curing the coating composition to form a coating layer at least partially chemically bonded to the primer layer to enhance wear resistance of the oilfield operational component, such that the oilfield operational component exhibits a comparison factor indicative of an increased resistance to wear greater than about 2.

In still a further aspect, a method for increasing a service life of an oilfield operational component positioned to be used in an oilfield operation may include at least partially coating an oilfield operational component positioned to be used in an oilfield operation to obtain a first coating layer on the oilfield operational component to enhance wear resistance of the oilfield operational component, such that the oilfield operational component exhibits a comparison factor indicative of an increased resistance to wear greater than about 2. The method also may include incorporating the oilfield operational component into an oilfield operation, and exposing the oilfield operational component to fluid flow in the oilfield operation for a first period of time. The method further may include at least partially removing at least a portion of the first coating layer from the oilfield operational component, and at least partially coating the oilfield operational component to obtain a second coating layer on the oilfield operational component. One or more of the first coating layer or the second coating layer may include trifunctional silane, silanol fluid, and filler. The one or more of the first coating layer or the second coating layer may be positioned to reduce a wear-rate of the oilfield operational component as exposed to fluid flow associated with the oilfield operation.

According to yet a further aspect, a coating composition for applying to a surface of an oilfield operational component configured to be exposed to an oilfield fluid may include trifunctional silane, silanol, and filler. In some examples, silicon in the coating composition may be configured to chemically bond with a cured primer composition including epoxy.

In another aspect, an oilfield operational component configured to be used in an oilfield operation may include the oilfield operational component and a coating at least partially covering the component. In some examples, the coating may include a coating composition at least partially coating the component, and the coating composition may include trifunctional silane, silanol fluid, and filler. In some examples, the coating composition may be configured to chemically bond with a cured epoxy primer.

In still another aspect, a method for applying a coating composition to at least a portion of an oilfield operational component configured to be used in an oilfield operation may include applying a primer composition to the oilfield operational component and at least partially curing the primer composition to form an at least partially cured primer layer on at least a portion of the component. The at least partially cured primer layer may be configured to form a mechanical bond with the at least a portion of the component. The method may further include applying a coating composition to the at least partially cured primer layer. In some examples, the coating composition may include trifunctional silane, silanol fluid, and filler. The method may further include at least partially curing the coating composition such that the coating composition is at least partially chemically bonded to the at least partially cured primer.

In yet another aspect, a method for protecting an oilfield operational component exposed to flow of an oilfield fluid may include applying a primer composition to the component, and at least partially curing the primer composition to form a primer layer, such that the primer layer is at least partially mechanically bonded to the component. The method may further include applying a coating composition to the primer layer, and at least partially curing the coating composition to form a coating layer at least partially chemically bonded to the primer layer.

According to a further aspect, a method for dissipating energy generated via cavitation associated with fluid flow in relation to an oilfield operational component exposed to an oilfield fluid may include providing a coating on a least a portion of the component. In some examples, the providing may include applying a primer composition to the oilfield operational component and at least partially curing the primer composition to form a primer layer, such that the primer layer is at least partially mechanically bonded to the component. The method may further include applying a coating composition to the primer layer and at least partially curing the coating composition to form a coating layer at least partially chemically bonded to the primer layer.

In still a further aspect, a method for dissipating kinetic energy associated with particles in an oilfield fluid impacting an oilfield operational component may include providing a coating layer on a least a portion of the component. In some examples, the providing may include applying a primer composition to the oilfield operational component and at least partially curing the primer composition to form a primer layer, such that the primer layer is at least partially mechanically bonded to the component. The method may further include applying a coating composition to the primer layer and at least partially curing the coating composition to form a coating layer at least partially chemically bonded to the primer layer.

In yet another aspect, a method for increasing a service life of an oilfield operational component configured to be used in an oilfield operation may include at least partially coating the oilfield operational component to obtain a first coating layer on the component. In some examples, the method may further include incorporating the oilfield operational component into an oilfield operation and exposing the oilfield operational component to fluid flow in the oilfield operation for a first period of time. The method may further include at least partially removing at least a portion of the first coating layer from the oilfield operational component and at least partially coating the oilfield operational component to obtain a second coating layer on the component.

In some examples, at least one of the first coating layer or the second coating layer may include trifunctional silane, silanol fluid, and filler. The at least one of the first coating layer or the second coating layer may be configured to reduce a wear-rate of the oilfield operational component as exposed to fluid flow associated with the oilfield operation.

According to a further aspect, a method for repairing damage to a coating on an oilfield operational component configured for use in an oilfield operation may include exposing at least a portion of a first primer layer associated with a damaged portion of the coating. The method may further include applying a primer composition to the at least a portion of the first primer layer and at least partially curing the primer composition to obtain a second primer layer bonded to the at least a portion of the first primer layer. The method may also include applying a coating composition to the second primer layer, and at least partially curing the coating composition, such that the coating composition at least partially chemically bonds with the second primer layer.

In still another aspect, a method for repairing damage to a coating on an oilfield operational component configured for use in an oilfield operation may include exposing at least a portion of a first primer layer associated with a damaged portion of the coating and removing at least a portion of the first primer layer to expose a surface of the component. The method may further include applying a primer composition to the surface of the oilfield operational component and at least partially curing the primer composition to obtain a second primer layer bonded to the surface of the component. The method may also include applying a coating composition to the second primer layer and at least partially curing the coating composition, such that the coating composition at least partially chemically bonds with the second primer layer.

In yet a further aspect, a method for replacing at least a portion of a first coating from an oilfield operational component configured for use in an oilfield operation may include removing at least a portion of the first coating from the oilfield operational component and exposing at least a portion of the component, and cleaning the at least a portion of the component. The method may further include applying a primer composition to the at least a portion of the oilfield operational component and at least partially curing the primer composition to form a primer layer at least partially mechanically bonded to the at least a portion of the component. The method may also include applying a coating composition to the primer layer and at least partially curing the coating composition to form a coating layer at least partially chemically bonded to the primer layer.

According to a further aspect, a method for preparing a coating composition for application to at least a portion of an oilfield operational component to reduce damage induced by flow of an oilfield fluid may include providing trifunctional silane, providing silanol fluid, and providing filler. The method may further include combining the trifunctional silane, the silanol fluid, and the filler. The method may further include mixing the trifunctional silane, the silanol fluid, and the filler to obtain the coating composition. In some examples, the coating composition may be configured to form a coating layer on the at least a portion of the component, and the coating layer may be configured to reduce damage induced by flow of an oilfield fluid.

In yet another aspect, a method for adjusting a hardness of a coating configured to protect at least a portion of an oilfield operational component configured to be exposed to an oilfield fluid may include preparing a coating composition. The coating composition may include an amount of trifunctional silane, an amount of silanol fluid, and an amount of filler. The method may further include at least one of: (1) increasing the amount of silanol fluid relative to at least one of the amount of trifunctional silane or the amount of filler to decrease the hardness of the coating; (2) decreasing the amount of silanol fluid relative to at least one of the amount of trifunctional silane or the amount of filler to increase the hardness of the coating; (3) increasing the amount of filler relative to at least one of the amount of trifunctional silane or the amount of silanol fluid to increase the hardness of the coating; or (4) decreasing the amount of filler relative to at least one of the amount of trifunctional silane or the amount of silanol fluid to decrease the hardness of the coating. In some examples, the coating composition may be configured to form a coating layer on the at least a portion of the component, and the coating layer may be configured to reduce damage induced by flow of an oilfield fluid.

In still another aspect, a method for adjusting a viscosity of a coating composition for application to at least a portion of an oilfield operational component configured to be exposed to an oilfield fluid may include preparing a coating composition. The coating composition may include an amount of trifunctional silane, an amount of silanol fluid, an amount of filler, and an amount of solvent. The method may further include one of: (1) increasing the amount of solvent relative to at least one of the amount of trifunctional silane, the amount of silanol fluid, or the amount of filler to reduce the viscosity of the coating composition; or (2) decreasing the amount of solvent relative to at least one of the amount of trifunctional silane, the amount of silanol fluid, or the amount of filler to increase the viscosity of the coating composition. In some examples, the coating composition may be configured to form a coating layer on the at least a portion of the component, and the coating layer may be configured to reduce damage induced by flow of an oilfield fluid.

According to yet another aspect, a method for providing a flexible coating on a surface of an oilfield operational component configured to be exposed to a flow of an oilfield fluid may include applying a primer composition to the component. In some examples, the primer composition may include epoxy. The method may further include at least partially curing the primer composition to obtain a primer layer having a dry film thickness ranging from about 20 micrometers to about 100 micrometers. The method may also include applying a first coating composition to the primer layer, and the first coating composition may include at least one of trifunctional silane, silanol, or filler. The method may further include at least partially curing the first coating composition to obtain a first coating layer having a dry film thickness ranging from about 100 micrometers to about 250 micrometers. In some examples, the method may further include applying a second coating composition to the first coating layer, and the second coating composition may include at least one of trifunctional silane, silanol, or filler. The method may further include at least partially curing the second coating composition to obtain a second coating layer having a dry film thickness ranging from about 100 micrometers to about 250 micrometers. In some examples, at least one of the primer layer, the first coating layer, or the second coating layer may be configured to reduce damage to the oilfield operational component from flow of an oilfield fluid, such that the oilfield operational component exhibits a comparison factor indicative of an increased resistance to wear greater than about 2.

In yet another aspect, a method for providing an elastic coating on a surface of an oilfield operational component configured to be exposed to a flow of an oilfield fluid may include applying a primer composition to the component. In some examples, the primer composition may include epoxy. The method may further include at least partially curing the primer composition to obtain a primer layer having a dry film thickness ranging from about 20 micrometers to about 100 micrometers. The method may also include applying a first coating composition to the primer layer, and the first coating composition may include at least one of trifunctional silane, silanol, or filler. The method may further include at least partially curing the first coating composition to obtain a first coating layer having a dry film thickness ranging from about 100 micrometers to about 250 micrometers. The method may also include applying at least one additional coating composition to the first coating layer. The at least one additional coating composition may include at least one of trifunctional silane, silanol, or filler. The method may further include at least partially curing the at least one additional coating composition to obtain at least one additional coating layer. In some examples, the total dry film thickness of the first coating layer and the at least one additional coating layer may range from about 500 micrometers to about 1000 micrometers. In some examples, at least one of the primer layer, the first coating layer, or the at least one additional coating layer may be configured to reduce damage to the oilfield operational component from flow of an oilfield fluid, such that the oilfield operational component exhibits a comparison factor indicative of an increased resistance to wear greater than about 2.

Still other aspects, examples, and advantages of these exemplary aspects and embodiments, are discussed in more detail below. It is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, may become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

DETAILED DESCRIPTION

Figure 1:
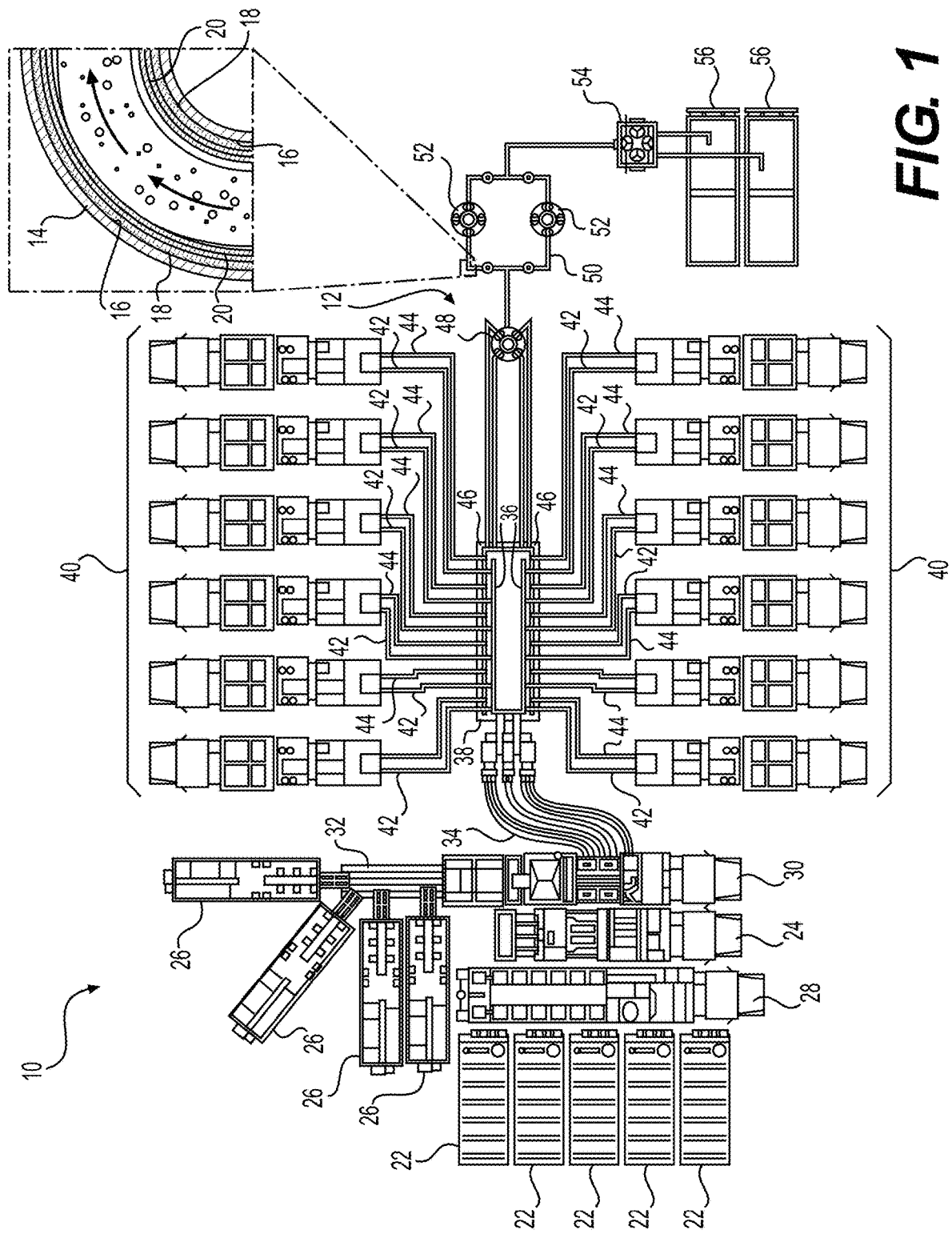
FIG. 1 is a schematic top view of an example oilfield operation including an example fracturing system including a partial section view of schematically-depicted example oilfield component having an internal surface at least partially coated by an example primer layer and example coating layers according to the disclosure.

Referring now to the drawings in which like numerals indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances, and are a part of the disclosure. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Generally, this disclosure outlines coating compositions, coated components, and related methods, and in particular, coating compositions, coated components, and related methods for protecting components from wear related to fluid flow in oilfield operations. Oilfield operations may include any on-site activities related to oil exploration, drilling, completions, stimulation, and/or production, for example, associated with the petroleum industry. In some instances, oilfield operations also may include logistical activities of such operations including pipelines and pipeline parts such as pipeline pumps, elbows, and various pipeline segments, for example. Fluid flow in oilfield operations may include the flow of any oilfield fluid including any fluids or fluid-like materials associated with any oilfield operation, including, but not limited to, fracking fluid or any fluid related to a hydraulic fracturing operation, drilling fluid, production fluid, and/or reservoir fluid. As an example, fracturing is an oilfield operation that stimulates production of hydrocarbons, such that the hydrocarbons may more easily or readily flow from a subterranean of subsurface formation to a borehole of a well. Although many examples discussed in this disclosure are explained in relation to fracturing equipment, fracturing components, and related methods, other oilfield-related operations, components, and methods are contemplated.

FIG. 1 is a schematic top view of an example oilfield operation 10 including an example fracturing system 12 (e.g., a hydraulic fracturing system), and showing a partial section view of a schematically-depicted example oilfield component 14 including a component body 16 having an internal surface at least partially coated by an example primer layer 18 and example coating layers 20. In some examples, the fracturing system 12 may be configured to fracture a formation by pumping a fracking fluid into a well at high pressure and high flow rates. A fracking fluid may include, for example, water, proppants, and/or other additives, such as thickening agents and/or gels. For example, proppants may include grains of sand, ceramic beads or spheres, shells, and/or other particulates, and may be added to the fracking fluid, along with gelling agents to create a slurry. The slurry may be forced via one or more pumps from the surface into the subterranean formation via a borehole at rates faster than may be accepted by the existing pores, fractures, faults, or other spaces within the formation. As a result, pressure builds rapidly to the point where the formation fails and begins to fracture. By continuing to pump the fracking fluid into the formation, existing fractures in the formation are caused to expand and extend in directions farther away from a well bore, thereby creating flow paths to the well. The proppants may serve to prevent the expanded fractures from closing when pumping of the fracking fluid is ceased or may reduce the extent to which the expanded fractures contract when pumping of the fracking fluid is ceased. Once the well is fractured, large quantities of the injected fracking fluid are allowed to flow out of the well, and the water and any proppants not remaining in the expanded fractures may be separated from hydrocarbons produced by the well to protect downstream equipment from damage and corrosion. In some instances, the production stream may be processed to neutralize corrosive agents in the production stream resulting from the fracturing process.

In the example shown in FIG. 1, the fracturing system 12 includes a plurality of water tanks 22 for supplying water for a fracking fluid, a chemical tank 24 for supplying gels or agents for adding to the fracking fluid, and a plurality of proppant tanks 26 (e.g., sand tanks) for supplying proppants for the fracking fluid. The example fracturing system 12 shown also includes a hydration unit 28 for mixing water from the water tanks 22 and gels and/or agents from the chemical tank 24 to form a mixture, for example, gelled water. The example shown also includes a blender 30, which receives the mixture from the hydration unit 28 and proppants via conveyers 32 from the proppant tanks 26. The blender 30 may mix the mixture and the proppants into a slurry to serve as fracking fluid for the fracturing system 12. Once combined, the slurry may be discharged through low-pressure hoses 34, which convey the slurry into two or more low-pressure lines 36 in a frac manifold 38. In the example shown, the low-pressure lines 36 in the frac manifold 38 feed the slurry to a plurality of pumps 40 through low-pressure suction hoses 42.

The pumps 40 may be driven by motors (e.g., internal combustion engines and/or electric motors) and discharge the slurry (e.g., the fracking fluid including the water, agents, gels, and/or proppants) at high pressure and/or a high flow rate through individual high-pressure discharge lines 44 into two or more high-pressure flow lines 46, sometimes referred to as "missiles," on the frac manifold 38. The flow from the flow lines 46 is combined at the frac manifold 38, and one or more of the flow lines 46 provide flow communication with a manifold assembly 48, sometimes referred to as a "goat head." The manifold assembly 48 delivers the slurry into a wellhead manifold 50, sometimes referred to as a "zipper manifold" or a "frac manifold." The wellhead manifold 50 may be configured to selectively divert the slurry to, for example, one or more well heads 52 via operation of one or more valves. Once the fracturing process is ceased or completed, flow returning from the fractured formation discharges into a flowback manifold 54, and the returned flow may be collected in one or more flowback tanks 56.

As schematically depicted in FIG. 1, one or more of the components of the fracturing system 12 may be configured to be portable, so that the fracturing system 12 may be transported to a well site, quickly assembled, operated for a relatively short period of time, at least partially disassembled, and transported to another location of another well site for use. For example, the components may be carried by trailers and/or incorporated into trucks, so that they may be easily transported between well sites.

At least some of the components of the fracturing system 12 may be referred to collectively as "frac iron." Such components may include, for example, straight sections of steel pipe and pipe joints, various fittings, such as tee-fittings, cross-fittings, lateral-fittings, and wye-fittings, which may provide junctions at which flow is split or combined, and flow line components including fittings configured to alter the course of a flow line, such as elbows and swivel joints. In some examples, the frac iron may be configured to convey fracking fluid under high pressure and/or high flow rates. In some examples, the frac iron may incorporate therein gauges, other monitoring equipment, and/or control devices, such as shut-off valves, plug valves, check valves, throttle valves, pressure-release valves, butterfly valves, and/or choke valves.

Because some components of a fracturing system 12 may be subjected to high pressures and/or high flow rates, and because fracking fluid may contain substances having abrasive and/or corrosive characteristics, such components of the fracturing systems 12 may exhibit high wear rates and/or high failure rates. At least some examples of coatings, coated components, and/or related methods may be directed to reducing such wear rates and/or failure rates.

As shown in FIG. 1, the example oilfield component 14 has a component body 16 having an internal surface at least partially coated by an example primer layer 18 and example coating layers 20 to protect the oilfield operational component 14 from wear induced by the flow of fluid through the oilfield operational component 14, such that at least in some examples, the wear rate and/or the failure rate of the oilfield operational component 14 may be reduced, and/or the service life of the oilfield operational component 14 may be extended, for example, as explained herein. In some examples, the primer layer 18 may be omitted or there may be more than one primer layer 18, and in some examples, there may be fewer or more coating layers 20 (e.g., one or two coating layers 20, or four or more coating layers 20). In examples having more than one primer layer 18, the primer layers 18 may be the same material or different materials, and/or the primer layers 18 may have the same thickness or different thicknesses. In examples having more than one coating layer 20, the coating layers 20 may be the same material or different materials, and/or the coating layers 20 may have the same thickness or different thicknesses.

Figure 2A:
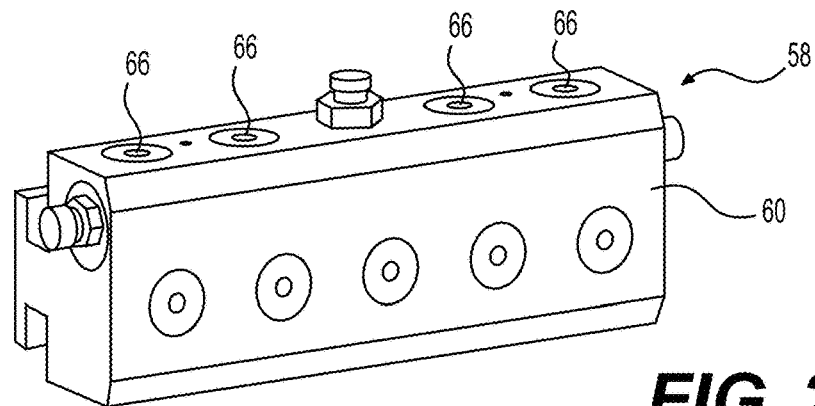
FIG. 2A is a schematic perspective view of an example fluid end, which may be incorporated into a fracturing system according to the disclosure.

FIG. 2A is a schematic perspective view of component 14 in the form of an example fluid end 58, which may be incorporated into a fracturing system, such as the example fracturing system 12 shown in FIG. 1. In the example shown in FIG. 2A, the fluid end 58 includes a fluid end block 60, which may typically be formed from steel (e.g., stainless steel) and may be machined to provide internal passages and/or may be formed with internal passages (e.g., via casting). In some examples, the fluid end 58 may be connected to a power end of a reciprocating pump having a plurality of reciprocating plungers that cyclically extend at least partially into and at least partially retract from passages in the fluid end 58. During retraction, low pressure fluid (e.g., fracking fluid) is drawn into the fluid end 58, for example, via low-pressure suction hoses 42 (FIG. 1), and during extension, high pressure fluid is discharged from the fluid end 58, for example, via high-pressure discharge lines 44 (FIG. 1).

Figure 2B:
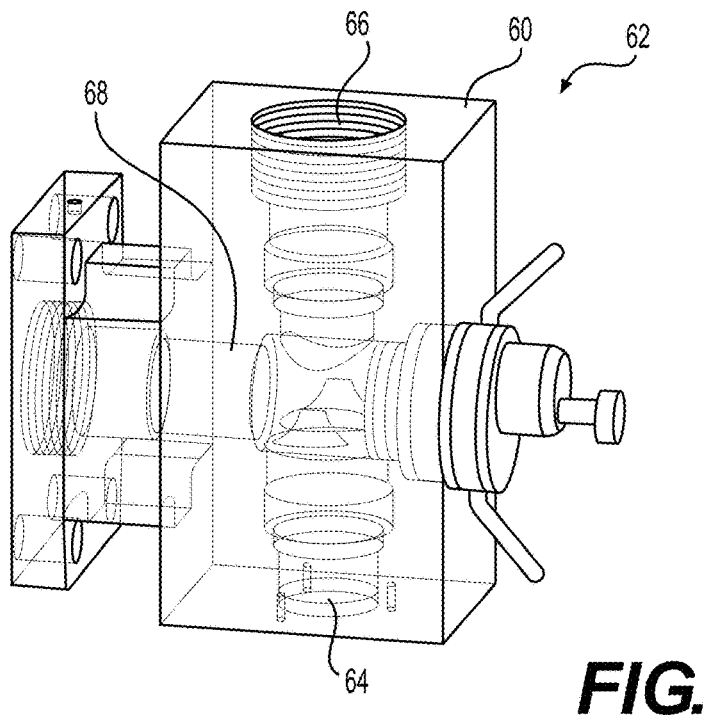
FIG. 2B is a schematic perspective view showing an example internal portion of a fluid end, such as the fluid end shown in FIG. 2A according to the disclosure.

For example, FIG. 2B is a schematic perspective view of an example internal portion 62 of the fluid end 58, such as the fluid end 58 shown in FIG. 2A. (FIG. 2A shows a single portion 62, but a fluid end may include more internal portions.) The example portion 62 includes an intake port 64 configured to facilitate intake of fluid into the fluid end 58 and an exhaust port 66 configured to facilitate discharge of fluid from the fluid end 58. The example portion 62 also includes a cylinder 68 configured to receive a reciprocating plunger of a power end of a pump. As the reciprocating plunger at least partially retracts from the cylinder 68, fluid is drawn into the fluid end 58 via the intake port 64. Valves (not shown) in the fluid end 58 between the intake port 64 and the exhaust port 66 operate cyclically as the plunger reciprocates to facilitate the intake and discharge of the fluid from the fluid end 58. In this example manner, the fluid end 58 draws in fluid at low pressure and discharges the fluid at high pressure. In some examples, the fluid end 58 may include a plurality of sets of intake ports, cylinders, and exhaust ports to pump fluid at higher pressures and/or flow rates. Due to the high pressures and high volumes to which the fluid end 58 is exposed, the fluid end block 60, valves, valve seats, and/or packing sets of the fluid end 58 may be subject to high wear rates and/or high failure rates.

Figure 2C:
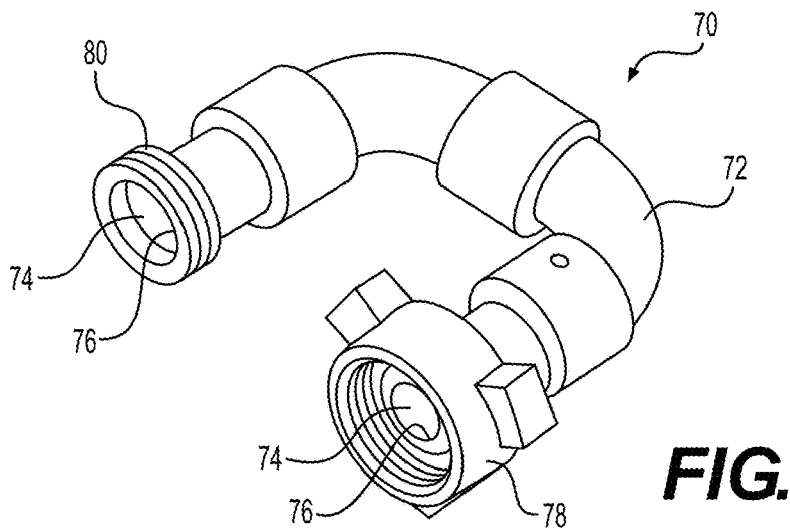
FIG. 2C is a schematic perspective view of an example flow iron component, which may be associated with a fluid transporting portion of an oilfield operation, such as a fracturing system according to the disclosure.

FIG. 2C is a schematic perspective view of an example flow iron component 70, which may be associated with a fluid transporting portion of an oilfield operation, such as a fracturing system. As shown in FIG. 2C, the example flow iron component 70 includes a tubular portion 72 in which an internal passage 74 is defined by internal surfaces 76. The example tubular portion 72 shown in FIG. 2C forms a U-shape. Tubular portions having other shapes are contemplated, such as straight and ninety-degree bends, obtuse bends, and acute bends. As shown in FIG. 2C, the example flow iron component 70 also includes a first coupler 78 at a first end of the tubular portion 72 and a second coupler 80 at a second, opposite end of the tubular portion 72. The first and second couplers 78 and 80 may be configured to couple the flow iron component 70 to other components of the oilfield operation (e.g., a fracturing system), for example, via complimentary couplers of the other components.

Figure 2D:
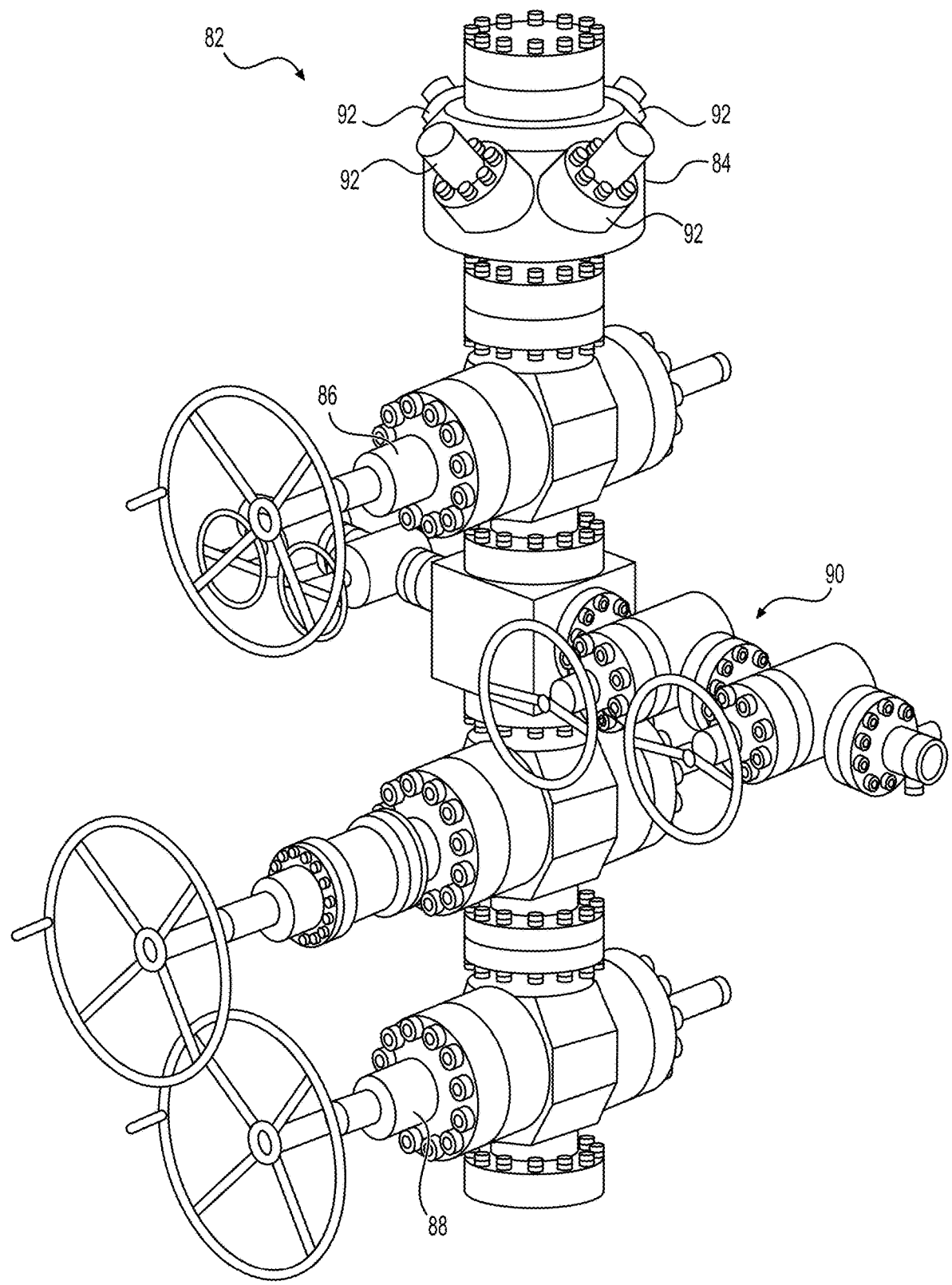
FIG. 2D is a schematic perspective view of an example fracturing or frac stack, which may be associated with a fluid transporting portion of an oilfield operation, such as a fracturing system according to the disclosure.

FIG. 2D is a schematic perspective view of an example frac stack 82, which may be associated with a fluid transporting portion of an oilfield operation, such as the example fracturing system 12. The example frac stack 82 shown in FIG. 2D includes an example goat head 84, an example upper master valve 86, an example lower master valve 88, and example gate valves 90. The example frac stack 82 may generally correspond to the manifold assembly 48 shown in FIG. 1. In some examples, the goat head 84 may be configured to serve as a high-pressure flow cross in flow communication with one or more well heads (e.g., similar to well heads 52 shown in FIG. 1). In some examples, for example as shown, the goat head 84 may include a plurality of couplers 92 configured to connect flow iron to one or more well heads, so that fracking fluid may be supplied to the one or more well heads. In some examples, the upper master valve 86 and/or the lower master valve 88 may be configured to at least partially control the flow of fracking fluid to the one or more well heads during a fracking operation. One or more of the upper master valve 86 or the lower master valve 88 may be closed to shut in the well heads, for example, during an emergency situation. In some examples, the upper master valve 86 and/or the lower master valve 88 may be configured to be manually operated and/or remotely operated. In some examples, one or more of the gate valves 90 may be configured to at least partially control flow of fracking fluid through the frac stack 82, for example, to control fluid flow back and/or during wireline pump down operations.

Figure 3:
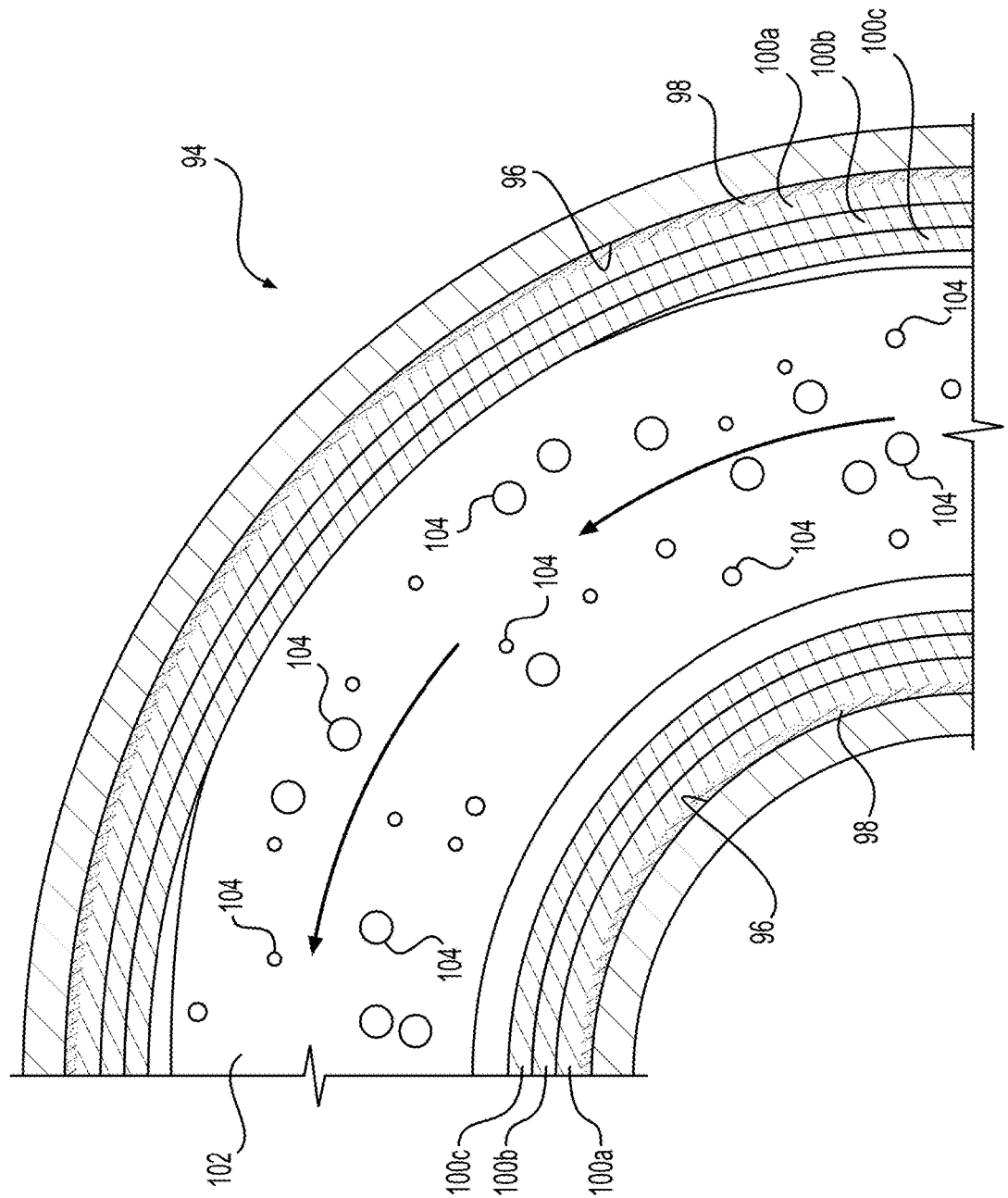
FIG. 3 is a partial cross-section schematic representation of an example flow iron component having internal surfaces at least partially coated with a primer layer and coating layers and showing an example fluid passing through the oilfield operational component according to the disclosure.

FIG. 3 is a partial cross-section schematic representation of an example flow iron component 94 having internal surfaces 96 at least partially coated with a primer layer 98 and one or more coating layers 100 (e.g., coating layers 100a, 100b, and 100c, as shown) and showing an example fluid 102 passing through the flow iron component 94. The example flow iron component 94 may correspond to any flow iron component used in an oilfield operation, such as, for example, a fracking operation that may be performed by a fracking system, such as the example fracturing system 12 shown FIG. 1. Although the example flow iron component 94 shown in FIG. 3 includes an elbow, other configurations of flow iron component are contemplated, such as any fluid handling component associated with an oilfield operation.

The internal surface 96 of the example flow iron component 94 shown in FIG. 3 is at least partially coated by the example primer layer 98 and the example coating layers 100a, 100b, and 100c to protect the flow iron component 94 from wear induced by the flow of an example fluid 102 through the flow iron component 94, such that at least in some examples, the wear rate and/or the failure rate of the flow iron component 94 may be reduced, and/or the service life of the flow iron component 94 may be extended, for example, as explained herein. In the example schematically shown in FIG. 3, the fluid 102 is an example fracking fluid including, for example, water, one or more agents and/or gels, and proppants 104, which may include grains of sand, ceramic beads or spheres, shells, and/or other similar particulates. In some examples, the primer layer 98 may be omitted or there may be more than one primer layer 98. In examples having more than one primer layer 98, the primer layers 98 may be the same material or different materials, and/or the primer layers 98 may have the same thickness or different thicknesses. In some examples, there may be fewer or more coating layers 100. In examples having more than one coating layer 100, the coating layers 100 may be the same material or different materials, and/or the coating layers 100 may have the same thickness or different thicknesses.

As explained in more detail herein, in some examples, one or more of the coating layers 100 may be formed from a coating composition, and the coating composition may include trifunctional silane, silanol, and/or filler. In examples including one or more primer layers 98, the primer layer may be formed from a primer composition, which may include epoxy. In some examples, one or more of the primer composition or the coating composition may be at least partially cured to form a dry film layer. In some examples, the primer layer may be at least partially cured and form a mechanical bond with at least a portion of the component. In some examples, the coating composition may be configured to chemically bond with a cured primer composition including epoxy.

Figure 4:
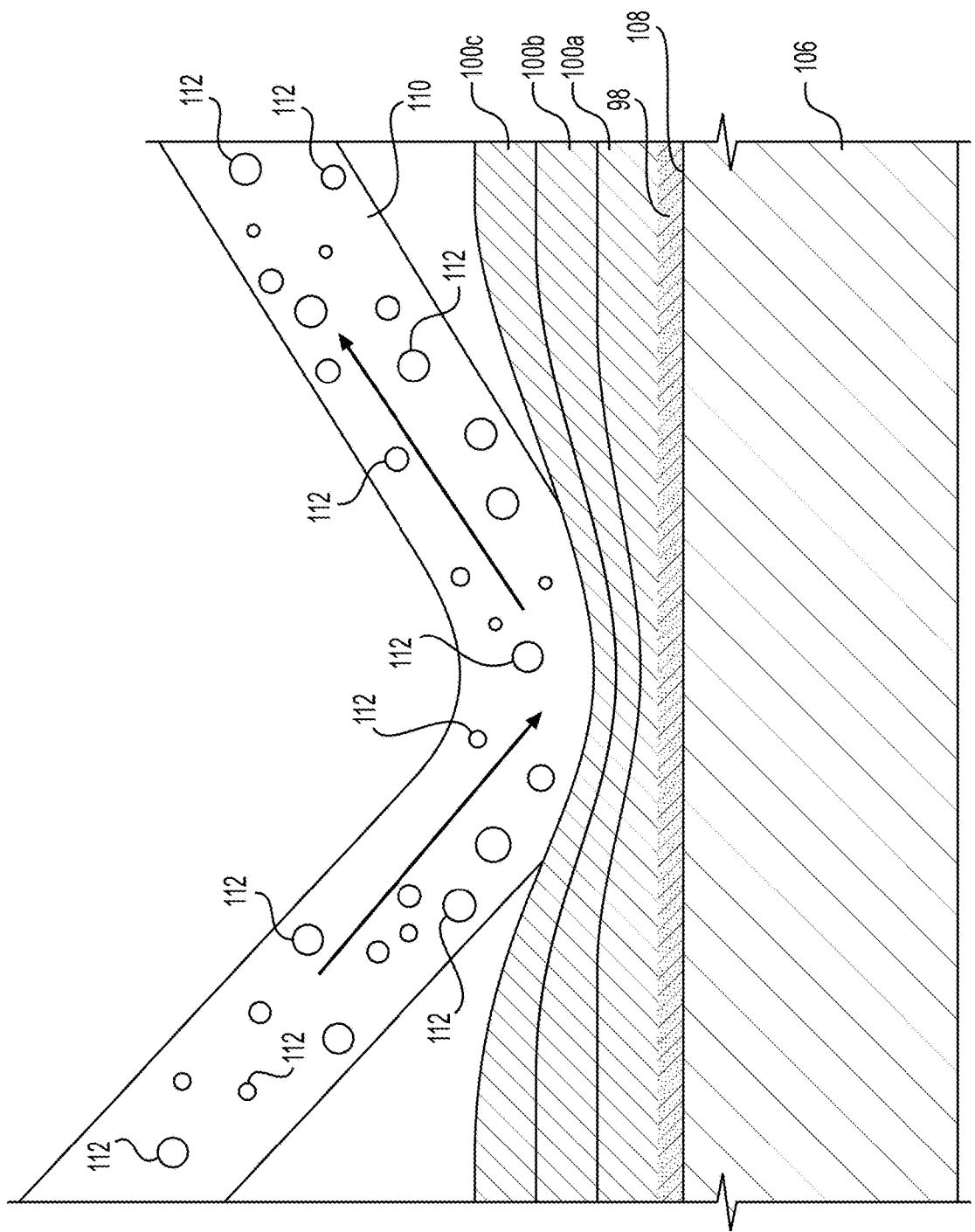
FIG. 4 is a partial cross-section schematic representation of an example flow iron component having an internal surface at least partially coated with a primer layer and coating layers and showing an example fluid flow directed at the internal surface and deflecting off the internal surface of the flow iron component according to the disclosure.

FIG. 4 is a partial cross-section schematic representation of an example flow iron component 106 having an internal surface 108 at least partially coated with a primer layer 98 and one or more coating layers 100 (e.g., coating layers 100a, 100b, and 100c, as shown) and showing an example fluid flow 110 directed at the internal surface 108 and deflecting off the internal surface 108 of the flow iron component 106. As shown in FIG. 4, the fluid flow 110 is an example fracking fluid including, for example, water, one or more agents and/or gels, and proppants 112, which may include grains of sand, ceramic beads or spheres, shells, and/or other similar particulates. As schematically depicted in FIG. 4, one or more of the coating layers 100 may be configured to compress and/or flex in response to the fluid flow 110 impacting the coating layers 100. As explained in more detail herein, the compression and/or flexing of one or more of the coating layers may result in the one or more coating layers 100 absorbing and/or dissipating energy associated with the fluid flow 110, which in at least some examples, may serve to protect the internal surface 108 of the flow iron component 106. In some examples, the energy associated with the fluid flow 106 may include heat energy and/or kinetic energy, which may result from, for example, the temperature of the fluid flow 110, the flow rate of the fluid flow 110, impact of the proppants 104 against the one or more coating layers 100, and/or impacts generated by cavitation of the fluid flow 110, as well as other possible forms of energy associated with the fluid flow. In at least some examples, the one or more coating layers 100 may also serve to reduce or eliminate any corrosive effects associated with the fluid flow 110.

Figure 5:
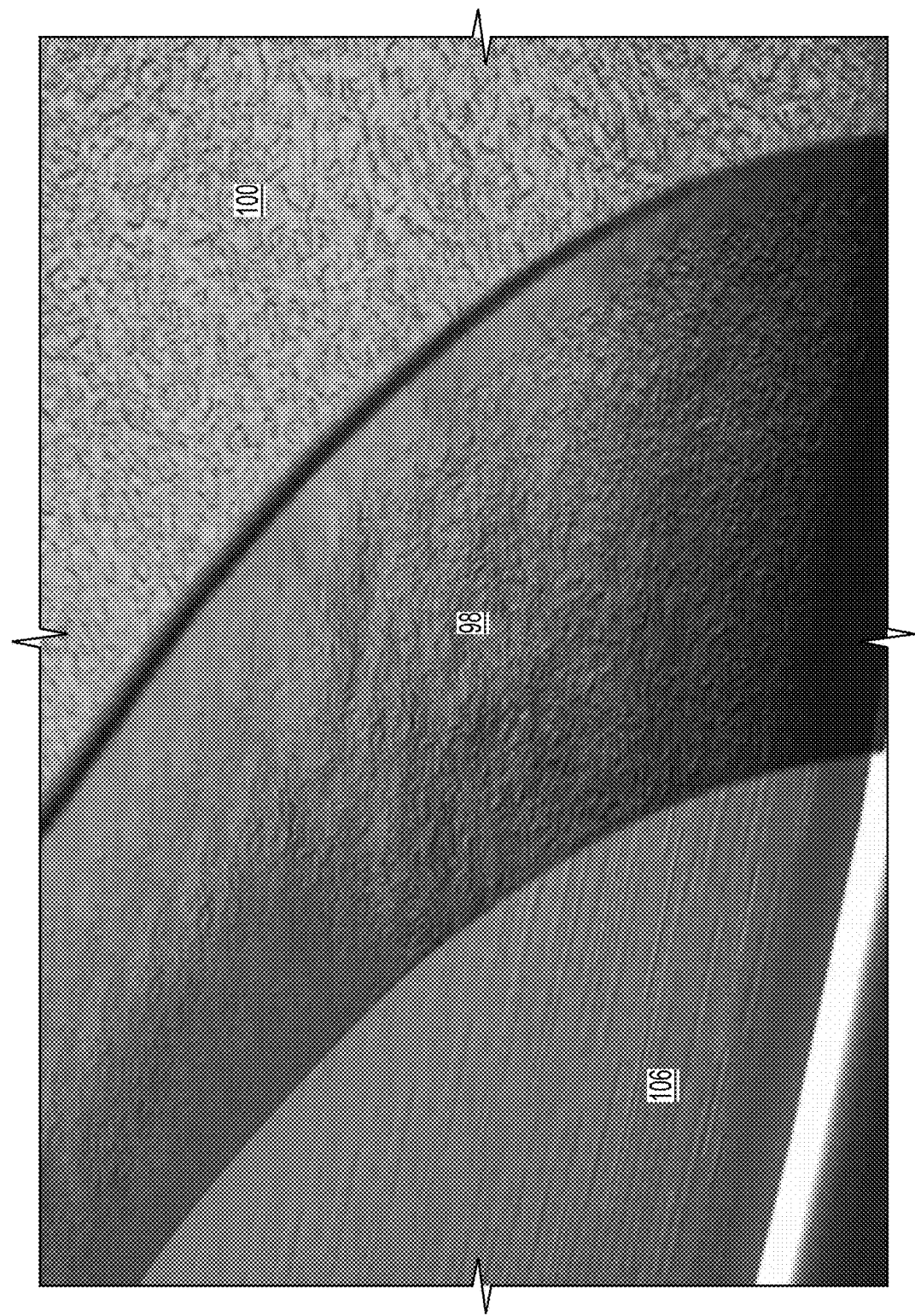
FIG. 5 is a schematic perspective view showing an uncoated portion of an oilfield component, a primer layer, and a coating layer on the primer layer according to the disclosure.
Figure 6:
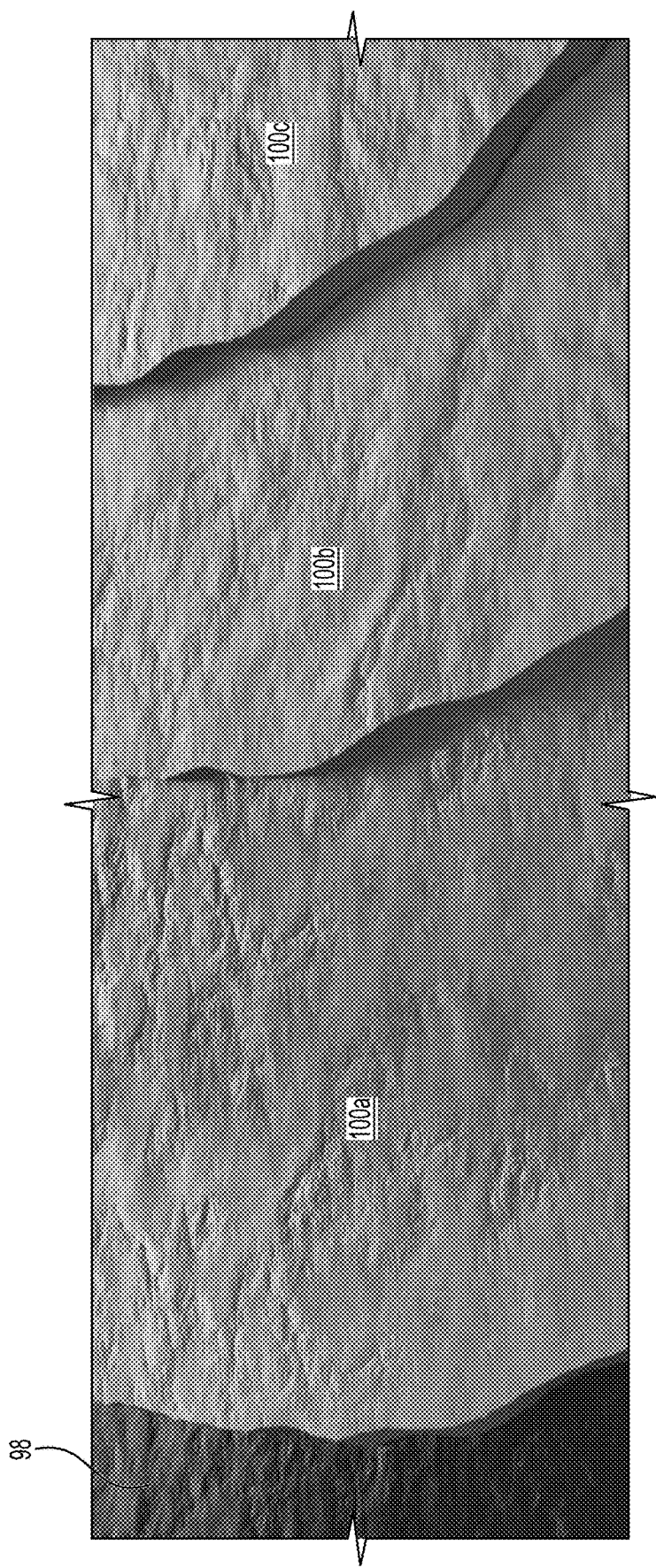
FIG. 6 is a schematic perspective view showing a primer layer, a first coating layer on the primer layer, a second coating layer on the first coating layer, and a third coating layer on the second coating layer according to the disclosure.

FIG. 5 is a schematic perspective view showing an uncoated portion of an oilfield operational component, such as a flow iron component 106, a primer layer 98 covering a portion of the flow iron component 106, and a coating layer 100 covering a portion of the primer layer 98 according to the disclosure. FIG. 6 is a schematic perspective view showing a primer layer 98 covering a portion of an oilfield operational component, such as a flow iron component 106, a first coating layer 100*a* covering a portion of the primer layer 98, a second coating layer 100*b* covering a portion of the first coating layer 100*a*, and a third coating layer 100*c* covering a portion of the second coating layer 100*b* according to the disclosure.

For example, a primer composition may be applied to the flow iron component 106, for example, as described herein, and may be at least partially cured (e.g., fully cured) to form the primer layer 98 bonded to the flow iron component 106 (e.g., forming a mechanical bond, a chemical bond, or a combination of a mechanical bond and a chemical bond). Thereafter, the coating composition may be applied to the at least partially cured primer layer 98, for example, as described herein, and may be at least partially cured (e.g., fully cured) to form the first coating layer 100*a* bonded to the primer layer 98 (e.g., forming a mechanical bond, a chemical bond, or a combination of a mechanical bond and a chemical bond with the primer layer 98). Thereafter, the coating composition may be applied to the at least partially cured first coating layer 100*a*, for example, as described herein, and may be at least partially cured (e.g., fully cured) to form the second coating layer 100*b* (e.g., forming a mechanical bond, a chemical bond, or a combination of a mechanical bond and a chemical bond with the first coating layer 100*a*). Thereafter, the coating composition may be applied to the at least partially cured second coating layer 100*b*, for example, as described herein, and may be at least partially cured (e.g., fully cured) to form the third coating layer 100*c* (e.g., forming a mechanical bond, a chemical bond, or a combination of a mechanical bond and a chemical bond with the second coating layer 100*b*). It is contemplated that in some embodiments the primer layer 98 may be omitted, and in other embodiments more than a single primer layer may be applied and at least partially cured as will be understood by those skilled in the art. It is contemplated that in some embodiments that fewer than three coating layers 100 may be applied and at least partially cured, and in other embodiments, more than three coating layers 100 may be applied and at least partially cured.

Figure 7:
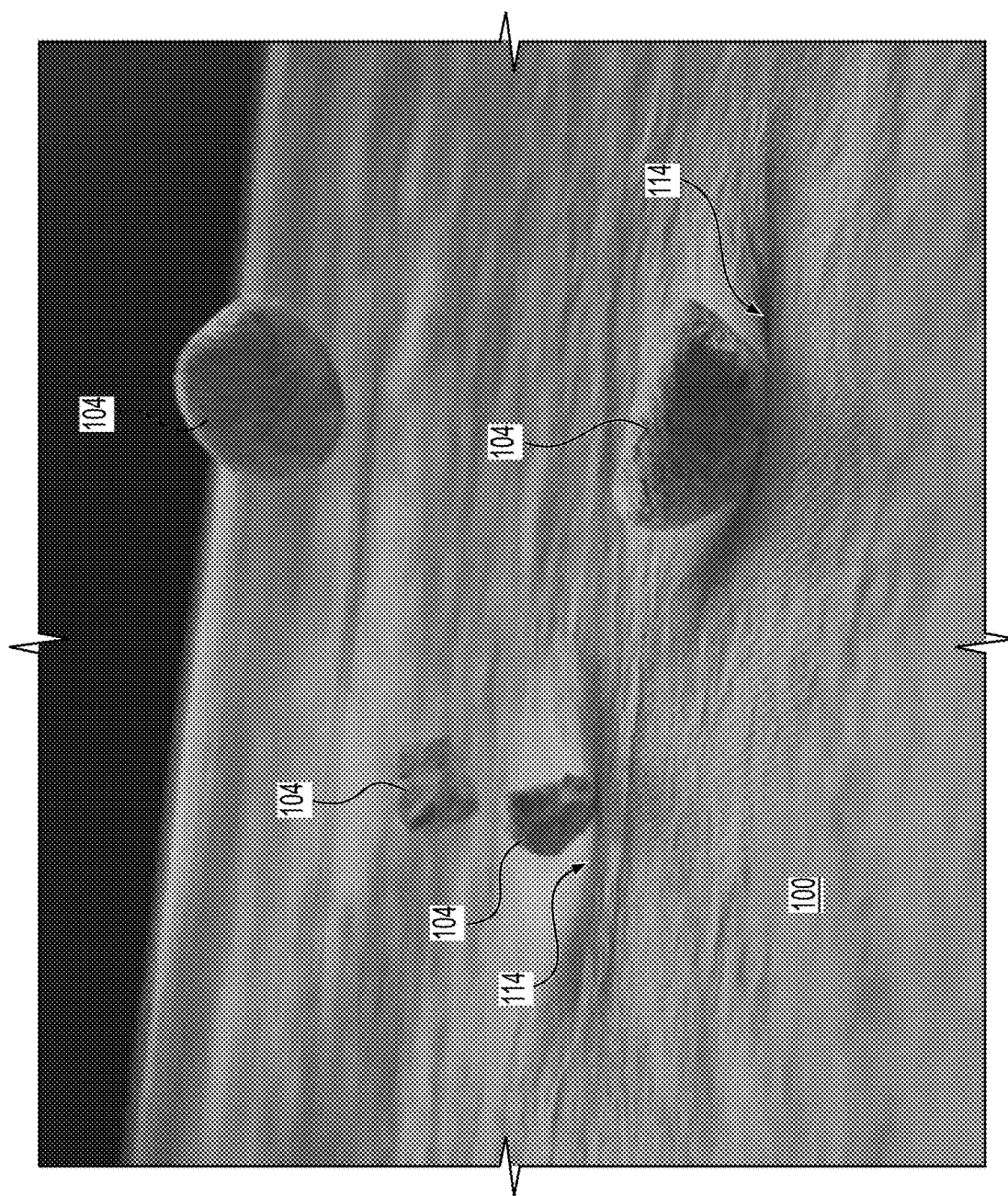
FIG. 7 is a schematic perspective view of example particles contacting an example coating layer according to the disclosure.

FIG. 7 is a schematic perspective view of example particles such as proppants 104 contacting an example coating layer 100 according to the disclosure. In some embodiments, the one or more coating layers 100 (and/or the one or more primer layers 98) may at least partially elastically deform, for example, to form elastic and/or resilient depressions 114 upon impact of particles such as proppants 104. For example, the one or more primer layers 98 and/or the one or more coating layers 100 may dissipate kinetic energy associated with the impact of particles as thermal energy and thereby inhibit particles before they reach the substrate, so that the impacting particles may not erode, chip, and/or deform the substrate (e.g., the oilfield operational component). Because, in at least some examples, the one or more coating layers 100 may absorb vibrational as well as kinetic energy, secondary vibrations that may be induced in the coating layer(s) 100 by impacting particles may be inhibited, which may prevent transmission of the secondary vibrations to the substrate. In addition, in at least some examples, the one or more coating layers 100 may be flexible, and thus, the one or more coating layers may not impede flexing of the component or impose additional mechanical stresses on a component that flexes as will be understood by those skilled in the art.

In at least some examples, the one or more coating layers 100 may be useful in protecting any fluid handling part from degradation by the surrounding environment. For example, the one or more coating layers may be configured to protect a fluid-handling part from erosion caused by particle impact, impingement, or cavitation. Erosion by particle impact may be caused by particles (e.g., proppants) entrained in the fluid flow, which may be either a gas flow or a liquid flow. Impingement may be an accelerated form of corrosion associated with bubbles entrained in the fluid flow. Cavitation may occur in incompressible fluids, such as water, and cavitation may involve the formation of bubbles caused by boiling of the fluid at a low pressure, along with the sudden collapse of the bubbles. The formation and collapse of a single such bubble may be considered a cavitation event. Thus, in some instances, more than one of the mechanisms of particle impact, impingement, and/or cavitation may substantially simultaneously act on a fluid handling part, such as a flow iron component.

In at least some examples of coating composition, the coating composition may include trifunctional silane. In at least some such examples, the trifunctional silane may include an acetoxy silane, a ketoximino silane, an enoxy silane, an amine silane, an alkoxy silane, and/or an alkenyl silane. In at least some such examples, the trifunctional silane may include ethyl triacetoxysilane and/or vinyl triacetoxysilane. In some such examples, the trifunctional silane may include methyl tris (methyl-ethyl-ketoximino) silane and/or vinyl tris (methyl-ethyl-ketoximino) silane.

In at least some examples of coating composition, the coating composition may include silanol, such as silanol fluid. In at least some such examples, the silanol fluid may include a polydialkylated siloxane, such as polydimethylsiloxane. For example, the silanol fluid may include a hydroxyl-terminated polydimethylsiloxane. In some such examples, the silanol fluid may have a kinematic viscosity ranging from about 90 centistokes to about 150,000 centistokes (e.g., from about 100 centistokes to about 130,000 centistokes, from about 200 centistokes to about 100,000 centistokes, from about 300 centistokes to about 90,000 centistokes, from about 400 centistokes to about 85,000 centistokes, or from about 500 centistokes to about 70,000 centistokes,). For a silanol fluid including linear chains and/or a unimodal molecular weight distribution, the silanol fluid may have a weight average molecular weight (MW) ranging from about 4,000 grams/mole (g/mol) to about 150,000 g/mol (e.g., from about 8,000 grams/mole to about 140,000 g/mol, from about 12,000 grams/mole to about 120,000 g/mol, or from about 10,000 grams/mole to about 100,000 g/mol) and/or a range of hydroxyl content ranging from about 0.8 wt % to about 0.02 wt % (e.g., from about 0.7 wt % to about 0.05 wt %, from about 0.6 wt % to about 0.10 wt %, or from about 0.5 wt % to about 0.15 wt %). In some examples, the silanol fluid may have a kinematic viscosity ranging from about 700 centistokes to about 130, 000 centistokes (e.g., with linear chains and a unimodal distribution), a viscosity of about of 700 centistokes (e.g., from about 500 centistokes to about 900 centistokes, or from about 600 centistokes to about 800 centistokes), a corresponding to MW about 18,000 g/mol, and a hydroxyl content of about 0.2 wt. %. In some examples, the silanol fluid may have a kinematic viscosity ranging from about 2,000 centistokes to about 130,000 centistokes (e.g., with linear chains and a unimodal distribution), a viscosity of about 2,000 centistokes (e.g., from about 1,500 centistokes to about 2,500 centistokes, or from about 1,750 centistokes to about 2,250 centistokes), a corresponding MW of about 35,000 g/mol, and a hydroxyl content of approximately 0.09 wt. %. In some examples, the silanol fluid may have a kinematic viscosity ranging from about 40,000 centistokes to about 130,000 centistokes (e.g., with linear chains and a unimodal distribution), a viscosity of 40,000 centistokes (e.g., from about 35,000 centistokes to about 45,000 centistokes, or from about 37,500 centistokes to about 42,500 centistokes), a corresponding MW of about 85,000 g/mol, and a hydroxyl content of about 0.04 wt. %.

In at least some examples, the coating composition may include one or more fillers. In at least some such examples, the one or more fillers may include fumed silica and/or reinforcing agents, such as, for example, glass fiber, mica, wollastonite, kaolin, and/or other phylosilicates. In at least some examples including fumed silica, the fumed silica may be treated with an agent before or during addition to the remainder of the coating composition. Examples of treatment agents include hexamethylenedisilazane, divinyltetramethylenedisilazane, chlorosilane, and/or polydimethylsiloxane. In at least some examples, the one or more fillers may include particles having a relatively high aspect ratio and/or a relatively high shape factor. For example, the filler may include mica, and mica platelets having a high square root of area-to-thickness ratio may be included in the coating composition. In at least some examples, the filler may include glass fibers, and glass fibers having a high length-to-diameter ratio may be included in the coating composition. In some examples, the filler may have an aspect ratio of at least 2, a shape factor of at least 2, or a length-to-diameter ratio of at least 2. In at least some examples, more than one type of filler may be included in the coating composition. For example, both fumed silica and mica may be included in the coating composition.

In at least some examples, the coating composition may include a catalyst, for example, to speed curing of the coating composition. In at least some such examples, more than a single catalyst may be incorporated into the coating composition. In at least some examples including a catalyst, the coating composition may include a tin catalyst, such as, for example, dibutyl tin dilaurate.

At least some examples of the coating composition may include one or more pigment agents. Pigment agents may be used to improve an aesthetic appearance of a coated fluid handling component and/or protect a fluid handling component from visible and/or ultraviolet light. In at least some examples, the coating composition may include one or more solvents, such as, for example, xylene and/or mineral spirits. Solvents may serve adjust (e.g., reduce) the viscosity of the coating composition, for example, in order to facilitate mixing and/or application of the coating composition to a fluid handling component. For example, one or more solvents may be included in the coating composition to facilitate application of the coating composition to a fluid handling component via spraying using a sprayer.

According to at least some examples, coating layers that are relatively softer and/or coating layers that have a relatively lower modulus may be relatively more effective at protecting fluid handling components, such as flow iron components, from damage and/or erosion by particle impact, impingement, and/or cavitation as compared to relatively harder coating layers and coating layers having a relatively higher modulus. In at least some examples, the coating compositions may be tailored and/or adjusted to form coating layers tailored for use in certain environments. For example, the relative hardness of a coating layer may be adjusted.

In at least some examples, a method for adjusting a hardness of a coating configured to protect at least a portion of component configured to be exposed to a fluid such as a fracking fluid may include preparing a coating composition. The coating composition may include, for example, an amount of trifunctional silane, an amount of silanol fluid, and an amount of filler. The method for adjusting the hardness of the coating layer may include at least one of: (1) increasing the amount of silanol fluid relative to at least one of the amount of trifunctional silane or the amount of filler to decrease the hardness of the coating, (2) decreasing the amount of silanol fluid relative to at least one of the amount of trifunctional silane or the amount of filler to increase the hardness of the coating, (3) increasing the amount of filler relative to at least one of the amount of trifunctional silane or the amount of silanol fluid to increase the hardness of the coating, or (4) decreasing the amount of filler relative to at least one of the amount of trifunctional silane or the amount of silanol fluid to decrease the hardness of the coating.

In at least some examples, the viscosity of the coating composition may be tailored and/or adjusted, for example, by changing the fraction of solvent (if any) included in the coating composition. For example, a relatively higher viscosity coating composition may be desirable when the coating composition is intended to be is manually applied, for example, by spreading the coating composition with a brush and/or spatula. A relatively lower viscosity coating composition may be desirable when the coating composition is intended to be applied, for example, via spraying onto a fluid handling part, such as a flow iron component.

In at least some examples, a method for adjusting the viscosity of a coating composition for application to at least a portion of an oilfield operational component configured to be exposed to a fluid such as a fracking fluid may include preparing a coating composition. The coating composition may include an amount of trifunctional silane, an amount of silanol fluid, an amount of filler, and an amount of solvent. The method for adjusting the viscosity of a coating composition may include one of: (1) increasing the amount of solvent relative to at least one of the amount of trifunctional silane, the amount of silanol fluid, or the amount of filler to reduce the viscosity of the coating composition, or (2) decreasing the amount of solvent relative to at least one of the amount of trifunctional silane, the amount of silanol fluid, or the amount of filler to increase the viscosity of the coating composition.

In at least some examples of the coating composition including trifunctional silane, silanol fluid, and filler, the trifunctional silane may comprise from about 0.01 wt % to about 20 wt % of the coating composition on the basis of non-solvent components, the silanol fluid may comprise from about 40 wt % to about 99 wt % of the coating composition on the basis of non-solvent components, and the filler (e.g., fumed silica) may comprise from about 0.01 wt % to about 25 wt % of the coating composition on the basis of non-solvent components. In some examples, the coating composition may also include one or more catalysts that comprise about 0.01 wt % to about 5 wt % of the coating composition on the basis of non-solvent components, and/or one or more pigments that comprise about 0.01 wt % to about 10 wt % of the coating composition on the basis of non-solvent components.

In at least some examples, the coating composition may include one or more solvents. For example, the coating composition may include from about 10 parts to about 300 parts by weight of xylene per 100 parts by weight of the non-solvent components of the coating composition to produce a solvent-inclusive coating composition, which may be applied in some examples via spraying onto a component. For example, about 100 parts by weight (e.g., 108 parts by weight) of xylene may be added to about 100 parts by weight of the non-solvent components of a coating composition to produce a solvent-inclusive coating composition.

In at least some examples of the coating composition including trifunctional silane, silanol fluid, and filler, the trifunctional silane may comprise from about 1.5 wt % to about 10 wt % of the coating composition on the basis of non-solvent components, the silanol fluid may comprise from about 60 wt % to about 95 wt % of the coating composition on the basis of non-solvent components, and the filler (e.g., fumed silica) may comprise from about 3 wt % to about 13 wt % of the coating composition on the basis of non-solvent components. In at least some such examples, the trifunctional silane may include an acetoxy silane and/or a ketoximino silane. In some examples, the coating composition may include one or more catalysts that comprise about 0.02 wt % to about 1 wt % of the coating composition on the basis of non-solvent components, and/or one or more pigments that comprise about 0.02 wt % to about 5 wt. % of the coating composition on the basis of non-solvent components.

In at least some such coating compositions, the coating composition may include one or more solvents. For example, the coating composition may include from about 20 parts to about 200 parts by weight of xylene per 100 parts by weight of the non-solvent components of the coating composition to produce a solvent-inclusive coating composition, which may be applied in some examples via spraying onto a component. For example, about 108 parts by weight of xylene may be added to about 100 parts by weight of the non-solvent components of a coating composition to produce a solvent-inclusive coating composition.

In at least some examples, the coating composition may include trifunctional silane, silanol fluid, and fumed silica. The trifunctional silane may comprise from about 2 wt % to about 7 wt % of the coating composition on the basis of non-solvent components, the silanol fluid may comprise from about 85 wt % to about 92 wt % of the coating composition on the basis of non-solvent components, and the fumed silica may comprise from about 5 wt % to about 10 wt % of the coating composition on the basis of non-solvent components. In at least some such examples, the trifunctional silane may include an acetoxy silane and/or a ketoximino silane. In at least some such examples, the coating composition may include one or more catalysts that comprise about 0.04 wt % to about 0.4 wt % of the coating composition on the basis of non-solvent components, and/or one or more pigments that comprise about 0.03 wt % to about 1 wt. % of the coating composition on the basis of non-solvent components.

In at least some such coating compositions, the coating composition may include one or more solvents. For example, the coating composition may include from about 60 parts to about 130 parts by weight of xylene per 100 parts by weight of the non-solvent components of the coating composition to produce a solvent-inclusive coating composition, which may be applied in some examples via spraying onto a component.

In at least some examples, the coating composition may include trifunctional silane, silanol fluid, and fumed silica. The trifunctional silane may comprise from about 2 wt % to about 7 wt % of the coating composition on the basis of non-solvent components, the silanol fluid may comprise from about 85 wt % to about 92 wt % of the coating composition on the basis of non-solvent components, and the fumed silica may comprise from about 5 wt % to about 10 wt % of the coating composition on the basis of non-solvent components. In at least some such examples, the trifunctional silane may include ethyl triacetoxysilane, vinyl triacetoxysilane, methyl tris (methyl-ethyl-ketoximino) silane, and/or vinyl tris (methyl-ethyl-ketoximino) silane.

In at least some examples, the coating composition may include trifunctional silane, silanol fluid, and fumed silica. In at least some such examples, the molar ratio of the trifunctional silane to the silanol fluid may range from about 5:1 to about 1,000:1, and/or the molar ratio of the fumed silica to the silanol fluid may range from about 10:1 to about 1,000:1, with the molecular weight of the fumed silica equal to the molecular weight of silicon dioxide for the purpose of the ratio calculation. In at least some examples of the coating composition, the molar ratio of the trifunctional silane to the silanol fluid may range from about 20:1 to about 300:1, and/or the molar ratio of the fumed silica to the silanol fluid may range from about 100:1 to about 300:1, with the molecular weight of the fumed silica equal to the molecular weight of silicon dioxide for the purpose of the ratio calculation.

A method for preparing a coating composition for application to at least a portion of an oilfield operational component to reduce damage induced by flow of a fracking fluid may include providing trifunctional silane, silanol fluid, and filler, and combining the trifunctional silane, the silanol fluid, and the filler. The method may further include mixing the trifunctional silane, the silanol fluid, and the filler to obtain the coating composition. In some examples, the coating composition may be configured to form a coating layer on the at least a portion of the component, and the coating layer may be configured to reduce damage induced by flow of fracking fluid. The mixing may include mixing the trifunctional silane, the silanol fluid, and the filler to obtain a substantially homogeneous coating composition. The method may also include providing a solvent and mixing the solvent with the coating composition. The solvent may include xylene, mineral spirits, and/or other petroleum distillates. In some examples, the solvent may comprise from about 10 parts to about 300 parts by weight for each 100 parts by weight of non-solvent components. The method, in some examples, may include providing a catalyst and mixing the catalyst with the coating composition. The catalyst may be a tin catalyst.

A method for providing a flexible coating on a surface of an oilfield operational component configured to be exposed to a flow of fracking fluid may include applying a primer composition to an oilfield operational component configured to be exposed to a flow of fracking fluid. In some examples, the primer composition may include epoxy. The method may also include at least partially curing the primer composition to obtain a primer layer having a dry film thickness ranging from about 20 micrometers to about 100 micrometers. The method may further include applying a first coating composition to the primer layer. The first coating composition may include at least one of trifunctional silane, silanol, or filler. The method may further include at least partially curing the first coating composition to obtain a first coating layer having a dry film thickness ranging from about 100 micrometers to about 250 micrometers. The method may also include applying a second coating composition to the first coating layer. The second coating composition may include trifunctional silane, silanol, and/or filler. The method may also include at least partially curing the second coating composition to obtain a second coating layer having a dry film thickness ranging from about 100 micrometers to about 250 micrometers. The primer layer, the first coating layer, and/or the second coating layer may be configured to reduce damage to the oilfield operational component from flow of a fracking fluid. In some examples of the method, the first coating composition and the second coating composition may be substantially the same. The method may also include applying at least one an additional coating composition to the second coating layer. The at least one additional coating composition may include trifunctional silane, silanol, and/or filler. The method may further include at least partially curing the at least one additional coating composition to obtain at least one additional coating layer. In some examples, the total dry film thickness of the first coating layer, the second coating layer, and the at least one additional coating layer may range from about 500 micrometers to about 1,000 micrometers. In some examples, at least two of the first coating composition, the second coating composition, or the at least one additional coating composition are substantially the same. In some examples, of the method, applying the at least one additional coating composition may include applying a third coating composition, and at least partially curing the at least one additional coating composition may include at least partially curing the third coating composition to obtain a third coating layer having a dry film thickness ranging from about 100 micrometers to about 250 micrometers.

A method for providing an elastic coating on a surface of an oilfield operational component configured to be exposed to a flow of fracking fluid may include applying a primer composition to an oilfield operational component configured to be exposed to a flow of fracking fluid. The primer composition may include epoxy. The method may also include at least partially curing the primer composition to obtain a primer layer having a dry film thickness ranging from about 20 micrometers to about 100 micrometers, and applying a first coating composition to the primer layer. The first coating composition may include trifunctional silane, silanol, and/or filler. The method may also include at least partially curing the first coating composition to obtain a first coating layer having a dry film thickness ranging from about 100 micrometers to about 250 micrometers. The method may further include applying at least one additional coating composition to the first coating layer. The at least one additional coating composition may include trifunctional silane, silanol, and/or filler. The method may also include at least partially curing the at least one additional coating composition to obtain at least additional coating layer. In some examples, the total dry film thickness of the first coating layer and the at least one additional coating layer may range from about 500 micrometers to about 1,000 micrometers. In some examples, the primer layer, the first coating layer, and/or the at least one additional coating layer may be configured to reduce damage to the oilfield operational component from flow of a fracking fluid.

It has been surprisingly found for at least some examples of the primer layers and/or the coating layers described herein that they are resistant to erosion by particle impact and/or by cavitation, and thus are effective in protecting fluid handling components, such as oilfield components, from such erosion by particle impact and/or cavitation. In at least some examples, the erosion resistance and erosion protection provided may be superior to many materials used in fluid handling components, for example, steel, aluminum, tungsten carbide, and nickel, as demonstrated by the testing results presented herein. At least some examples of the primer layers and/or the coating layers may be useful for providing protection against the effects of impingement and the effects of impacting particles, such as proppants. For example, as described herein, silanol chains cross-linked by trifunctional silanes may result in coatings that unexpectedly have useful properties, such as, for example, erosion resistance, and may significantly prolong the useful service life of a fluid handling component when used to protect the fluid handling component from the effects of particle impact, impingement, and/or cavitation.

Without wishing to be bound by theory, it is believed that for at least some examples, the primer layers and/or the coating layers described herein may protect a substrate from erosion and cracking by at least one of several possible mechanisms. For example, the primer layers and/or the coating layers may dissipate vibrational energy associated with cavitation on or near the substrate as thermal energy. In at least some such instances, the vibrational energy may not reach the substrate and may not induce the formation of micro-cracks, which may ultimately result in failure in the substrate. Moreover, the primer layers and/or the coating layers may dissipate kinetic energy associated with the impact of a particles as thermal energy, and thereby inhibit particles before they reach the substrate, so that the impacting particles cannot erode, chip, and/or deform the substrate. Because, in at least some examples, the coating layer may absorb vibrational as well as kinetic energy, secondary vibrations that may be induced in the coating layer by impacting particles may be inhibited, which may prevent transmission of the secondary vibrations to the substrate. In addition, in at least some examples, the coating layer may be flexible, and thus, the coating layer may not impede flexing of the fluid handling component or impose additional mechanical stresses on a fluid handling component that flexes.

For at least some examples, it is believed that the primer layer and/or coating layer's protection of a substrate, long operating life, and flexibility may be enhanced by the relatively viscoelastic nature of the primer layer and/or coating layer. This characteristic may help dissipate kinetic and/or vibrational energy by converting it/them to thermal energy. The elastic nature of the primer layer and/or the coating layer may allow the primer layer and/or the coating layer to be temporarily deformed by impacting particles and substantially return to its/their original shape within a relatively short time period. The viscoelastic nature of the primer layer and/or the coating layer may arise from the molecular structure of the primer layer and/or the coating layer. For example, a silanol fluid may be a hydroxyl-terminated polydialkyl siloxane, for example, polydimethylsiloxane chains terminated at the ends with hydroxyl groups (PDMS-OH). When not subjected to stress, a silanol chain may be in a random coil configuration. When subjected to stress, however, the chain may extend but thereafter return to its random coil configuration when the stress is relieved.

It is also believed that the trifunctional silanes may function as cross-linking agents. For example, the trifunctional silanes may react with hydroxyl groups on components of the coating composition to form covalent bonds. When the total number of trifunctional silanes is in excess of the total number of hydroxyl groups on the components of the coating composition, all hydroxyl groups may be replaced by functional groups from the trifunctional silanes. For example, a trifunctional silane may react with hydroxyl groups on the silanol chains, and after a silanol chain has reacted with trifunctional silane, the silanol chain may be referred to as a functionalized siloxane chain. For example, a triacetoxylated silane may react with a hydroxyl group on a silanol chain to displace the hydroxyl group, release acetic acid, and/or bond to form a siloxane chain with an additional silicon atom and two acetoxy groups at the site were the hydroxyl group was previously located. When hydroxyl-terminated silanol chains are used, acetoxy-terminated siloxane chains may be formed. The trifunctional silanes may also react with hydroxyl groups on other components of the coating composition, for example, hydroxyl groups on a filler and hydroxyl groups on a pigment, to form functionalized components.

It is believed that when the total number of trifunctional silanes is in excess of the total number of hydroxyl groups on the components of the coating composition, such that all hydroxyl groups are replaced by functional groups from the trifunctional silanes (e.g., acetoxy groups), and no water is present, essentially no further reactions among the functionalized siloxane chains (e.g., other functionalized components, such as functionalized filler or functionalized pigment) and the trifunctional silanes may take place. Thus, the coating composition may remain liquid as long as it is protected from moisture. However, when the coating composition is exposed to water, for example, when the coating composition is applied to the surface of a fluid-handling part and has contact with moisture in the air, further reaction may occur. For example, in the case of acetoxylated siloxane chains, the water is believed to react with the acetoxy groups to form acetic acid and replace the acetoxy group with a hydroxyl group. The hydroxyl groups on siloxane chains may thereafter react with remaining acetoxy groups on the siloxane chains to release acetic acid and form bonds between siloxane chains. Similarly, bonds may be formed among other components of the composition (e.g., filler and/or pigment), which were functionalized, and the siloxane chains. In at least some examples, there is no need for artificially generated heat to be applied in order to cure the coating layer. Because the trifunctional silanes used to form crosslinks have three functional sites to which a hydroxyl group on a siloxane chain may bond, a network of chains may be formed. In at least some examples, it may be desirable for the siloxane chains to bond with filler and/or pigment through reaction of hydroxyl groups with functional groups (e.g., acetoxy groups). The filler and/or pigment may serve as additional crosslink sites, onto which many siloxane chains may attach. In at least some examples, the siloxane (e.g., the siloxane chains) may be is ultraviolet-resistant, oxidation-resistant, hydrophobic, nontoxic, chemically inert, and/or may exhibit anti-valent properties. In at least some examples, the it may perform well across a relatively wide range of temperatures and/or may exhibit relatively high vapor permeability.

According at least one hypothesis, the coating layer may have a viscoelastic nature, and when a particle impacts the surface of the coating layer, the resulting stress temporarily deforms the coating layer and stretches the siloxane chains. In the process of deforming, the chains rub against each other, and through friction, a portion of the energy of the impact is converted to thermal energy. This conversion to thermal energy through inter-chain friction may account for the viscous nature of the coating layer. After impact, the siloxane chains may recoil, and during the recoiling, the chains may rub against each other, so that the remainder of the energy imparted to the coating layer through the particle impact may be converted to thermal energy. During the stretching and recoiling, the crosslinks may act to preserve the topology of the linked siloxane chains in the coating layer, so that the coating layer returns to its original shape prior to the particle impact. It is believed this chain stretching and/or recoiling action may account for the elastic nature of the coating layer. The processes of chain stretching, recoiling, and interchain friction are also believed to be responsible for the conversion of vibrational energy to thermal energy (e.g., vibrational energy associated with a cavitation event). According to this hypothesis, the viscoelastic nature of the coating layers may promote the ability of the coating layers to resist the effects of, and protect a substrate from, particle impact, impingement, and/or cavitation.

In at least some examples described herein, a coating composition may include any trifunctional silane and silanol fluid. In at least some examples, specific components may be selected to control the physical and chemical properties of the coating layers formed from the coating composition, and a coating composition may be tailored to a specific use or desired result. For example, in certain uses, it may be desirable for a coating layer to be able to stop or protect a substrate from particles having high kinetic energy. In at least some such instances, silanol chains having a relatively lower molecular weight may be used, for example, so that a high cross-link density may be achieved. The large number of cross-links per unit volume may serve to prevent too great of a deformation of the material upon particle impact and allow the energy of a particle impact to be effectively distributed among a large number of chains to reduce the likelihood that one chain is stretched to the breaking point. Other uses may render it desirable for coating layers that transmit relatively less vibration to the surface of the fluid handling component, or render it desirable that coating layers accommodate flexing of a fluid handling component. It is believed that such uses may sometimes render it desirable to use silanol chains having relatively higher molecular weight, so that a material having a relatively low cross-link density and/or a relatively low modulus may be formed. Thus, for at least some examples, it may be possible to achieve a relative balance between hardness and resiliency of a coating layer for a specific use, for example, by adjusting the molecular weight of at least some of the silanol chains.

A method for adjusting the hardness of a coating configured to protect at least a portion of component configured to be exposed to a fracking fluid may include preparing a coating composition including an amount of trifunctional silane, an amount of silanol fluid, and an amount of filler. The method may further include at least one of: (1) increasing the amount of silanol fluid relative to at least one of the amount of trifunctional silane or the amount of filler to decrease the hardness of the coating; (2) decreasing the amount of silanol fluid relative to at least one of the amount of trifunctional silane or the amount of filler to increase the hardness of the coating; (3) increasing the amount of filler relative to at least one of the amount of trifunctional silane or the amount of silanol fluid to increase the hardness of the coating; or (4) decreasing the amount of filler relative to at least one of the amount of trifunctional silane or the amount of silanol fluid to decrease the hardness of the coating.

A method for adjusting a viscosity of a coating composition for application to at least a portion of an oilfield operational component configured to be exposed to a fracking fluid may include preparing a coating composition including an amount of trifunctional silane, an amount of silanol fluid, an amount of filler, and an amount of solvent. The method may also include one of: (1) increasing the amount of solvent relative to at least one of the amount of trifunctional silane, the amount of silanol fluid, or the amount of filler to reduce the viscosity of the coating composition; or (2) decreasing the amount of solvent relative to at least one of the amount of trifunctional silane, the amount of silanol fluid, or the amount of filler to increase the viscosity of the coating composition.

In some examples, the coating composition may be applied directly to the surface of a substrate, such as a fluid handling component. In some examples, a primer layer may be applied to the surface of the substrate to improve adhesion of the one or more coating layers to the substrate. Such primer layers may be an epoxy primer. For example, an epoxy primer composition may be applied to the surface of the substrate and allowed to partially and/or at least substantially cure to form a primer layer. The coating composition may thereafter be applied to the primer layer. In some examples, the primer composition may include an epoxy blend and/or an aliphatic amine. In some examples, the epoxy blend may include epichlorohydrin and a bisphenol (e.g., Bisphenol-F, for example, EPON® Resin 862, manufactured by Resolution Performance Products LLC, which may be a suitable epoxy blend). An example of a suitable aliphatic amine is, for example, EPIKURE™ Curing Agent 3218, manufactured by Resolution Performance Products LLC. In some examples, the primer composition may also include a silane adhesion promoter, such as, for example, a trimethoxysilane, a triethoxysilane, and/or 3-glycidoxypropyltrimethoxysilane. In at least some examples, the adhesion promoter is believed to enhance the chemical bonding of a coating layer including silicone with the primer layer. In some examples, the primer composition may also include other components, for example, to control viscosity and/or facilitate application of the primer composition to the substrate. For example, the primer composition may include a leveling agent, a solvent, and/or a pigment. The leveling agent may be a modified urea formaldehyde in butanol (e.g., CYMEL® U-216-8 resin manufactured by Cytec Industries Inc.). The solvent may include a mixture of 2-ethoxyethanol and xylene.

In some examples, the primer composition may include an epoxy blend ranging from about 20 wt % to about 95 wt %, include an adhesion promoter ranging from about 0.5 wt % to about 10 wt %, include an aliphatic amine ranging from about 1 wt % to about 20 wt %, and include a leveling agent, solvent, and/or pigment ranging from about 0.01 wt % to about 70 wt %. In some examples, the primer composition may include about 26 wt % EPON® Resin 862, about 3.7 wt % 3-glycidoxypropyltrimethoxysilane, about 6.8 wt % EPIKURE™ Curing Agent 3218, about 0.78 wt % CYMEL® U-216-8 resin, about 42 wt % 2-ethoxyethanol, about 13.2 wt % xylene, and about 7.8 wt. % pigment.

In some examples, before applying a primer composition to a surface of a fluid handling component, the surface is prepared according to at least one of several steps. For example, the surface may be cleaned of all foreign matter, such as dust, lint, oils, waxes, corrosion products, oxidation, and/or water. The surface may be prepared by grit-blasting, which may remove foreign matter and provide a mechanical profile, which may promote adhesion. Residual dust may be removed via forced air (e.g., a blowgun). In some examples, after grit-blasting, wiping the surface with a cloth or the like may be avoided, for example, so as to avoid contaminating the surface with lint. In some examples, the primer composition may be applied within eight hours of preparing the surface, for example, to prevent oxidation of the prepared surface.

In some examples, components of the primer composition may be mixed and allowed to react for a time period ranging from about 20 minutes to about 30 minutes, before applying the primer composition to the surface of the component. The primer composition may be applied to the surface of the oilfield operational component (or a fluid handling component thereof) by spraying the primer composition onto the surface, brushing and/or spreading the primer composition onto the surface, and/or dipping the oilfield operational component into the primer composition. In some examples, when the primer composition is applied by spraying, conventional spray equipment may be used. In some examples, the spray equipment may be of the high-volume, low-pressure (HVLP) type. The cup pressure may be set to range from about 10 pounds per square inch (psi) to about 20 psi, and the air pressure may be set to range from about 30 psi to about 40 psi, for example, to enhance atomization.

After the primer composition has been applied to the fluid handling component, the primer composition may be allowed to cure for a period of time to form the primer layer. In some examples, the primer composition may be allowed to at least substantially cure. In some examples, the primer composition may be allowed to cure for eight hours or longer. In some examples, the primer composition may be allowed to cure for twelve hours or longer. In some examples, the primer layer may be tested for adequate cure, for example, by rubbing the primer layer with a solvent-soaked cloth. When adequately cured, the appearance of the primer layer may generally be unaffected by the solvent and the cloth may not generally pick up any of color of the primer layer. In some examples, the primer composition may be applied to have a dry film thickness (e.g., a thickness after evaporation of solvent and/or after cure) ranging from about 20 micrometers (μm) to about 80 μm. In at least some examples, it is believed that when the coating composition is applied over the primer layer, unreacted functional groups in the coating composition may react with unreacted functional groups in the primer layer, thereby resulting in chemical bonding between the functional groups.

Example techniques for applying the coating composition to a surface of a fluid handling component may include, for example, spraying the coating composition onto the surface, brushing and/or spreading the coating composition on the surface, and/or dipping the surface into a supply of the coating composition. In some examples, the thickness of a coating layer from which solvent has evaporated and which has at least partially cured (i.e., the dry film thickness) may range from about 200 μm to about 3,000 μm. In some examples, a coating layer may have a total dry film thickness ranging from about 500 μm to about 1,000 μm. In some examples, the coating composition may be applied by spraying using HVLP spraying equipment. In some examples, the cup pressure may be set to range from about 15 psi to about 30 psi, and the air pressure may be set to range from about 35 psi to about 50 psi. In some examples, the coating composition may be diluted by including xylene and/or mineral spirits. In some examples, airless spray equipment may be used to apply the coating composition. In some such examples, the pressure settings of the equipment may range from about 2,000 psi to about 3,300 psi. For example, the pressures may range from about 3,000 psi to about 3,300 psi. The airless spray technique may reduce the fraction of solvent required as compared to the fraction of solvent required for spraying with HVLP spraying equipment.

In some examples, dry film thicknesses of less than about 200 μm may be obtained through a single transfer of the coating composition to the surface. The term "transfer" is used to denote the deposition of a single layer of the coating composition onto the surface of a substrate, such as an oilfield component. For complex and/or vertical surfaces, or to obtain a dry film thickness of greater than about 200 μm, the coating composition may be applied in multiple thin layers. In some examples, the coating composition may be applied to interior surfaces, such as interior surfaces of a pipe or other component through which fluid may flow. In some examples, an initial layer of the coating composition may be applied to achieve a dry film thickness ranging from about 70 μm to about 100 μm. The initial layer may be allowed to dry substantially completely and at least substantially cure through the complete thickness of the coating layer. In some examples, substantially full curing may take from about two hours to about three hours. In some examples, it may be important to not apply an additional layer of the coating composition prior to substantial curing, because insufficient curing may induce the previously applied coating layer to separate from the surface and/or the primer layer, which may affect adhesion of one or more of the coating layers to the substrate. In some examples, a subsequent layer may be applied, and the subsequent layer may have a dry film thicknesses of up to about 500 μm. In some examples, after this subsequent coating layer is inspected for separation from the surface or another coating layer, additional subsequent coating layers may be applied at about one hour intervals. In some examples, additional subsequent coating layers may be applied to obtain a dry film thicknesses of the coating layers of up to about 500 μm. In some examples, an initial coating layer having a dry film thickness ranging from about 70 μm to about 100 μm may be sprayed onto the surface of the component. This initial coating layer may be allowed to at least substantially cure. A subsequent coating layer may thereafter be sprayed onto the surface of the oilfield operational component and allowed to at least substantially cure to obtain a total dry film thickness of the coating layers ranging from about 200 μm to about 600 μm. In some examples, additional subsequent layers may be sprayed onto the surface of the oilfield operational component and allowed to at least substantially cure to obtain a total dry film thickness of the coating layers ranging from about 200 μm to about 3,000 μm.

In some examples, a method for maintaining protection of an oilfield operational component against erosion by particle impact, impingement, and/or cavitation may include repairing and/or replacing one or more coating layers. The one or more coating layers may eventually become worn after a prolonged period of time, and in some instances, may be damaged as a result of large and/or sharp objects impacting the coating layers or other occurrences. In some examples, a new coating layer may be applied directly to the worn or damaged coating layer and may generally exhibit strong adhesion to the previously applied coating layer. In some examples, a damaged coating layer on an oilfield operational component may be is repaired by applying a coating composition over the worn or damaged coating layer and allowing the applied coating composition to substantially dry and at least substantially cure. In some examples, one or more worn or damaged coating layers may be stripped from the oilfield operational component before applying and curing the coating composition. In some examples, the worn or damaged coating layer may be removed by soaking at least the affected portion of the oilfield operational component in, for example, mineral spirits for a period of time of two or more hours, which may result in the coating layer swelling, and thereafter scraping or otherwise removing the damaged coating layer from the surface of the component. In some examples, the damaged coating layer may be removed via a focused water jet to cut through the coating layer and lift the coating layer from the component. In some such examples, the water jet may be discharged at a pressure of about 2,000 psi or more.

For a coated component having a primer layer under the worn or damaged coating layer that has been exposed by the worn or damaged coating layer, in some examples, the old primer layer may be at least partially removed before a coating composition for a new coating layer is applied. Although the coating composition may adhere strongly to a previously applied coating layer, a new coating layer, in some examples, may not adhere as strongly to an old primer layer. Thus, in some examples, it may be advantageous to at least a partially remove the old primer layer prior to applying a new coating layer. In some examples, an old primer layer may be removed by grit blasting, and thereafter in some examples, the coating composition may be directly applied to the surface of the component, or in some examples, primer composition may be applied to the exposed surface of the oilfield operational component to form a new primer layer before applying the coating composition. In some examples, the surface of the original primer layer (e.g., the primer layer under the worn or damaged coating layer) may be prepared (e.g., by lightly grit-blasting the original primer layer to expose a previously-unexposed portion of the primer layer), and thereafter, primer composition may be applied to the prepared surface of the original primer layer.

For a coated component having one or more coating layers that suffer damage over a relatively small area, in some examples, in at least some instances, it may be more economical to repair the one or more coating layers in the small area as compared to applying the coating composition to the entire surface of the component. In some examples, when damage is present at only a relatively small area (e.g., the damage is limited to an area of than 6 millimeters across or less), and when the primer layer of the oilfield operational component is not exposed, the damaged area may be cleaned, for example, to remove foreign matter, a layer of coating composition may be applied, and the coating composition may be allowed to at least substantially cure. For examples in which the primer layer and/or the surface of the oilfield operational component is exposed, primer composition may be applied and allowed to at least substantially cure before applying coating composition. In some examples, when damage extends over a relatively larger area (e.g., the damage (e.g., a hole) is present in an area of 6 millimeters or greater across), the damaged area may be treated or filled with, for example, epoxy mastic. In some such examples, epoxy mastic may be worked into the damaged area with a putty knife and leveled off such that the surface of the epoxy mastic ranges from about 0.5 millimeters to about 1 millimeter below a desired final surface. Thereafter, the epoxy mastic may be allowed to at least substantially cure. In some examples, the epoxy mastic may be selected to include adhesion-promoting silanes, so that once the epoxy mastic has cured, coating composition may be applied directly to the surface of the epoxy mastic without prior application of a primer layer. In some examples, primer composition may be applied to cured epoxy mastic. After the primer composition dries and cures to form a primer layer, the coating composition may be applied. When small areas of damage are repaired, the coating composition may be prepared as a paste, for example, by not including solvent (or not including as much solvent). In such examples, the coating composition paste may be applied by using a caulking gun, putty knife, and/or a brush, and the coating composition paste may be leveled with a putty knife. In some examples where relatively larger areas of damage are repaired, the coating composition may include solvent and may be applied via spraying.

A method for repairing damage to a coating on an oilfield operational component configured for use in an oilfield operation may include exposing at least a portion of a first primer layer associated with a damaged portion of the coating, and removing at least a portion of the first primer layer to expose a surface of the component. In some examples, the method may further include applying a primer composition to the surface of the oilfield operational component and at least partially curing the primer composition to obtain a second primer layer bonded to the surface of the component. The method may also include applying a coating composition to the second primer layer and at least partially curing the coating composition, such that the coating composition at least partially chemically bonds with the second primer layer. In some examples, exposing the at least a portion of the first primer layer may include applying mineral spirits to the coating and scraping at least a portion of the coating to expose the portion of the first primer layer. In some examples, removing the at least a portion of the first primer layer may include grit-blasting the first primer layer.

A method for replacing at least a portion of a first coating from an oilfield operational component configured for use in an oilfield operation may include removing at least a portion of the first coating from the oilfield operational component and exposing at least a portion of the component. The method may also include cleaning the portion of the oilfield operational component and applying a primer composition to the portion of the component. The method may further include at least partially curing the primer composition to form a primer layer at least partially mechanically bonded to the portion of the component, and applying a coating composition to the primer layer. The method may also include at least partially curing the coating composition to form a coating layer at least partially chemically bonded to the primer layer. In some examples, cleaning the portion of the oilfield operational component may include heating the portion of the oilfield operational component at a temperature of at least about 650° F. for at least about five hours.

Some examples of the method may also include grit-blasting the portion of the oilfield operational component prior to applying the primer composition. The method may also include drying the primer composition for at least twelve hours, at least eighteen hours, or at least twenty-four hours prior to applying the coating composition to the primer layer. In some examples, the method may include drying the coating composition for at least six hours, at least nine hours, or at least twelve hours and applying a second layer of the coating composition to the coating layer. The method may further include at least partially curing the second layer of the coating composition to form a second coating layer. In some such examples, the method may also include drying the second coating layer for a time period of at least one hour. Thereafter, some examples of the method may also include applying a third layer of the coating composition to the second coating layer, and at least partially curing the third layer of the coating composition for at least twelve hours, at least twenty-four hours, or at least thirty-six hours to form a third coating layer.

In some examples, one or more primer layers and/or one or more coating layers may be used to protect surfaces of components formed from various materials. For example, the primer layer and/or coating layer may be effective in protecting surfaces of metal, ceramic, and/or polymer. For example, surfaces of steel alloy, stainless steel alloy, aluminum alloy, nickel alloy, titanium alloy, lead alloy, and/or other similar materials may be protected. In some examples, surfaces of urethane, epoxy, polycarbonate, acrylic, polyester composite, epoxy composite, and/or other similar materials may be protected. These materials are merely examples, and it is contemplated that the surfaces of other materials known to those skilled in the art may be protected. In some examples, the primer layer and/or coating layer may exhibit effective resistance to degradation by elevated temperature.

In some examples, the fractions of components in the primer composition and/or the coating composition may be adjusted, for example, so that the primer composition and/or the coating composition may be suitable for any one of a range of application methods, such as, for example, spraying, as well as methods often associated with one-off production, such as brushing and/or spreading. In some examples, no special heat treatment is required to cure the primer composition and/or the coating composition. Once applied to the component, the primer composition and/or the coating composition may only need to be exposed to the air (e.g., at temperatures close to room temperature).

In some examples, a method for increasing the service life of an oilfield operational component configured to be used in an oilfield operation may include at least partially coating the oilfield operational component to obtain a first coating layer on the component. The method may also include incorporating the oilfield operational component into an oilfield operation, and exposing the oilfield operational component to fluid flow in the oilfield operation for a first period of time. The method may further include at least partially removing at least a portion of the first coating layer from the component, and at least partially coating the oilfield operational component to obtain a second coating layer on the component. In at least some examples, the first coating layer and/or the second coating layer may include trifunctional silane, silanol fluid, and filler. In some examples, the first coating layer and/or the second coating layer may be configured to reduce a wear-rate of the oilfield operational component that is to be exposed to fluid flow associated with the oilfield operation. In some examples, the first period of time may range from about 500 hours to about 2,000 hours. In some examples, the method may also include exposing the oilfield operational component to fluid flow in the oilfield operation for a second period of time after at least partially coating the oilfield operational component to obtain the second coating layer on the component. The second period of time may range from about 500 hours to about 2,000 hours. A ratio of the first period of time to the second period of time may range from about 1.0 to about 1.5.

In some examples, the method may further include applying a primer composition to at least a portion of the oilfield operational component prior to at least partially coating the component. In some such examples, the method may further include at least partially curing the primer composition prior to at least partially coating the oilfield operational component to form a bond between the primer composition and the component. Some examples may also include at least partially curing the coating composition to form a chemical bond between the coating composition and the primer composition.

In some examples of the method, it may further include at least partially removing at least a portion of the second coating layer from the component, and at least partially coating the oilfield operational component to obtain a third coating layer on the component. In some examples, the third coating layer may include trifunctional silane, silanol fluid, and filler, and the third coating layer may be configured to reduce a wear-rate of the oilfield operational component as exposed to fluid flow associated with the oilfield operation. In some examples, the method may further include exposing the oilfield operational component to fluid flow in the oilfield operation for a third period of time after at least partially coating the oilfield operational component to obtain the third coating layer on the component. The third period of time may range from about 500 hours to about 2,000 hours. A ratio of the first period of time and/or the second period of time to the third period of time may range from about 1.0 to about 1.5.

Example 1

Examples of coating compositions for protecting fluid handling components are presented in Table 1 below. The example coating compositions include trifunctional silane, silanol fluid, a filler, a pigment, a catalyst, and a cross-linking agent. Dow Corning 3-0134 Polymer, manufactured by Dow Corning Corp., was used for the silanol fluid. Dow Corning 3-0134 Polymer contains 400 ppm of hydroxyl groups and has a viscosity of 50,000 centistokes. Cabot TS-530, which is surface-treated and is manufactured by Cabot Corp., was used for the fumed silica. A transition-metal ferrite spinel powder having a median particle size less than 1 μm, F-6331-2 Black Ferro, manufactured by Ferro Corporation, was used as the pigment. The catalyst for all examples is dibutyl tin dilaurate. Four different cross-linking agents were used for the set of compositions presented in Table 1. Coating composition examples 1-13 include ethyl triacetoxy silane as the cross-linking agent. Coating composition example 14 includes vinyl triacetoxy silane as the cross-linking agent. Coating composition example 15 includes methyl tris (methyl-ethyl-ketoximino) silane as the cross-linking agent. Coating composition example 16 includes vinyl tris (methyl-ethyl-ketomino) silane as the cross-linking agent.

TABLE 1

| Example | Silanol wt % | Fumed silica wt % | Pigment wt % | Catalyst wt % | Cross-linking agent wt % |
|---|---|---|---|---|---|
| 1 | 87% | 8.3% | 0.39% | 0.11% | 4.6% |
| 2 | 87% | 8.3% | 0.39% | 0.11% | 2.8% |
| 3 | 87% | 8.3% | 0.39% | 0.11% | 3.7% |
| 4 | 87% | 8.3% | 0.39% | 0.11% | 5.4% |
| 5 | 83% | 8.1% | 0.38% | 0.11% | 7.2% |
| 6 | 83% | 7.9% | 0.38% | 0.11% | 8.9% |
| 7 | 91% | 4.9% | 0.40% | 0.11% | 4.9% |
| 8 | 83% | 10.4% | 0.38% | 0.11% | 4.5% |
| 9 | 83% | 12.6% | 0.38% | 0.11% | 4.5% |
| 10 | 79% | 15.2% | 0.35% | 0.10% | 4.2% |
| 11 | 78% | 18.0% | 0.35% | 0.10% | 4.1% |
| 12 | 79% | 7.5% | 0.35% | 0.10% | 13.5% |
| 13 | 78% | 7.3% | 0.35% | 0.10% | 16.3% |
| 14 | 87% | 8.3% | 0.39% | 0.11% | 4.6% |
| 15 | 87% | 8.3% | 0.39% | 0.11% | 5.9% |
| 16 | 87% | 8.3% | 0.39% | 0.11% | 6.1% |

Table 2 below shows test data including the rate of erosion from particle-impact for cured coating layers formed from each of the sixteen example coating compositions listed in Table 1. The particle-impact erosion-rate data are presented in terms of micrograms of cured coating layer worn away per gram of grit blasted against the coating layer. The erosion-rate testing was performed with a 120-grit particle size alumina blasted at a speed of 600 feet per second at an impact angle of 30 degrees with respect to the coating layer surface. Particle-impact erosion-rate data for uncoated 1100 aluminum, uncoated 1008 mild steel, tungsten carbide, and nickel are also shown for comparison. The particle-impact erosion-rate data corresponds to the mass of metal worn away for each of the examples. The tungsten carbide is a high velocity oxy fuel (HVOF) sprayed coating including 17 wt. % cobalt. Table 2 also shows data for the rate of loss of each of the coating layers associated with cavitation. The cavitation loss-rate data are presented in terms of milligrams of cured coating layer worn away per hour of exposure to cavitation. The cavitation testing was performed with the coating layers immersed in water and an ultrasonic horn vibrating at 20 kHz in the water spaced 0.5 millimeters from the respective coating layer surface. Cavitation loss-rate data for uncoated 1100 aluminum and uncoated 1008 mild steel are also shown for comparison. The cavitation loss-rate data corresponds to the mass of metal worn away for these examples.

TABLE 2

| Example/Material | Particle-impact erosion-rate $\mu g_{surface}/g_{grit}$ | Cavitation loss-rate $mg_{surface}$/hour |
|---|---|---|
| 1 | 4.2 | — |
| 2 | 4.3 | 2.3 |
| 3 | 4.3 | — |
| 4 | 4.6 | 2.1 |
| 5 | 4.7 | — |
| 6 | 5.2 | 2.5 |
| 7 | 3.6 | 2.7 |
| 8 | 5.4 | 2.4 |
| 9 | 6.4 | — |
| 10 | 7.4 | 3.6 |
| 11 | 5.6 | 2.4 |
| 12 | 5.1 | 1.7 |
| 13 | 5 | 2.4 |
| 14 | 4.6 | 3.5 |

TABLE 2-continued

| Example/Material | Particle-impact erosion-rate µg$_{surface}$/g$_{grit}$ | Cavitation loss-rate mg$_{surface}$/hour |
|---|---|---|
| 15 | 5.5 | 3.5 |
| 16 | 5.8 | 3.5 |
| Aluminum 1100 | 58.6 | 39 |
| Steel 1008 | 99.3 | 10 |
| Tungsten carbide | 69.9 | — |
| Nickel | 129.2 | — |

The greatest particle-impact erosion-rate of the coating layers was observed for the cured coating layer formed from coating composition example 10, which was 7.4 m µ$_{surface}$/g$_{grit}$. The particle-impact erosion-rate for example 10 is only about 1300 of the particle-impact erosion-rate of uncoated 1100 aluminum and is only about 700 of the particle-impact erosion-rate of uncoated 1008 mild steel. Thus, the example coating compositions result in coating layers that exhibit much better erosion resistance than the two uncoated metals tested. The greatest cavitation loss-rate of a coating layer was observed for the cured coating layer formed from coating composition example 10, which was 3.6 mg$_{surface}$/hour. This cavitation loss-rate is only about 9% of the cavitation loss-rate of uncoated 1100 aluminum and is only about 36% of the cavitation loss-rate of uncoated 1008 mild steel. Thus, the example coating compositions result in coating layers that exhibit much better cavitation resistance than the two uncoated metals tested.

Example 2

Table 3 below shows six example coating compositions including silanol, filler, a pigment, a catalyst, and a cross-linking agent. The filler is fumed silica, the pigment is a transition-metal ferrite spinel powder having a median particle size less than 1 µm, F-6331-2 Black Ferro, manufactured by Ferro Corporation, the catalyst is dibutyl tin dilaurate, and the cross-linking agent is ethyl triacetoxy silane.

TABLE 3

| Example | Silanol wt % | Filler wt % | Pigment wt % | Catalyst wt % | Cross-linking agent wt % |
|---|---|---|---|---|---|
| A | 40% | 0.01% | 0.01% | 0.01% | 0.01% |
| B | 99% | 25% | 10% | 5% | 20% |
| C | 60% | 3% | 0.02% | 0.02% | 1.5% |
| D | 95% | 13% | 5% | 1% | 10% |
| E | 85% | 5% | 0.03% | 0.04% | 2% |
| F | 92% | 10% | 1% | 0.4% | 7% |

When the example coating compositions C, D, E, or F are applied to and cured on a fluid handling component, the particle-impact erosion-rate of the resultant coating layer would be expected to be similar to the erosion rates for coating layers exhibited by the example coating compositions 1-16 shown in Table 2 under similar conditions of blasting with 120-grit size alumina at a speed of 600 feet per second and an impact angle of 30 degrees. The cavitation loss rate of example coating layers formed from the example coating compositions C, D, E, or F would be expected to be similar to the cavitation loss rates for coating layers formed from example compositions 1-16 shown in Table 2 under similar conditions of sonication with the coating layers immersed in water and an ultrasonic horn vibrating at 20 kHz in the water spaced 0.5 millimeters from the respective coating layer surface. Example coating compositions A and B have weight percentages of components different than the example coating compositions 1-16 shown in Table 1. The particle-impact erosion-rate and cavitation loss rate for coating layers formed from the example coating compositions A and B may differ from the results for the coating layers formed from the example coating compositions 1-16. However, the coating compositions A and B, when cured on a fluid handling component, would be expected to result in useful respective coating layers that would provide effective protection of the fluid handling component against erosion by particle impact, impingement, and/or cavitation.

Use of a pigment other than Black Ferro F-6331-2 in a coating composition would be expected to, upon curing, result in a coating layer exhibiting properties similar to that of a coating layer formed from a coating composition in which Black Ferro F-6331-2 is used (e.g., similar erosion-resistance and protection of a fluid handling component from erosion by particle impact, impingement, and/or cavitation). Use of a tin catalyst and/or one of many other catalysts not based on tin, other than dibutyl tin dilaurate, and use of a cross-linking agent other than ethyl triacetoxy silane, such as, for example, vinyl triacetoxy silane, methyl tris (methyl-ethyl-ketoximino) silane, or vinyl tris (methyl-ethyl-ketoximino) silane, would be expected to, upon curing, result in a respective coating layer exhibiting properties similar to that of a coating layer formed from a composition in which dibutyl tin dilaurate and ethyl triacetoxy silane are used (e.g., similar erosion-resistance and protection of a fluid handling component from erosion by particle impact, impingement, and/or cavitation).

Example Method

An example method at least according to some examples described herein for forming one more primer layers and one or more coating layers will now be described. Unless noted herein, the order of the described steps is not necessary for performing methods consistent with the methods described herein, some steps may be optional, and additional steps are not inconsistent with the methods described herein.

In some examples of the method, prior to applying a primer composition or a coating composition to the oilfield operational component to be treated, the oilfield operational component may be visually inspected for damage or surface irregularities prior to treatment. Any surface irregularities in the component, such as hard surface layers, sharp edge fillets, corners, and welds may be removed by an appropriate method prior to surface preparation of the component. In some examples, the oilfield operational component may be solvent-cleaned (e.g., MEK) and/or vapor-degreased (e.g., according to ASTM D4126), for example, for components that have been previously in service. In some examples, the oilfield operational component may be cleaned, degreased, and/or thermally degreased by baking the oilfield operational component in an oven to achieve about a 700° F. component temperature for about eight hours to substantially or fully remove potential contaminants. In some examples, machined surfaces and/or any other portion of the oilfield operational component that may be damaged by grit blasting may be masked-off prior to grit-blasting to protect those portions of the oilfield operational component from the grit-blasting.

In some examples of the method, the ambient conditions in the processing area may be checked, and, in some examples, a blotter test may be performed (e.g., according to ASTM 4285-83). If ambient conditions are suitable, the oilfield operational component may be grit-blasted or white-metal-blasted with an aluminum oxide abrasive media sized with 100 mesh according to NACE NO. 1/SSPC-SP5 (e.g., white metal blast). In some examples, the oilfield operational component surface temperature may be maintained at a temperature of at least 5° F. above the dew point.

In some examples of the method, the oilfield operational component may be grit-blasted to develop an anchor pattern of about 20 µm to about 30 µm. In some examples, the Testex Press-O-Film Replica Tape method may be used for verifying the anchor profile. The tape profile may be measured using a spring micrometer (e.g., according to ASTM D4417).

In some examples of the method, following grit-blasting, the method may further include applying a primer composition consistent with at least some examples of primer compositions described herein. In some examples, the primer composition may be applied relatively soon after cleaning, for example, within about four hours following grit-blasting. Any humidity may cause flash-rusting of the oilfield operational component if formed from steel, and if such flash rusting is observed, the method may include performing the grit-blasting again. In some examples of the method, applying the primer composition to the oilfield operational component may occur only if the ambient temperature is greater than about 40° F., and the relative humidity is less than about 85%, or when the oilfield operational component temperature is greater than about 5° F. above the dew point. The primer composition may be applied via a sprayer that atomizes the primer composition.

In some examples of the method, a 2.5-gallon pressure paint pot may be used with a dual regulator. The pressure pot may be set at an air pressure ranging from about 40 psi to about 60 psi, and a fluid pressure ranging from about 15 psi to about 20 psi. In some examples, prior to application of the primer composition, the surface of the oilfield operational component to receive the primer composition may be blasted with compressed air to reduce the chance of any surface contamination.

Some examples of the method may include applying the primer composition to achieve a dry film thickness ranging from about 20 µm to about 50 µm. In some examples, the method may include drying or curing the primer composition for forty-eight hours at about 70° F. (e.g., in an ambient state), or in some examples, for seventy-two hours if the temperature is below 70° F.

Some examples of the method may also include testing the primer layer to determine whether it has sufficiently cured, for example, by rubbing the primer layer surface with a cotton swab dipped in xylene. If the tip of the cotton swab blackens, it may be an indication that additional curing of the primer composition should be performed.

In some examples of the method, prior to applying the coating composition to the dried or cured primer layer, the method may include wiping the primer layer surface clean, for example, using a lint-free cloth to avoid contamination of the primer layer surface, as such contamination may result in insufficient adherence of the coating composition to the primer layer.

In some examples of the method, an airless spraying pump may be used to apply the coating composition. The coating composition may be applied via a sprayer that atomizes the coating composition. In some examples, a spin-coating tool may be used with the pump, so that the coating composition may be applied to interior surfaces of a fluid handling component. In some examples, the coating composition may be applied to achieve a coating thickness of about 50 µm or thicker by successive application about every ten minutes. In some examples, the air pressure of the airless pump may be set to a pressure ranging from about 15 psi to about 20 psi.

In some examples, the coating composition may be applied to the oilfield operational component to achieve a dry film thickness ranging from about 150 µm to about 200 µm. Once applied, the coating composition may be cured for a time period ranging from about ten hours to about twenty-four hours at a temperature of about 70° F. (e.g., in an ambient state). Thereafter, an additional layer of the coating composition may be applied to the at least partially cured layer of coating composition to achieve an additional coating layer dry film thickness ranging from about 150 µm to about 200 µm. In some examples, this additional coating composition layer may be cured for a time period ranging from about one hour to about three hours at a temperature of about 70° F.

Thereafter, in some examples, a second additional layer of the coating composition may be applied to the at least partially cured additional layer of coating composition to achieve a second additional coating layer dry film thickness ranging from about 150 µm to about 200 µm. In some examples, this second additional coating composition layer may be cured for a time period ranging from about thirty-six hours to about eighty-four hours (e.g., about seventy-two hours) at a temperature of about 70° F., for example, in a well-ventilated area having a relative humidity ranging from about 30% to about 70%. In some examples, the method may include curing the final coating composition layer for a minimum of seven days prior to use of the component. Additional layers of the coating composition may be applied and/or cured, for example, in an at least similar manner as described above. Following application and/or curing of a final layer of the coating composition, the at least partially coated oilfield operational component may be inspected prior to being placed in service.

Figure 8:
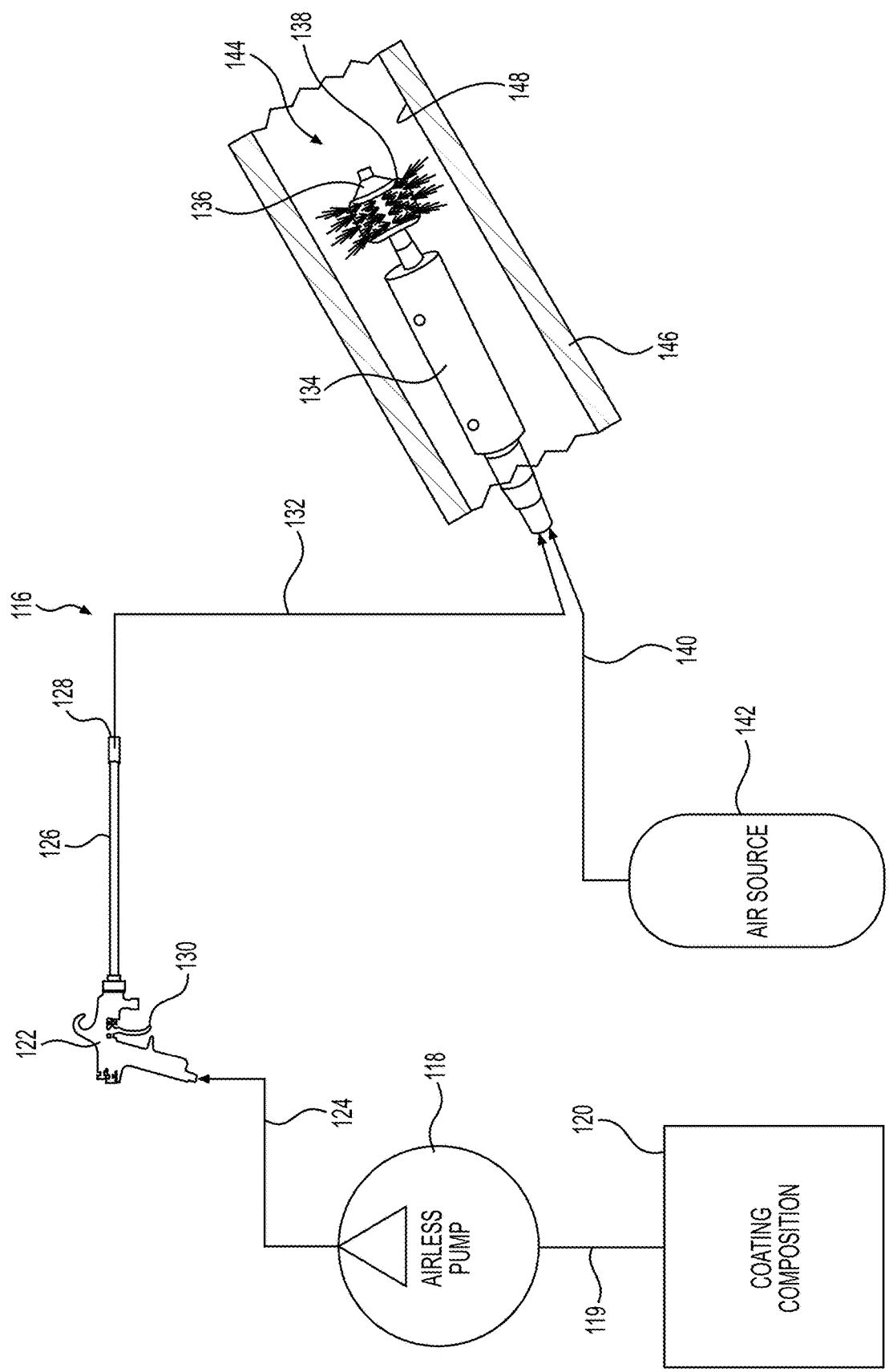
FIG. 8 is a schematic illustration of an example coating assembly configured to apply a coating composition to oilfield operational components according to the disclosure.

FIG. 8 is a schematic illustration of an example coating assembly 116 configured to apply a coating composition to oilfield operational components according to the disclosure. As shown in FIG. 8, in some embodiments, the coating assembly 116 may include an airless pump 118 configured to pump a supply of the coating composition (or the primer composition) via a fluid line 119 from a reservoir 120 to a spray gun 122 via a fluid line 124 (e.g., an airless fluid hose). As shown, some embodiments of the spray gun 122 may include a wand 126, which in some examples may include a back pressure orifice 128. In some embodiments, the spray gun 122 may include an activation trigger 130 configured to cause the coating composition to be conveyed via a second fluid line 132 to a coating tool 134. In some embodiments, for example, as shown, the coating tool 134 may include a spray head 136 configured to rotate and discharge the coating composition from a plurality of spray orifices 138 as the spray head 136 rotates. For example, the spray head 136 may include an air motor configured to rotate the spray head 136 via air pressure supplied via an air line 140 from an air source 142 (e.g., a pressurized air tank and/or an air compressor). For example, the spray head 136 may be inserted into the interior 144 of a component 146 having an interior surface 148 to which the coating composition is to be applied. The air may be supplied to the spray head 136 to cause the air motor to rotate the spray head 136, and the airless pump 118 may supply the coating composition to the coating tool 134 and the spray head 136 under pressure, thereby atomizing the coating composition as it is forced through the spray orifices 138. In some examples, the wand 126 (i.e., rather than the spray head 136) may be inserted into the interior 144 of the component 146 to which the coating composition is to be applied, and the activation trigger 130 of the spray gun 122 may be engaged to manually apply the coating composition to the interior surface 148 of the component 146 as will be understood by those skilled in the art.

In some embodiments, the airless pump 118 may be configured to have an output ratio ranging from about 10:1 to about 100:1, such as from about 20:1 to about 90:1, from about 30:1 to about 80:1, from about 40:1 to about 70:1, or from about 50:1 to about 65:1 (e.g., about 60:1). For example, if air from the air source 142 is supplied at about 100 pounds per square inch (psi) and the airless pump 118 has an output ratio of about 60:1, the coating composition may be forced through the spray orifices 138 at about 6,000 psi, which may result in atomizing the coating composition into fine particles as the coating composition passes through the spray orifices 138. In some embodiments, atomizing the coating composition in such a manner when applying it to a surface may result in a relatively smoother surface finish, which in some embodiments, may result in a more damage-resistant surface as will be understood by those skilled in the art.

Testing

Erosion tests were conducted on samples of steel coated with a coating compositions consistent with the example coating compositions described herein. The objective of the testing was to measure and document the resistance to erosion from sand-laden slurry representative of a fracking fluid, with the coating layer formed by the coating composition applied to the interior surface (e.g., through which fracking fluid would flow) of common fracking system components, including a goat head, a fluid end, and a frac iron component. Unless otherwise noted below, the coating layer on the test samples was 0.014 inches thick and formed from the same coating composition, which is consistent with at least some of the coating compositions described herein. Several base materials commonly used to form a goat head, a fluid end, and a frac iron component were used to form the test samples as follows: alloy steel AISI 4130 API-spec steel, commonly used to form a goat head; stainless steel 17-4 PH, commonly used to form a fluid end; and alloy steel AISI 4715, commonly used to form frac iron components. The testing included direct impingement flow with a constant differential pressure of silicon dioxide ($SiO_2$) sand against test samples coated with a cured coating composition consistent with at least some examples of the coating compositions described herein and bare test samples (i.e., uncoated test samples). The tests were typically continued for four hours beyond coating layer breakthrough, at a constant slurry flow rate, with the test paused every four hours to document the condition of the test sample after each flow interval. Typically, the total test time of the bare test samples matched the total test time of the corresponding test sample having the tested coating layer. For each test sample tested, tests for four impingement angles were performed for comparison: 0°, 30°, 45°, and 60°. A constant jet nozzle exit velocity was used across all tests.

Figure 9A:
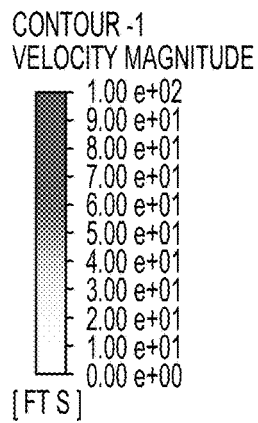
FIGS. 9A, 9B, 9C, are 9D are schematic representations of a testing arrangement including a test sample exposed to a test fluid flow at an included angle β relative to the test sample according to the disclosure.
Figure 9B:
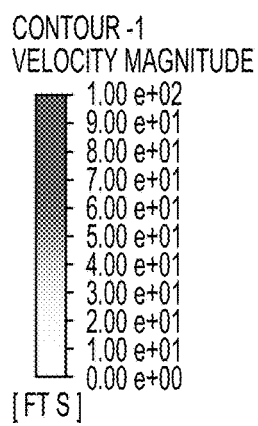
Figure 9C:
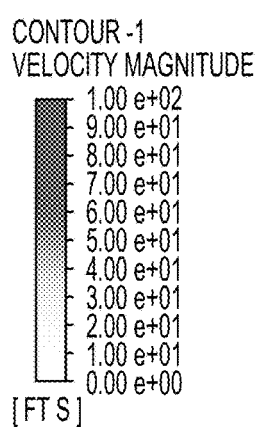
Figure 9D:
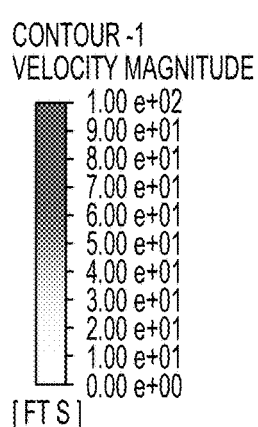

FIGS. 9A, 9B, 9C, and 9D are a schematic representations of a testing arrangement 150 including a test sample 152 exposed to a test fluid flow 154 discharged from a nozzle exit 156 with the test sample 152 at included impingement angles β relative to horizontal (as depicted), including 0° (FIG. 9A), 30° (FIG. 9B), 45° (FIG. 9C), and 60° (FIG. 9D). The size of each test sample 152 was three inches in diameter and one-half inch thick. Each test sample 152 was machined with two one-quarter-inch threaded holes on the back side to enable installation of the test sample 152 into a holder (not shown). For the test samples 152 having a coating layer, the surface of the test sample 152 was shot-blasted prior to applying the coating composition. After shot-blasting, a primer composition consistent with at least some example primer compositions described herein was applied the test samples 152, such that a primer layer having a dry film thickness of about 25 μm was formed on the test sample. This was followed by application of a coating composition consistent with at least some of the coating compositions described herein to form a coating layer having a dry film thickness of about 30 μm to about 36 μm. All metallic surfaces were prepared the same way, so that the test sample substrate material properties would be consistent.

The AISI 4715 material used for manufacturing test samples was carburized and exhibited a surface hardness of 62 HRC. This material was also case-hardened to 44 HRC to a depth of about 1,780 μm. The core hardness of the test samples was approximately 35 HRC. The AISI 4130 material used for manufacturing the test samples was standard API 75-ksi material. The hardness requirement per API is about 207 to about 35 HBW. The MTRs for this material lists a hardness of about 212 to about 227 HBW.

Regarding the fluid flow for the testing, a jet velocity of about 100 feet per second was used for all test samples and impingement angles. This jet velocity was selected to increase the erosion rate and reduce overall test time, so that notable changes would be expected within a four-hour test interval. A single, substantially constant jet velocity was used to reduce the number of test variables and to minimize the number of changes required to the test fixture and related equipment. Regarding the composition of the fluid flow, the test slurry was composed of tap water with erodent particles added at a concentration of 20,000 parts per million by weight. At the flow rates selected for testing, this concentration represents a consumption of approximately 200 pounds of sand erodent for every four hours of testing. A concentration of 20,000 parts per million by weight is a petroleum industry standard value and is specified in several American Petroleum Institute (API) standards. It is believed that concentrations exceeding 20,000 parts per million by weight may result in particle-to-particle interactions that cause the specific erosion (i.e., the total mass of material eroded normalized by dividing it by the total mass of erodent) to shift from a linear relationship to a nonlinear relationship.

The erodent material selected for small sand tests was "270 mesh" silica flour, and the erodent material selected for large sand tests was "100 mesh" silica flour. The relatively smaller 270 mesh sand had particle size distribution of a $D_{10}$ of about 5 μm, a $D_{50}$ of about 51 μm, and a $D_{90}$ of about 130 μm. The relatively larger 100 mesh sand had a particle size distribution of a $D_{10}$ of about 118 μm, a $D_{50}$ of about 194 μm, and a $D_{90}$ of about 332 μm. The silica material was produced by processing rounded Midwest sands to a finer particle size to achieve the desired particle size distributions. This results in a petroleum industry-accepted representation of solids in fracking fluid, and is recommended for erosion flow testing in API standards including API 19ICD (Inflow Control Devices) and API 19ICV (Interval Control Valves). The Mohs hardness for silica ranges from 6 to 7.

The sand particles mixed in the slurry were passed through the test set-up once and thereafter discarded (i.e., they were not recycled back through the testing arrangement). This procedure was used because particles of silica have sharp corners or edges after being ground, and the sharp corners or edges may be smoothed/rounded off after multiple passes through the testing arrangement via interactions with other particles and the test sample. A single-pass design more consistently impacts the test samples with the most abrasive erodent. This single-pass approach is also believed to be the most representative of field conditions during a fracking operation.

The general test procedure used follows:
1. Weigh the test sample prior to testing on a gram scale with a resolution of 0.01 gram;
2. Install the test sample into the test sample holder;
3. Obtain a slurry sample and measure particle concentration to verify target particle loading;
4. Begin flow testing while maintaining flow parameters constant in their respective defined ranges. After each two hours of erosion flow, obtain a new slurry sample to confirm that particle concentration remains in the defined range;
5. After each four-hour testing interval, which corresponds to a total sand flow of approximately 200 pounds, pause the test and remove the test sample from the holder. Clean the test sample and weigh it to document the weight of material lost, and photograph the wear area to document its current condition;
6. Measure the maximum wear depth in the test sample using a depth gauge; and
7. Repeat steps 1 through 6 for another four-hour interval, and continue repeating flow intervals for a cumulative flow period of at least sixteen hours. After sixteen hours of testing is complete, decide whether the test should be further continued, for example, if the coating layer has not yet been breached or is only marginally damaged. Continue testing until a trend in the results is apparent and documented.

Test Results

For the AISI 4130 alloy steel often used in goat heads, twelve tests were performed with the twelve test samples, including four test samples (i.e., Samples B, F, J, and L) coated with a coating composition consistent with at least some examples described herein to form a coating layer 0.014 inches thick, and four uncoated (bare) test samples (i.e., Samples A, E, I, and K). In addition, two test samples were coated with a coating composition consistent with at least some examples described herein to form a ("Thick-coated") layer of 0.028 inches thick instead of 0.014 inches thick (i.e., Samples C and G), and two test samples were coated with a modified coating composition ("Chem.-resist.-coated") consistent with at least some examples described herein to form a coating layer thickness of 0.014 inches (i.e., Samples D and H).

The modified coating composition was modified relative to at least some example coating compositions described previously herein to be chemically-resistant (or at least relatively more chemically-resistant as compared to the non-modified coating compositions) to fluids prevalent in oilfield settings, such as fracturing fluids and/or petroleum. For example, some embodiments of the coating composition described previously herein may include silanol fluid in an amount ranging from about 40 wt % to about 90 wt %, fumed silica in an amount ranging from about 0.01 wt % to about 25 wt %, and/or a catalyst (e.g., dibutyl tin dilaurate) in an amount ranging from about 0.01 wt % to about 10 wt %. In some embodiments of the modified coating composition, the amount (or amounts) of one or more (or a combination) of the silanol fluid, the fumed silica, or the catalyst, relative to the coating compositions previously described herein, may be reduced by an amount ranging from about 1 wt % to about 10 wt %, from about 2 wt % to about 9 wt %, from about 3 wt % to about 8 wt %, from about 4 wt % to about 7 wt %, or from about 4 wt % to about 6 wt % (e.g., about 5 wt %, for example, about 5.2 wt %). In some embodiments, the wt % given may be for cured coatings, for example, after solvents and/or volatiles have been lost and/or eliminated.

In some embodiments, the modified coating composition may include silanol fluid in an amount ranging from about 75.0 wt % to about 85.0 wt %, from about 76.0 wt % to about 84.0 wt %, from about 77.0 wt % to about 83.0 wt %, from about 78.0 wt % to about 82.0 wt %, from about 79.0 wt % to about 82.0 wt %, from about 80.0 wt % to about 82.0 wt %, or from about 80.0 wt % to about 81.0 wt % (e.g., about 80.7 wt %). In some embodiments, the modified coating composition may include an amount of fumed silica ranging from about 13.0 wt % to about 17.0 wt %, from about 14.0 wt % to about 16.0 wt %, from about 14.5 wt % to about 15.5 wt %, or from about 15.0 wt % to about 15.5 wt % (e.g., about 15.1 wt %). In some embodiments, the modified coating composition may include an amount of catalyst (e.g., dibutyl tin dilaurate) ranging from about 0.15 wt % to about 0.21 wt %, from about 0.16 wt % to about 0.20 wt %, or from about 0.17 wt % to about 0.19 wt % (e.g., about 0.18 wt %). In some embodiments, the cured and dried coating composition may include, for example, substantially all functional types of silanol grouped together and including silane chains and T-resins.

Some embodiments of the coating composition previously described herein may include one or more cross-linking agents (e.g., trifunctional silane, such as ethyl triacetoxysilane) in an amount ranging from about 1 wt % to about 20 wt % (e.g., from about 2 wt % to about 7 wt %). In some embodiments of the modified coating composition, the amount of cross-linking agent(s) (e.g., ethyl triacetoxysilane), relative to the coating compositions previously described herein, may be increased by an amount ranging from about 1 wt % to about 10 wt %, from about 2 wt % to about 9 wt %, from about 3 wt % to about 8 wt %, from about 4 wt % to about 7 wt %, or from about 4 wt % to about 6 wt % (e.g., about 5 wt %, for example, about 5.2 wt %). In some embodiments, the cross-linking agent(s) (e.g., ethyl triacetoxy silane) may react with other silanol, fumed silica, and/or moisture from the air. In some such embodiments, the coating composition may cure to form polymers, copolymers, and block polymers that may be collectively referred to as "ethyl T-resins," each unit forming three links and/or bonds where each link and/or bond is to another unit of ethyl T-resin, a silanol, a surface of fumed silica, and/or the surface of other constituents, such as pigments.

In some such embodiments, the coating composition may include ethyl T-resin in an amount ranging from about 2.0 wt % to about 3.5 wt %, from about 2.2 wt % to about 3.3 wt %, from about 2.4 wt % to about 3.1 wt %, from about 2.5 wt % to about 3.0 wt %, or from about 2.6 wt % to about 2.9 wt % (e.g., about 2.8 wt %). In some embodiments, the modified coating composition (e.g., the chemically-resistant coating composition) may include ethyl T-resin in an amount ranging from about 2.0 wt % to about 3.5 wt %, from about 2.2 wt % to about 3.3 wt %, from about 2.4 wt % to about 3.1 wt %, from about 2.5 wt % to about 3.0 wt %, or from about 2.6 wt % to about 2.9 wt % (e.g., about 2.7 wt %). It is believed by Applicant that the level of ethyl T-resin in the cured coating may enhance the performance and/or the durability of the coatings. In some embodiments, the amount of ethyl T-resin in the modified coating composition may be less than about 5 wt % and/or more than about 1.5 wt % (e.g., an amount ranging from about 1.9 wt % to about 3.3 wt % (e.g., from about 2.6 wt % to about 2.9 wt %)).

Some embodiments of the coating composition previously described herein may include one or more pigments (e.g., one or more black pigments, such as transition-metal ferrite spinel powder) in an amount ranging from about 0.01 wt % to about 15 wt %. In some embodiments of the modified coating composition, the amount of pigments (e.g., black pigment), relative to the coating compositions previously described herein, may be replaced by one or more blue pigments in an amount ranging from about one to about fifteen times the amount of black pigment, from about three times to about fifteen times the amount of black pigment, from about five times to about fifteen times the amount of black pigment, from about eight times to about fourteen times the amount of black pigment, or from about ten times to about twelve times the amount of black pigment. In some embodiments, blue pigment may be included in an amount ranging from about 1.0 wt % to about 5.0 wt %, from about 1.5 wt % to about 4.5 wt %, from about 2.0 wt % to about 4.5 wt %, from about 2.5 wt % to about 4.0 wt %, from about 3.0 wt % to about 4.0 wt %, from about 3.5 wt % to about 4.0 wt %, or from about 3.5 wt % to about 3.8 wt % (e.g., about 3.6 wt %). In some embodiments, the blue pigment may include Cobalt Aluminate Blue Spinel, Cas #1345-16-0. Other blue pigments and/or pigments of other colors are contemplated.

Some embodiments of the coating composition previously described herein may not include titanium dioxide or may include only a relatively small (trace) amount of titanium dioxide. In some embodiments of the modified coating composition, titanium dioxide may be included in an amount ranging from about 0.01 wt % to about 15 wt %, from about 1 wt % to about 14 wt %, from about 3 wt % to about 12 wt %, from about 5 wt % to about 10 wt %, from about 6 wt % to about 9 wt %, or from about 7 wt % to about 8 wt %. For example, titanium dioxide may be included in an amount ranging from about 0.50 wt % to about 0.90 wt %, from about 0.60 wt % to about 0.85 wt %, from about 0.65 wt % to about 0.80 wt %, from about 0.70 wt % to about 0.80 wt %, or from about 0.70 wt % to about 0.75 wt % (e.g., about 0.72 wt %).

Relative to some embodiments of the non-modified coating composition previously described herein, it is believed by Applicant that for some embodiments of the modified coating composition, adding titanium dioxide may increase the durability of the cured coating layer(s). It is also believed by Applicant that for some embodiments of the modified coating composition, adding additional cross-linking agent(s) (e.g., trifunctional silane) to the coating composition, and/or removing some of the polymer (e.g., silanol fluid) from the coating composition, may promote a relatively tighter bond between the cross-linking agent(s) and polymer and/or promote additional crosslinking between the blue pigment and the titanium dioxide. For some embodiments, it is also believed by Applicant that relatively tighter bonds may reduce the permeability of the coating layer, which may reduce the susceptibility of the coating layer to attack from solvents and/or other chemicals to which the oilfield operational component may be exposed.

Figure 10:
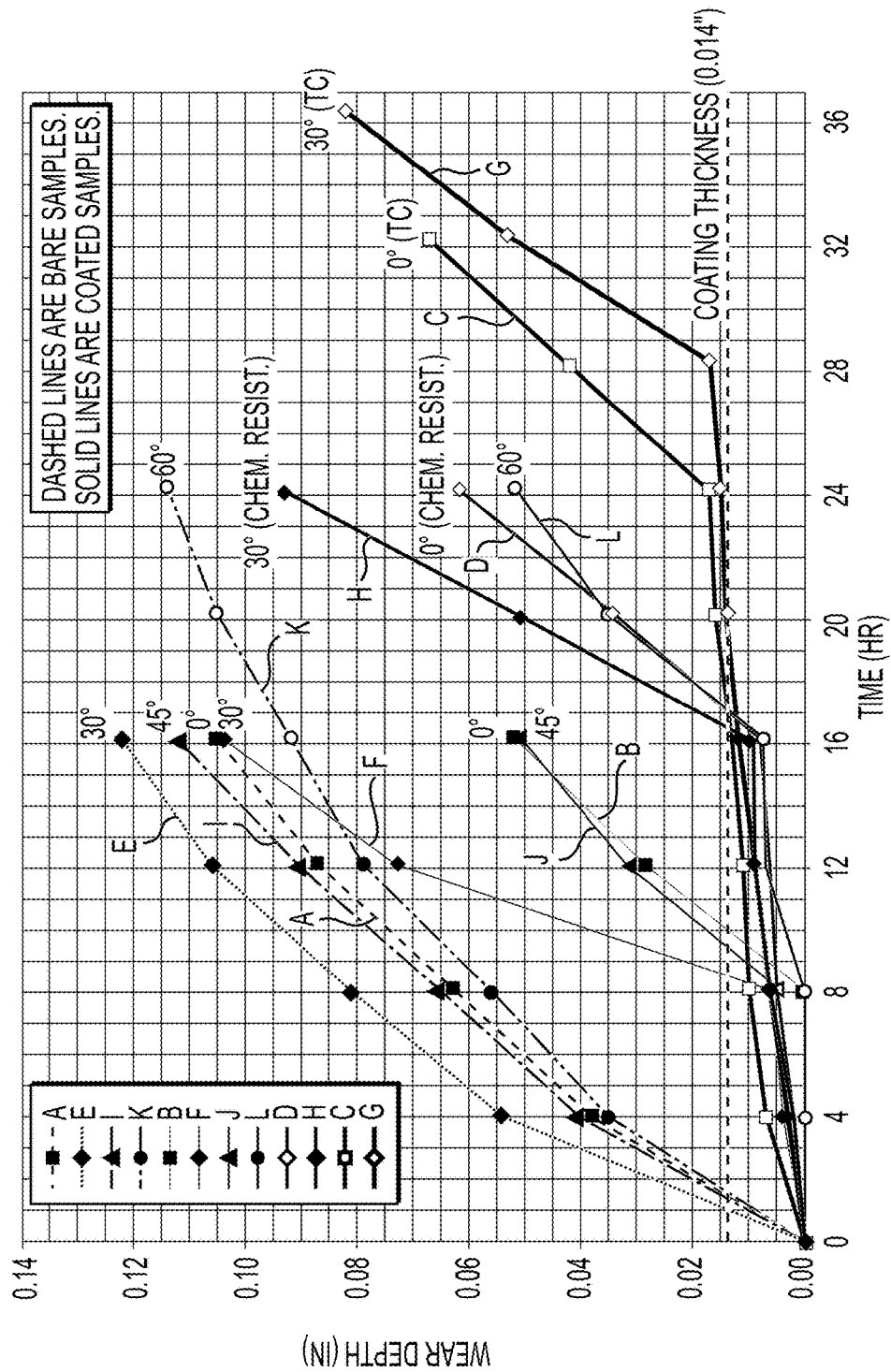
FIG. 10 is a graph of cumulative wear depth (inches (in)) versus time (hours (hr)) of exposure to the test fluid flow of test results from testing uncoated (bare) test samples, coated test samples, and test samples coated with a chemical-resistant coating, simulating a goat head component exposed to fluid flow at different included angles according to the disclosure.

Samples A through D were tested at an impingement angle of 0°. Samples E through H were tested at an impingement angle of 30°. Samples I and J were tested at an impingement angle of 45°, and Samples K and L were tested at an impingement angle of 60°. The results of the tests are provided in Table 4 below, showing the cumulative mass loss (grams (g)) and cumulative wear depth (inches (in)) as a function of the time during which the Samples were subjected to the testing. FIG. 10 is a graph of cumulative wear depth (inches (in)) versus testing time (hours (hr)) during which the Samples were subjected to the testing for the test results shown in Table 4.

TABLE 4

| Sample | Coating/Bare | Jet Angle (degrees) | Duration (hours) | Mass loss (g) | Wear depth (in) |
|---|---|---|---|---|---|
| A | Bare | 0 | 4 | 1.04 | 0.038 |
|   |   |   | 8 | 1.81 | 0.063 |
|   |   |   | 12 | 2.62 | 0.087 |
|   |   |   | 16 | 3.28 | 0.105 |
| B | Coated (0.014 in) | 0 | 4 | 0.00 | 0.000 |
|   |   |   | 8 | 0.00 | 0.000 |
|   |   |   | 12 | 0.39 | 0.016 |
|   |   |   | 16 | 0.96 | 0.040 |
| C | Thick-coated (0.028 in) | 0 | 4 | 0.00 | 0.007 |
|   |   |   | 8 | 0.00 | 0.010 |
|   |   |   | 12 | 0.00 | 0.011 |
|   |   |   | 16 | 0.00 | 0.013 |
|   |   |   | 20 | 0.00 | 0.016 |
|   |   |   | 24 | 0.01 | 0.017 |
|   |   |   | 28 | 0.60 | 0.042 |
|   |   |   | 32 | 0.86 | 0.067 |
| D | Chem.-resist-coated (0.014 in) | 0 | 4 | 0.00 | 0.003 |
|   |   |   | 8 | 0.00 | 0.005 |
|   |   |   | 12 | 0.00 | 0.006 |
|   |   |   | 16 | 0.01 | 0.008 |
|   |   |   | 20 | 0.42 | 0.034 |
|   |   |   | 24 | 0.72 | 0.062 |
| E | Bare | 30 | 4 | 1.03 | 0.054 |
|   |   |   | 8 | 1.71 | 0.081 |
|   |   |   | 12 | 2.53 | 0.106 |
|   |   |   | 16 | 3.10 | 0.122 |
| F | Coated (0.014 in) | 30 | 4 | 0.00 | 0.000 |
|   |   |   | 8 | 0.02 | 0.000 |
|   |   |   | 12 | 0.66 | 0.061 |
|   |   |   | 16 | 1.24 | 0.092 |
| G | Thick-coated (0.028 in) | 30 | 4 | 0.00 | 0.003 |
|   |   |   | 8 | 0.00 | 0.006 |
|   |   |   | 12 | 0.00 | 0.009 |
|   |   |   | 16 | 0.00 | 0.012 |
|   |   |   | 20 | 0.00 | 0.014 |
|   |   |   | 24 | 0.00 | 0.015 |
|   |   |   | 28 | 0.00 | 0.017 |
|   |   |   | 32 | 0.39 | 0.053 |
|   |   |   | 36 | 1.18 | 0.082 |
| H | Chem.-resist-coated (0.014 in) | 30 | 4 | 0.00 | 0.002 |
|   |   |   | 8 | 0.00 | 0.006 |
|   |   |   | 12 | 0.01 | 0.009 |
|   |   |   | 16 | 0.01 | 0.010 |
|   |   |   | 20 | 0.20 | 0.051 |
|   |   |   | 24 | 0.56 | 0.093 |
| I | Bare | 45 | 4 | 0.86 | 0.040 |
|   |   |   | 8 | 1.49 | 0.065 |
|   |   |   | 12 | 2.30 | 0.090 |
|   |   |   | 16 | 2.90 | 0.112 |
| J | Coated (0.014 in) | 45 | 4 | 0.01 | 0.000 |
|   |   |   | 8 | 0.01 | 0.000 |
|   |   |   | 12 | 0.28 | 0.020 |
|   |   |   | 16 | 0.71 | 0.039 |
| K | Bare | 60 | 4 | 0.74 | 0.035 |
|   |   |   | 8 | 1.23 | 0.056 |
|   |   |   | 12 | 1.88 | 0.079 |
|   |   |   | 16 | 2.32 | 0.092 |
|   |   |   | 20 | 2.82 | 0.105 |
|   |   |   | 24 | 3.17 | 0.114 |
| L | Coated (0.014 in) | 60 | 4 | 0.00 | 0.000 |
|   |   |   | 8 | 0.00 | 0.000 |
|   |   |   | 12 | 0.01 | 0.000 |
|   |   |   | 16 | 0.01 | 0.000 |
|   |   |   | 20 | 0.16 | 0.023 |
|   |   |   | 24 | 0.39 | 0.040 |

As shown in FIG. 10, for the AISI 4130 alloy steel consistent with material typically used in goat heads, the cumulative wear depth for the each of the bare testing samples, regardless of impingement angle, was significantly greater as compared to the cumulative wear depth for the coated test samples, regardless of the coating thickness or whether the coating was the modified coating (i.e., the chemical-resistant coating). In addition, as shown in Table 4, the cumulative mass loss for the each of the bare testing samples, regardless of impingement angle, was significantly greater as compared to the cumulative mass loss for the coated test samples, regardless of the coating thickness or whether the coating was the modified coating. In addition, the coated test samples do not show any significant wear depth or mass loss prior to two hours of testing (i.e., about 400 pounds of sand passed), and for an angle of 60°, no significant mass loss occurs until four hours of testing (i.e., about 800 pounds of sand have passed). (The test samples were subjected to approximately 200 pounds of sand erodent for every four hours of testing.) As would generally be expected, the amount of mass loss decreases with the angle of impingement, for example, such that the mass loss at 60° is significantly less than for 0° at a given testing time or passage of sand. The results of the testing suggest the tested primer layer and coating layer may significantly increase the service life of a fluid handling component for an oilfield operation, such as a goat head associated with a fracturing system.

In addition, as shown in FIG. 10, the bare samples (Samples A, E, I, and K) all reach a wear depth of 0.014 inches in two hours or less of testing. In contrast, coated Sample F, which exhibited the quickest wear rate of the coated samples, only reached a wear depth of 0.014 inches after eight hours of testing, a four-fold decrease in wear rate. In addition, Samples C and G, which included the thick coating (0.028 inches) did not reach 0.014 inches of wear depth until sixteen hours and twenty hours of testing, respectively. Comparing coated Samples B and F, which included the 0.014-inch thick coating layer, to the coated Samples C and G, which included the 0.028-inch thick coating layer, it took twice as long for Samples C and G to reach a 0.140-inch wear depth as Samples B and F. Regarding Samples D and H, which included the chemical-resistant coating layer (0.014 inches thick), Samples D and H did not reach a wear depth of 0.014 inches until after sixteen hours of testing. Sample B, tested at an impingement angle of 0 degrees and having a coating thickness of 0.014 inches, exhibited 0.014 inches of wear depth in a little more than half the time (ten hours) of Sample D (seventeen hours), tested at an impingement angle of 0 degrees and having a chemical-resistant coating of 0.014 inches thick. Sample F, tested at an impingement angle of 30 degrees and having a coating thickness of 0.014 inches, exhibited 0.014 inches of wear depth in about half the time (a little more than eight hours) of Sample H (at little more than sixteen hours), tested at an impingement angle of 30 degrees and having a chemical-resistant coating of 0.014 inches thick.

Figure 11:
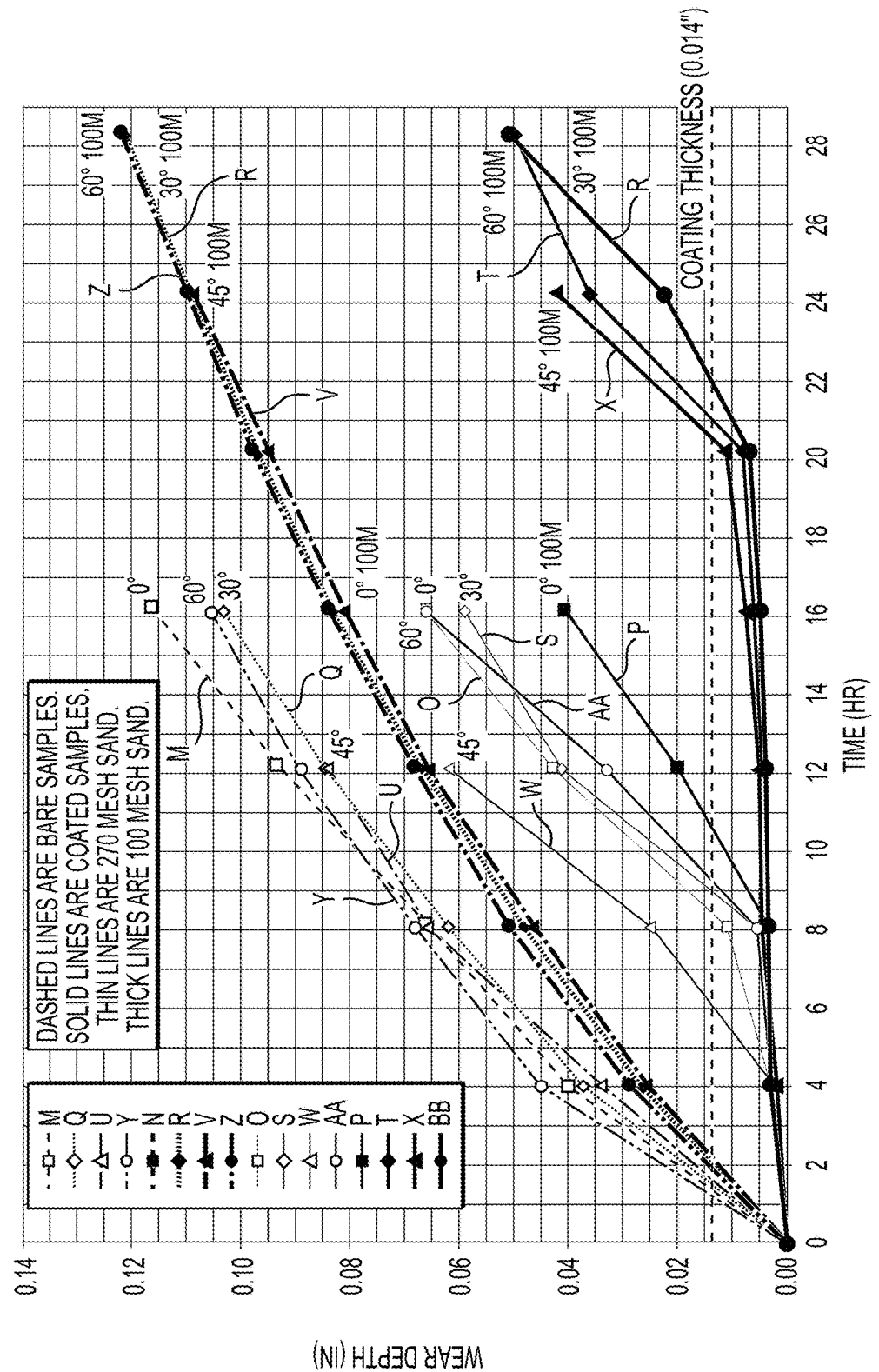
FIG. 11 is a graph of cumulative wear depth (inches (in)) versus time (hours (hr)) of exposure to the test fluid flow of test results from testing uncoated (bare) test samples and coated test samples simulating a fluid end exposed to fluid flow at different included angles according to the disclosure.

For the stainless steel 17-4 PH often used in flow ends, fifteen tests were performed with the test samples, including eight test samples (i.e., Samples O, P, S, T, W, X, AA, and BB) coated with a coating composition consistent with at least some examples described herein and seven uncoated (bare) test samples. In addition, four of the test samples were subjected to the relatively larger 100 mesh sand (i.e., Samples P, T, X, and BB), and four test samples were subjected to the relatively smaller 270 mesh sand (i.e., Samples O, S, W, and AA). Samples M through P were tested at an impingement angle of 0°. Samples Q through T were tested at an impingement angle of 30°. Samples U and X were tested at an impingement angle of 45°, and Samples Y and BB were tested at an impingement angle of 60°. The results of the tests are provided in Table 5 below, showing the cumulative mass loss (grams (g)) and cumulative wear depth (inches (in)) as a function of the time during which the samples were subjected to the testing. FIG. 11 is a graph of cumulative wear depth (inches (in)) versus testing time (hours (hr)) during which the samples were subjected to the testing for the test results shown in Table 5.

TABLE 5

| Sample | Coated/Bare | Sand Size | Jet Angle (degrees) | Duration (hours) | Mass loss (g) | Wear depth (in) |
|---|---|---|---|---|---|---|
| M | Bare | 270 mesh | 0 | 4 | 1.07 | 0.040 |
|   |   |   |   | 8 | 1.82 | 0.066 |
|   |   |   |   | 12 | 2.66 | 0.093 |
|   |   |   |   | 16 | 3.34 | 0.116 |
| N | Bare | 100 mesh | 0 | 4 | 0.79 | 0.045 |
|   |   |   |   | 8 | 1.38 | 0.068 |
|   |   |   |   | 12 | 2.04 | 0.089 |
|   |   |   |   | 16 | 2.56 | 0.105 |
| O | Coated (0.014 in) | 270 mesh | 0 | 4 | 0.00 | 0.000 |
|   |   |   |   | 8 | 0.17 | 0.000 |
|   |   |   |   | 12 | 1.15 | 0.031 |
|   |   |   |   | 16 | 1.94 | 0.054 |
| P | Coated (0.014 in) | 100 mesh | 0 | 4 | 0.00 | 0.003 |
|   |   |   |   | 8 | 0.01 | 0.004 |
|   |   |   |   | 12 | 0.29 | 0.020 |
|   |   |   |   | 16 | 0.89 | 0.041 |
| Q | Bare | 270 mesh | 30 | 4 | 0.74 | 0.037 |
|   |   |   |   | 8 | 1.33 | 0.062 |
|   |   |   |   | 12 | 1.99 | 0.084 |
|   |   |   |   | 16 | 2.53 | 0.103 |
| R | Bare | 100 mesh | 30 | 4 | 0.48 | 0.026 |
|   |   |   |   | 8 | 0.97 | 0.048 |
|   |   |   |   | 12 | 1.42 | 0.066 |
|   |   |   |   | 16 | 1.85 | 0.083 |
|   |   |   |   | 20 | 2.28 | 0.097 |
|   |   |   | 30 | 24 | 2.66 | 0.109 |
|   |   |   |   | 28 | 3.08 | 0.121 |
| S | Coated (0.014 in) | 270 mesh | 30 | 4 | 0.00 | 0.000 |
|   |   |   |   | 8 | 0.01 | 0.000 |
|   |   |   |   | 12 | 0.49 | 0.029 |
|   |   |   |   | 16 | 0.90 | 0.047 |
| T | Coated (0.014 in) | 100 mesh | 30 | 4 | 0 | 0.003 |
|   |   |   |   | 8 | 0 | 0.004 |
|   |   |   |   | 12 | 0.02 | 0.005 |
|   |   |   |   | 16 | 0.02 | 0.006 |
|   |   |   |   | 20 | 0.03 | 0.008 |
|   |   |   |   | 24 | 0.37 | 0.036 |
|   |   |   |   | 28 | 0.74 | 0.050 |
| U | Bare | 270 mesh | 45 | 4 | 0.67 | 0.034 |
|   |   |   |   | 8 | 1.42 | 0.066 |
|   |   |   |   | 12 | 1.96 | 0.084 |
|   |   |   |   | 16 | — | — |
| V | Bare | 100 mesh | 45 | 4 | 0.48 | 0.026 |
|   |   |   |   | 8 | 0.91 | 0.047 |
|   |   |   |   | 12 | 1.39 | 0.066 |
|   |   |   |   | 16 | 1.80 | 0.081 |
|   |   |   |   | 20 | 2.22 | 0.095 |
|   |   |   |   | 24 | 2.65 | 0.109 |
| W | Coated (0.014 in) | 270 mesh | 45 | 4 | 0.01 | 0.000 |
|   |   |   |   | 8 | 0.18 | 0.013 |
|   |   |   |   | 12 | 0.77 | 0.050 |
|   |   |   |   | 16 | — | — |
| X | Coated (0.014 in) | 100 mesh | 45 | 4 | 0 | 0.003 |
|   |   |   |   | 8 | 0 | 0.004 |
|   |   |   |   | 12 | 0.01 | 0.005 |
| X (cont.) | Coated | 100 mesh | 45 | 16 | 0.01 | 0.008 |
|   |   |   |   | 20 | 0.05 | 0.011 |
|   |   |   |   | 24 | 0.48 | 0.042 |

TABLE 5-continued

| Sample | Coated/Bare | Sand Size | Jet Angle (degrees) | Duration (hours) | Mass loss (g) | Wear depth (in) |
|---|---|---|---|---|---|---|
| Y | Bare | 270 mesh | 60 | 4 | 0.79 | 0.045 |
|   |   |   |   | 8 | 1.38 | 0.068 |
|   |   |   |   | 12 | 2.04 | 0.089 |
|   |   |   |   | 16 | 2.56 | 0.105 |
| Z | Bare | 100 mesh | 60 | 4 | 0.50 | 0.029 |
|   |   |   |   | 8 | 0.98 | 0.051 |
|   |   |   |   | 12 | 1.41 | 0.068 |
|   |   |   |   | 16 | 1.87 | 0.084 |
|   |   |   |   | 20 | 2.30 | 0.098 |
|   |   |   |   | 24 | 2.73 | 0.110 |
|   |   |   |   | 28 | 3.13 | 0.122 |
| AA | Coated (0.014 in) | 270 mesh | 60 | 4 | 0.00 | 0.000 |
|   |   |   |   | 8 | 0.01 | 0.000 |
|   |   |   |   | 12 | 0.29 | 0.021 |
|   |   |   |   | 16 | 0.79 | 0.054 |
| BB | Coated (0.014 in) | 100 mesh | 60 | 4 | 0 | 0.003 |
|   |   |   |   | 8 | 0 | 0.004 |
|   |   |   |   | 12 | 0 | 0.004 |
|   |   |   |   | 16 | 0.01 | 0.005 |
|   |   |   |   | 20 | 0.01 | 0.007 |
|   |   |   |   | 24 | 0.130 | 0.023 |
|   |   |   |   | 28 | 0.560 | 0.051 |

As shown in FIG. 11, for the stainless steel 17-4 PH consistent with material typically used in fluid ends, the cumulative wear depth for the each of the uncoated (bare) testing samples, regardless of impingement angle, was significantly greater as compared to the cumulative wear depth for the coated test samples, regardless of the sand size (i.e., the relatively larger 100 mesh sand or the relatively smaller 270 mesh sand). For example, the worst performing coated sample, Sample W, took three times longer to reach a wear depth of 0.014 inches as compared the best performing uncoated sample, Sample V. The best performing coated samples, Samples R, T, and X, took from ten to eleven times longer to reach a wear depth of 0.014 inches. FIG. 11 also shows that generally all of the samples, both uncoated and coated, exhibited better wear (i.e., slower wear rates) when exposed to the relatively larger sand (the 100 mesh sand) than the relatively smaller sand (the 270 mesh sand). (The thicker lines in FIG. 11 show the data for the relatively smaller sand).

In addition, as shown in Table 5, the cumulative mass loss for the each of the uncoated testing samples, regardless of impingement angle, was significantly greater as compared to the cumulative mass loss for the coated test samples, regardless of the sand size. The coated test samples do not show any significant wear depth or mass loss prior to two hours of testing (i.e., about 400 pounds of sand passed), and for an angle of 60°, no significant mass loss occurs until four hours of testing (i.e., about 800 pounds of sand have passed). (The test samples were subjected to approximately 200 pounds of sand erodent for every four hours of testing.) As would generally be expected, the amount of mass loss decreases with the angle of impingement, for example, such that the mass loss at 60° is significantly less than for 0° at a given testing time or passage of sand. In addition, as shown in FIG. 11, the bare samples (Samples M, N, Q, R, U, V, and Z) all reach a wear depth of 0.014 inches in two hours or less of testing. In contrast, coated Sample W, which exhibited the quickest wear rate of the coated samples, only reached a wear depth of 0.014 inches after six hours of testing, a three-fold decrease in wear rate. The results of the testing suggest that the tested primer layer and coating layer may significantly increase the service life of a fluid handling component for an oilfield operation, such as a fluid end associated with a fracturing system.

Figure 12:
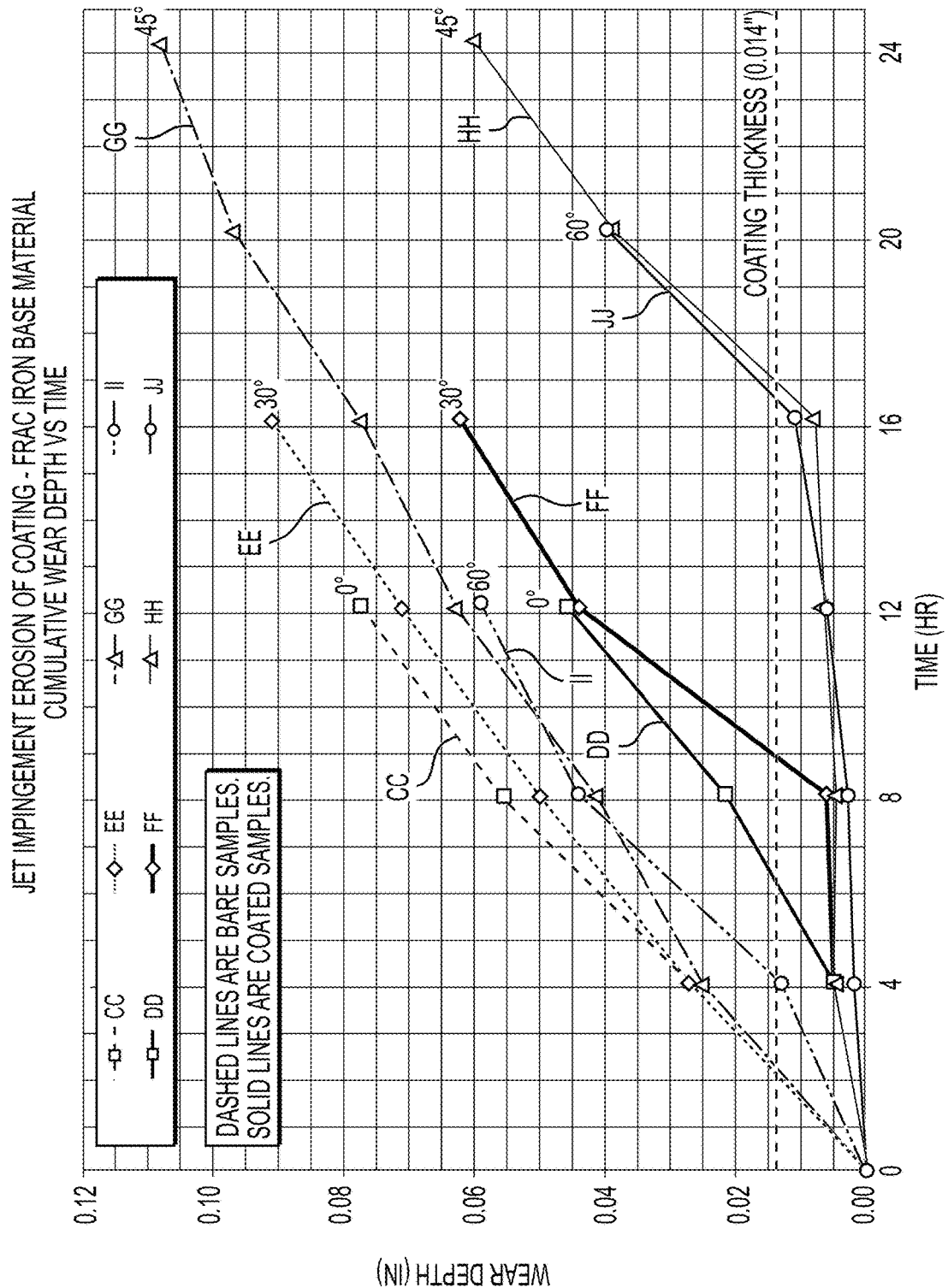
FIG. 12 is a graph of cumulative wear depth (inches (in)) versus time (hours (hr)) of exposure to the test fluid flow of test results from testing uncoated (bare) test samples and coated test samples simulating frac iron exposed to fluid flow at different included angles according to the disclosure.

For the AISI 4715 alloy steel often used in frac iron, eight tests were performed with the test samples, including four test samples (i.e., Samples DD, FF, HH, and JJ) coated with a 0.014-inch thick coating layer, including a coating composition consistent with at least some examples described herein, and four bare (uncoated) test samples. Samples CC and DD were tested at an impingement angle of 0°. Samples EE and FF were tested at an impingement angle of 30°. Samples GG and HH were tested at an impingement angle of 45°, and Samples II and JJ were tested at an impingement angle of 60°. The results of the tests are provided in Table 6 below, showing the cumulative mass loss (grams (g)) and cumulative wear depth (inches (in)) as a function of the time during which the Samples were subjected to the testing. FIG. 12 is a graph of cumulative wear depth (inches (in)) versus testing time (hours (hr)) during which the Samples were subjected to the testing for the test results shown in Table 6.

TABLE 6

| Sample | Coating/Bare | Jet Angle (degrees) | Duration (hours) | Mass Loss (g) | Wear Depth (in) |
|---|---|---|---|---|---|
| CC | Bare | 0 | 4 | 0.56 | 0.027 |
|   |   |   | 8 | 1.13 | 0.056 |
|   |   |   | 12 | 1.59 | 0.078 |
|   |   |   | 16 | — | — |
| DD | Coated (0.014 in) | 0 | 4 | 0.00 | 0.000 |
|   |   |   | 8 | 0.32 | 0.009 |
|   |   |   | 12 | 0.87 | 0.034 |
|   |   |   | 16 | — | — |
| EE | Bare | 30 | 4 | 0.52 | 0.027 |
|   |   |   | 8 | 0.91 | 0.050 |
|   |   |   | 12 | 1.38 | 0.071 |
|   |   |   | 16 | 1.78 | 0.091 |
| FF | Coated (0.014 in) | 30 | 4 | 0.00 | 0.000 |
|   |   |   | 8 | 0.01 | 0.000 |
|   |   |   | 12 | 0.37 | 0.032 |
|   |   |   | 16 | 0.74 | 0.050 |
| GG | Bare | 45 | 4 | 0.44 | 0.025 |
|   |   |   | 8 | 0.76 | 0.042 |
|   |   |   | 12 | 1.17 | 0.063 |
|   |   |   | 16 | 1.49 | 0.078 |
|   |   |   | 20 | 1.91 | 0.097 |
|   |   |   | 24 | 2.22 | 0.108 |
| HH | Coated (0.014 in) | 45 | 4 | 0.00 | 0.000 |
|   |   |   | 8 | 0.00 | 0.000 |
|   |   |   | 12 | 0.00 | 0.000 |
|   |   |   | 16 | 0.00 | 0.000 |
|   |   |   | 20 | 0.26 | 0.027 |
|   |   |   | 24 | 0.52 | 0.048 |
| II | Bare | 60 | 4 | 0.36 | 0.013 |
|   |   |   | 8 | 0.80 | 0.44 |
|   |   |   | 12 | 1.11 | 0.059 |
|   |   |   | 16 | — | — |
| JJ | Coated (0.014 in) | 60 | 4 | 0.00 | 0.000 |
|   |   |   | 8 | 0.00 | 0.000 |
|   |   |   | 12 | 0.00 | 0.000 |
|   |   |   | 16 | 0.06 | 0.000 |
|   |   |   | 20 | 0.44 | 0.028 |

As shown in FIG. 12, for the AISI 4715 alloy steel, which is consistent with material typically used in frac iron, the cumulative wear depth for the each of the uncoated (bare) testing samples, regardless of impingement angle, was significantly greater as compared to the cumulative wear depth for the coated test samples. For example, the worst performing coated sample, Sample DD having an impingement angle of 0 degrees, took three times longer to reach a wear depth of 0.014 inches as compared Sample CC having an impingement angle of 0 degrees. The best performing coated samples, Samples FF, HH, and JJ, took from four to eight times longer to reach a wear depth of 0.014 inches than the uncoated samples.

In addition, as shown in Table 6, the cumulative mass loss for the each of the uncoated testing samples, regardless of impingement angle, was significantly greater as compared to the cumulative mass loss for the coated test samples. As shown in FIG. 12, the coated test samples do not show any significant wear depth (or mass loss) prior to two hours of testing (i.e., about 400 pounds of sand passed), and for an angle of 60°, no significant mass loss occurs until after sixteen hours of testing (i.e., about 800 pounds of sand have passed). (The test samples were subjected to approximately 200 pounds of sand erodent for every four hours of testing.) In addition, as shown in FIG. 8, the bare samples (Samples CC, EE, GG, and II) all reach a wear depth of 0.014 inches in two to four hours of testing. In contrast, coated Sample DD, which exhibited the fastest wear rate of the coated samples, only reached a wear depth of 0.014 inches after six hours of testing. The results of the testing suggest the tested primer layer and coating layer may significantly increase the service life of a fluid handling component for an oilfield operation, such as a frac iron component associated with a fracturing system.

Figure 13:
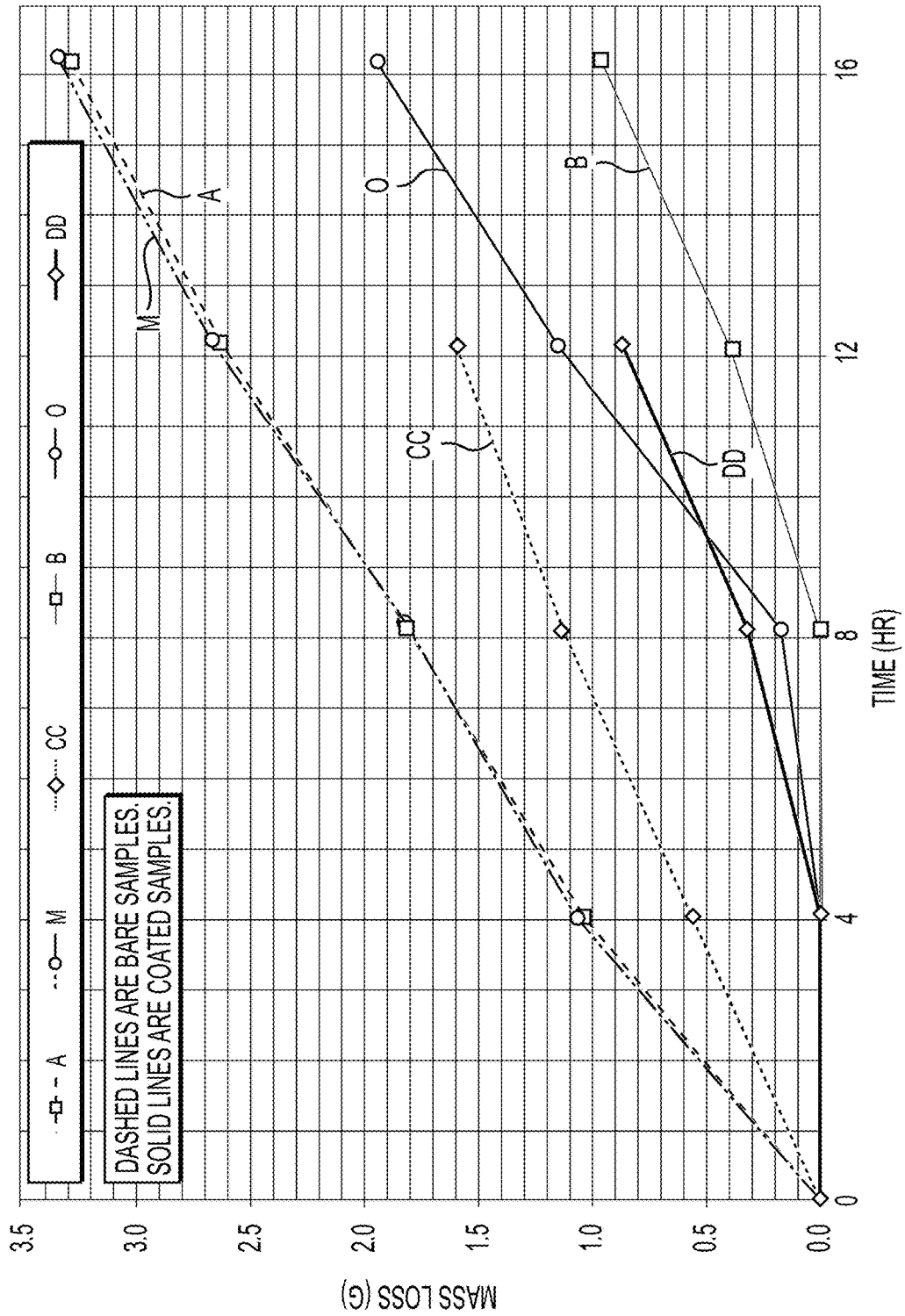
FIG. 13 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at zero degrees according to the disclosure.

FIG. 13 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at an impingement angle of zero degrees according to the disclosure. As shown in FIG. 13, while the uncoated (bare) samples (Samples A, M, and C corresponding respectively to the goat head, the fluid end, and the frac iron) begin losing mass almost immediately during testing, the coated samples (Samples B, O, and DD corresponding respectively to the goat head, the fluid end, and the frac iron) do not begin to lose mass until after four of testing, and Sample B does not begin to lose mass until after eight hours of testing.

Figure 14:
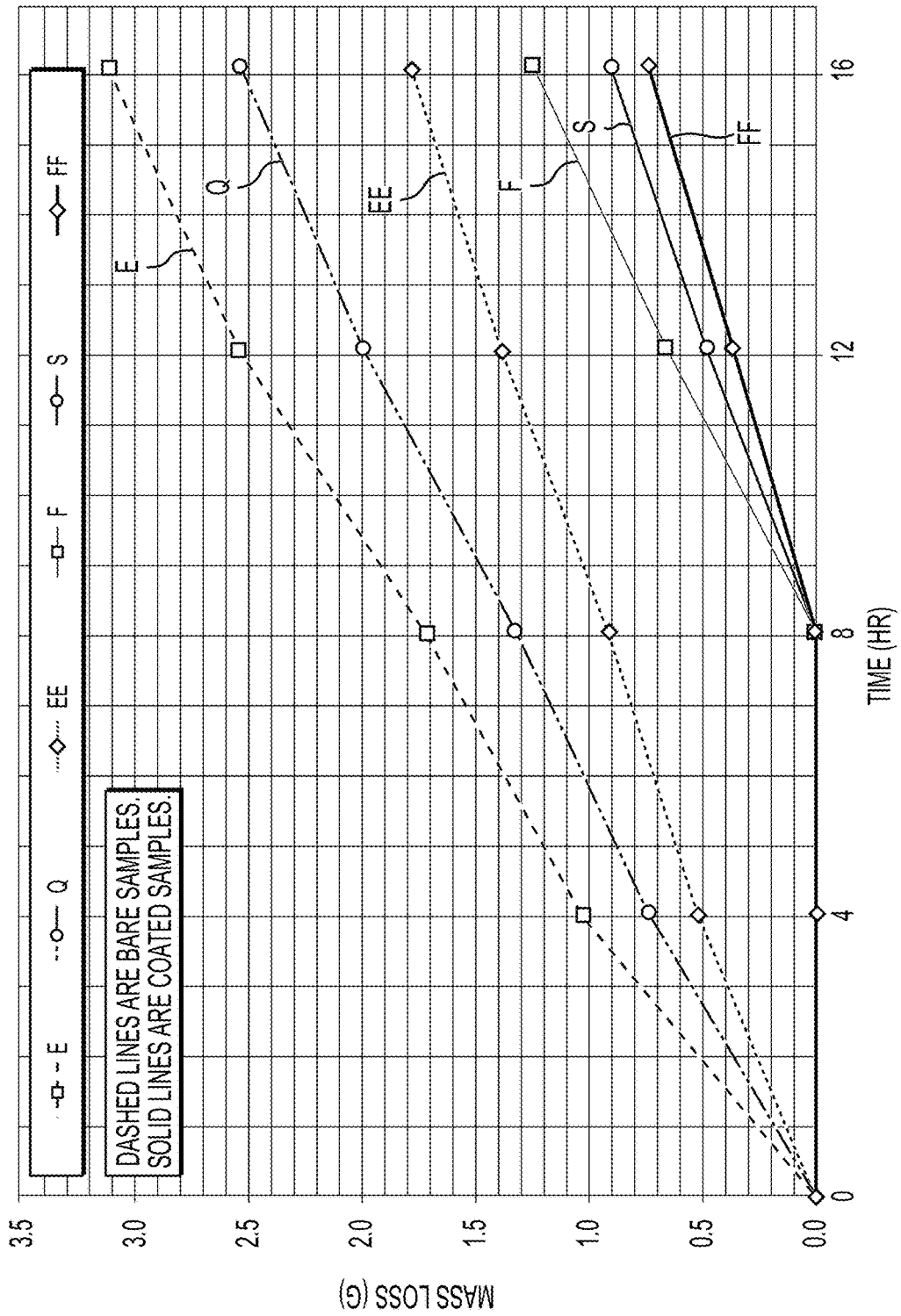
FIG. 14 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at 30 degrees according to the disclosure.

FIG. 14 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at an impingement angle of thirty degrees according to the disclosure. As shown in FIG. 14, the uncoated (bare) samples (Samples E, Q, and EE corresponding respectively to the goat head, the fluid end, and the frac iron) begin losing mass almost immediately during testing. In contrast, the coated samples (Samples F, S, and FF corresponding respectively to the goat head, the fluid end, and the frac iron) do not begin to lose mass until after eight of testing.

Figure 15:
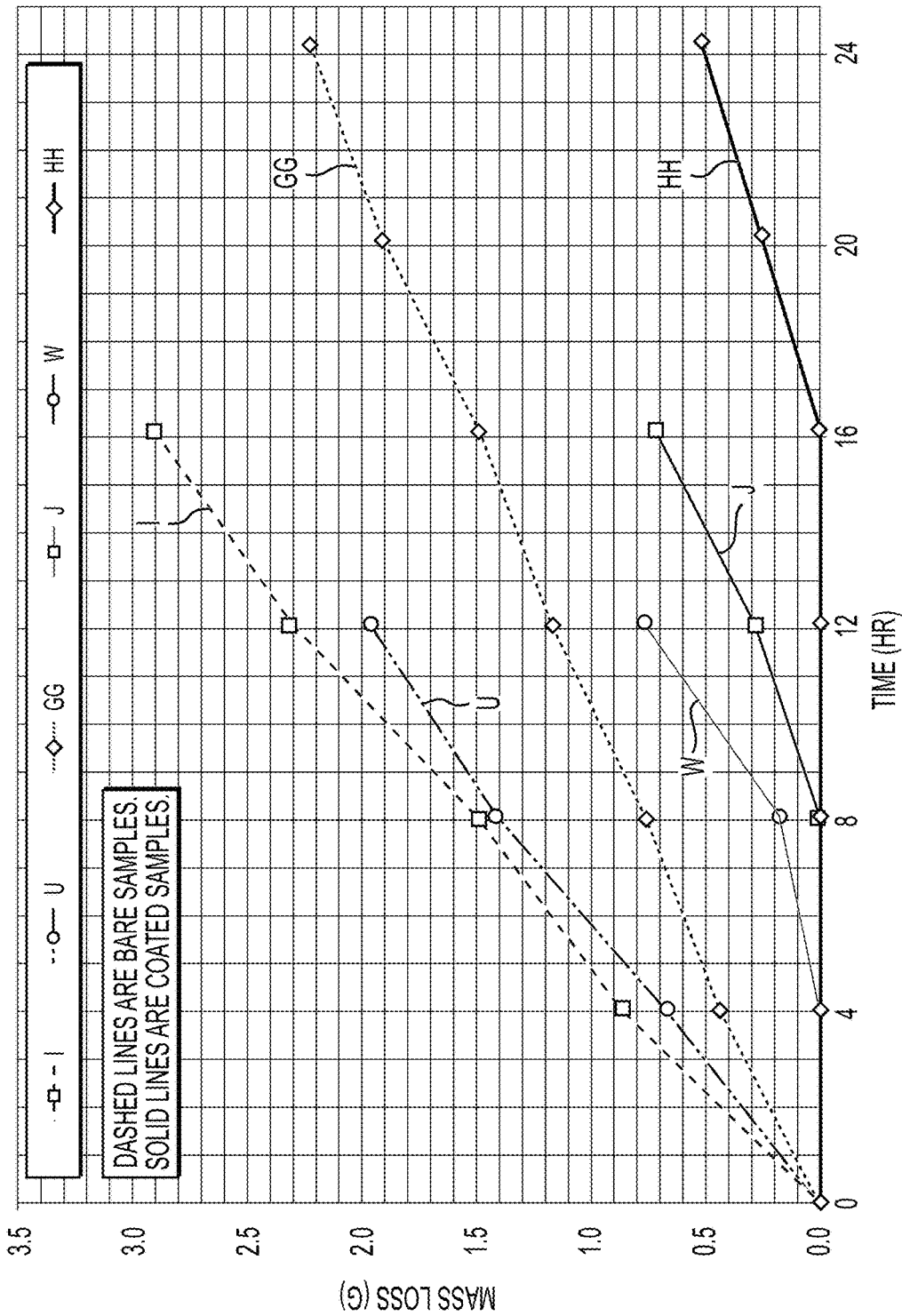
FIG. 15 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at 45 degrees according to the disclosure.

FIG. 15 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at an impingement angle of 45 degrees according to the disclosure. As shown in FIG. 15, the uncoated (bare) samples (Samples I, U, and GG corresponding respectively to the goat head, the fluid end, and the frac iron) begin losing mass almost immediately during testing. In contrast, the coated samples (Samples J, W, and HH corresponding respectively to the goat head, the fluid end, and the frac iron) do not begin to lose mass until after eight, four, and sixteen hours of testing, respectively.

Figure 16:
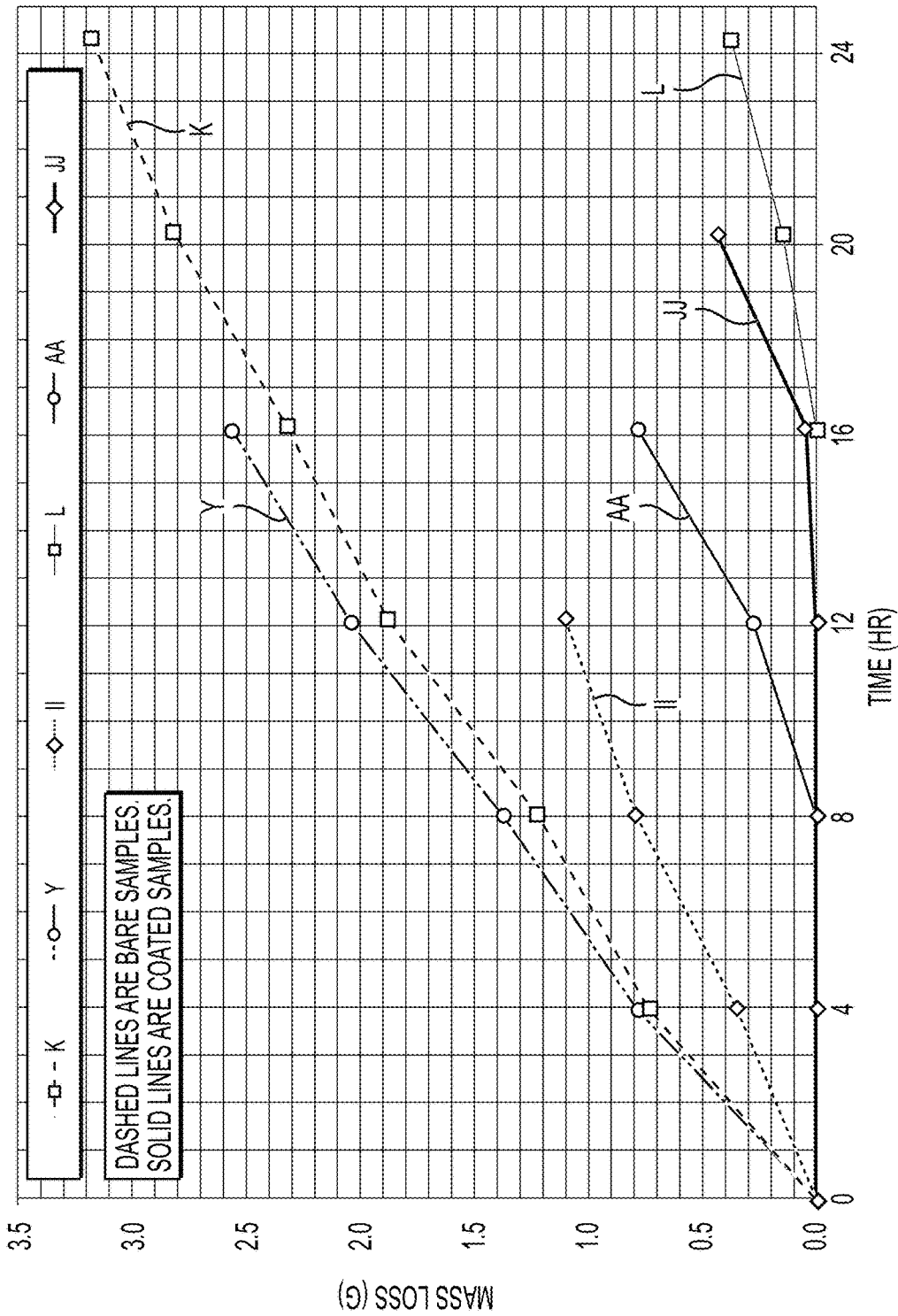
FIG. 16 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at 60 degrees according to the disclosure.

FIG. 16 is a graph of cumulative mass loss (grams (g)) versus time (hours (hr)) of exposure to the test fluid flow of test results from testing uncoated (bare) test samples and coated test samples simulating goat heads, fluid ends, and frac iron exposed to fluid flow at an impingement angle of sixty degrees according to the disclosure. As shown in FIG. 16, the uncoated (bare) samples (Samples K, Y, and II corresponding respectively to the goat head, the fluid end, and the frac iron) begin losing mass almost immediately during testing. In contrast, the coated samples (Samples L, AA, and JJ corresponding respectively to the goat head, the fluid end, and the frac iron) do not begin to lose mass until after sixteen, eight, and sixteen hours of testing, respectively.

Figure 17:
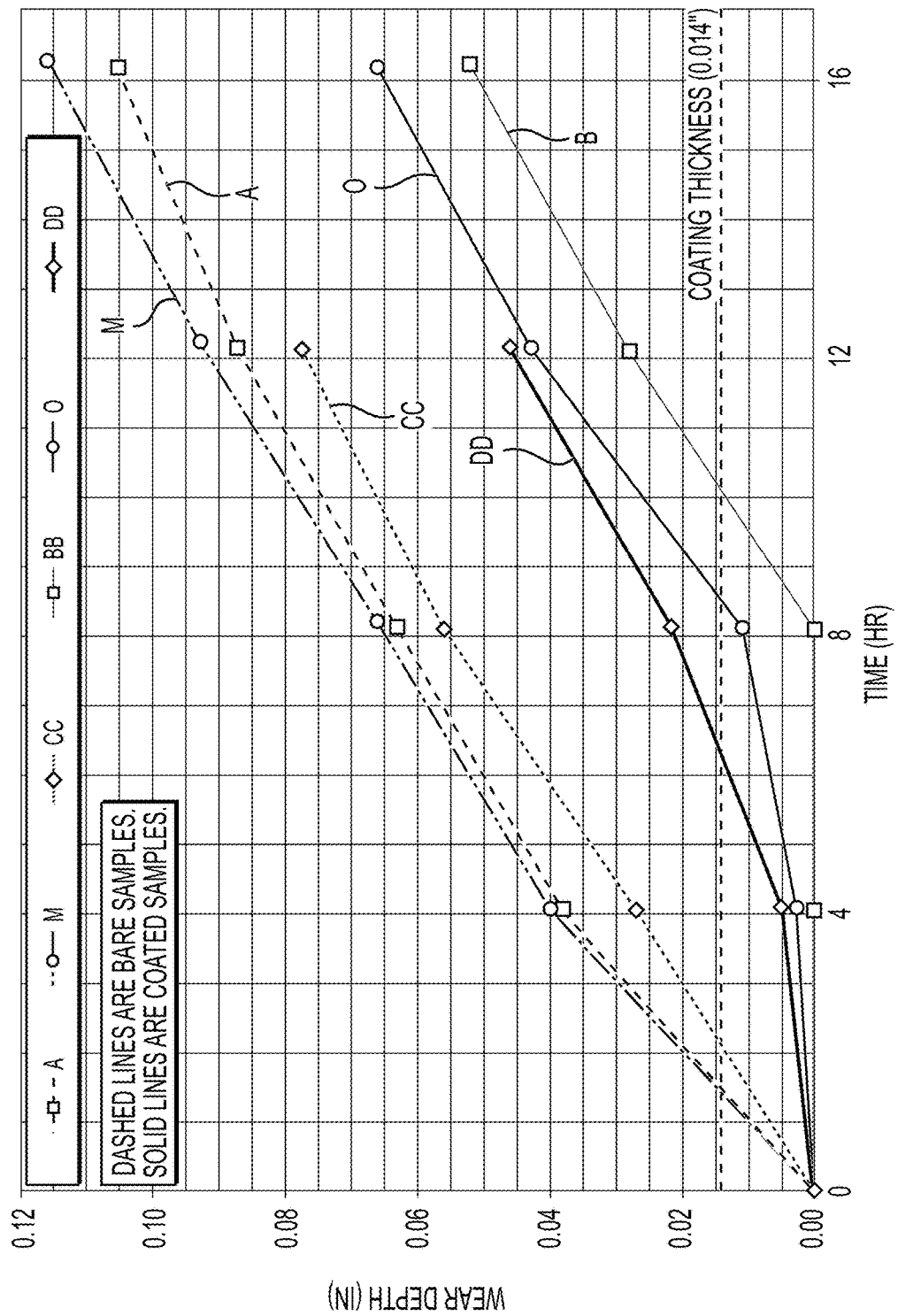
FIG. 17 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at zero degrees according to the disclosure.

FIG. 17 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at an impingement angle of zero degrees according to the disclosure. As shown in FIG. 17, the uncoated (bare) samples (Samples A, M, and CC corresponding respectively to the goat head, the fluid end, and the frac iron) reach a wear depth of 0.014 inches within two hours or less of the start of testing. In contrast, the coated samples (Samples BB, O, and DD corresponding respectively to the goat head, the fluid end, and the frac iron) do not reach a wear depth of 0.014 inches until after ten hours, eight and one-half hours, and six and one-half hours of testing, respectively.

Figure 18:
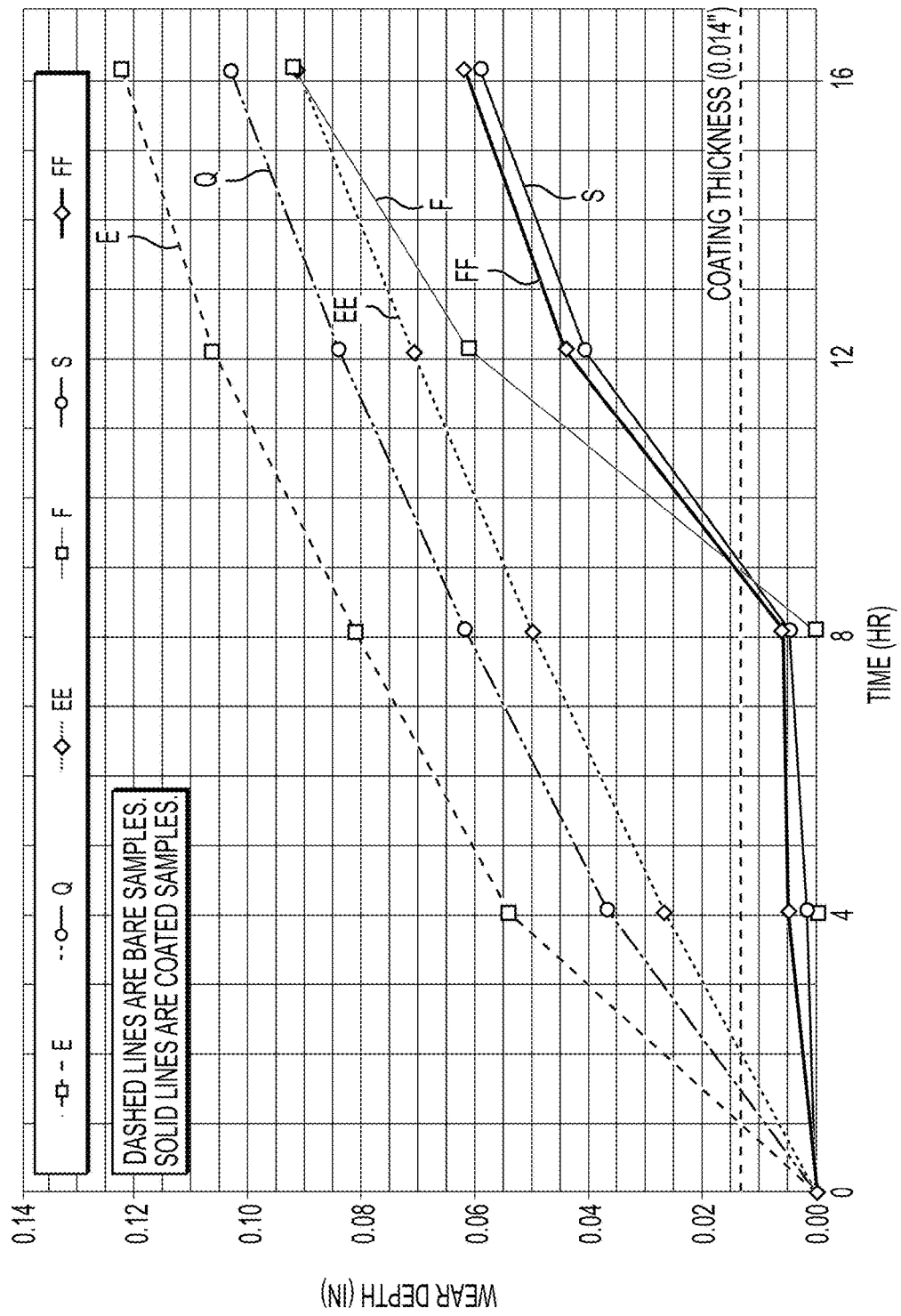
FIG. 18 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at 30 degrees according to the disclosure.

FIG. 18 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at an impingement angle of thirty degrees according to the disclosure. As shown in FIG. 18, the uncoated (bare) samples (Samples E, Q, and EE corresponding respectively to the goat head, the fluid end, and the frac iron) reach a wear depth of 0.014 inches within two hours or less of the start of testing. In contrast, the coated samples (Samples F, S, and FF corresponding respectively to the goat head, the fluid end, and the frac iron) do not reach a wear depth of 0.014 inches until after about nine hours of testing, which represents a more than four-fold reduction in wear rate.

Figure 19:
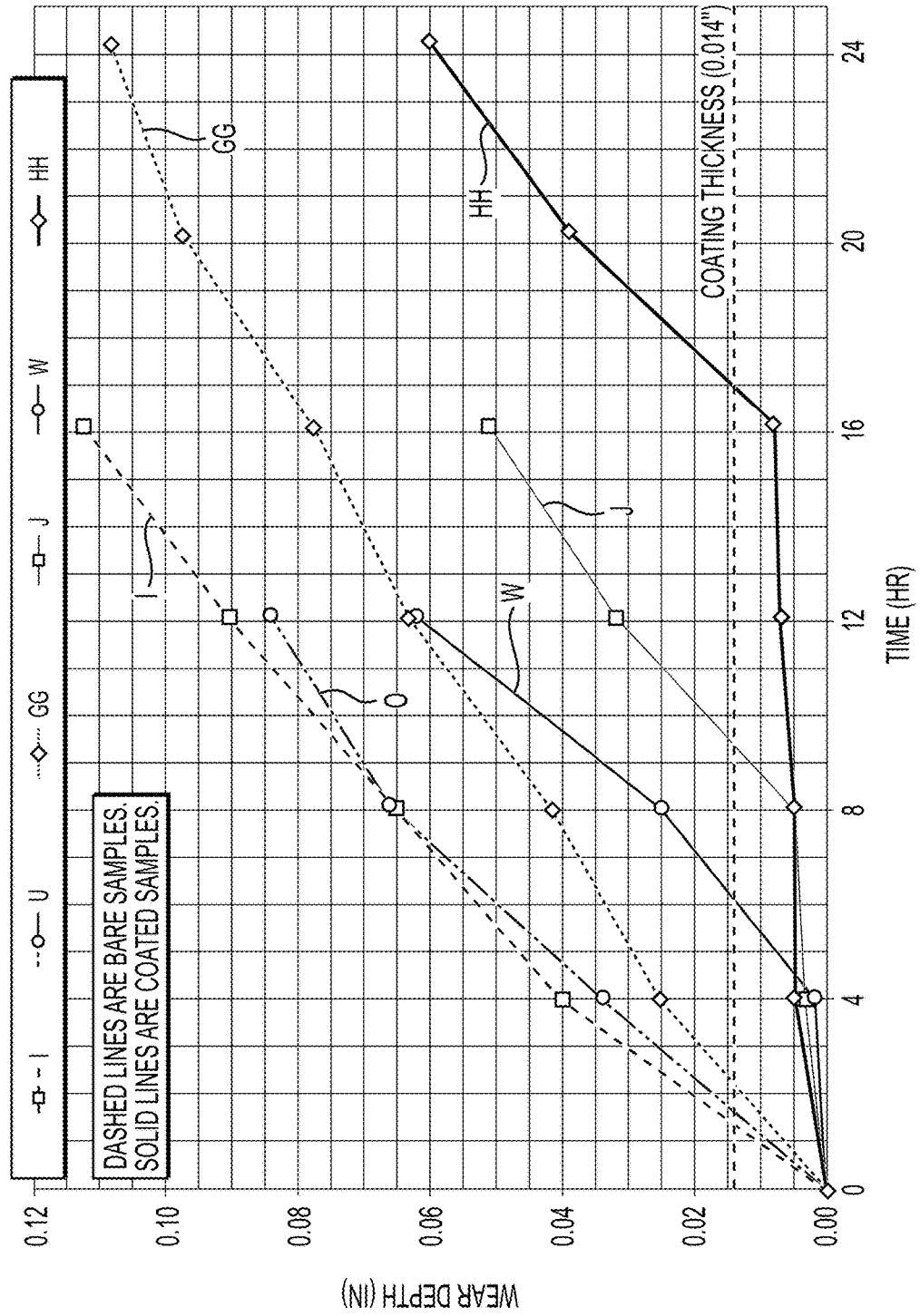
FIG. 19 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at 45 degrees according to the disclosure.

FIG. 19 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at an impingement angle of forty-five degrees according to the disclosure. As shown in FIG. 19, the uncoated (bare) samples (Samples I, U, and GG corresponding respectively to the goat head, the fluid end, and the frac iron) reach a wear depth of 0.014 inches within about two hours or less of the start of testing. In contrast, the coated samples (Samples J, W, and HH corresponding respectively to the goat head, the fluid end, and the frac iron) do not reach a wear depth of 0.014 inches until after about six hours, nine and one-half hours, and about seventeen hours of testing, respectively.

Figure 20:
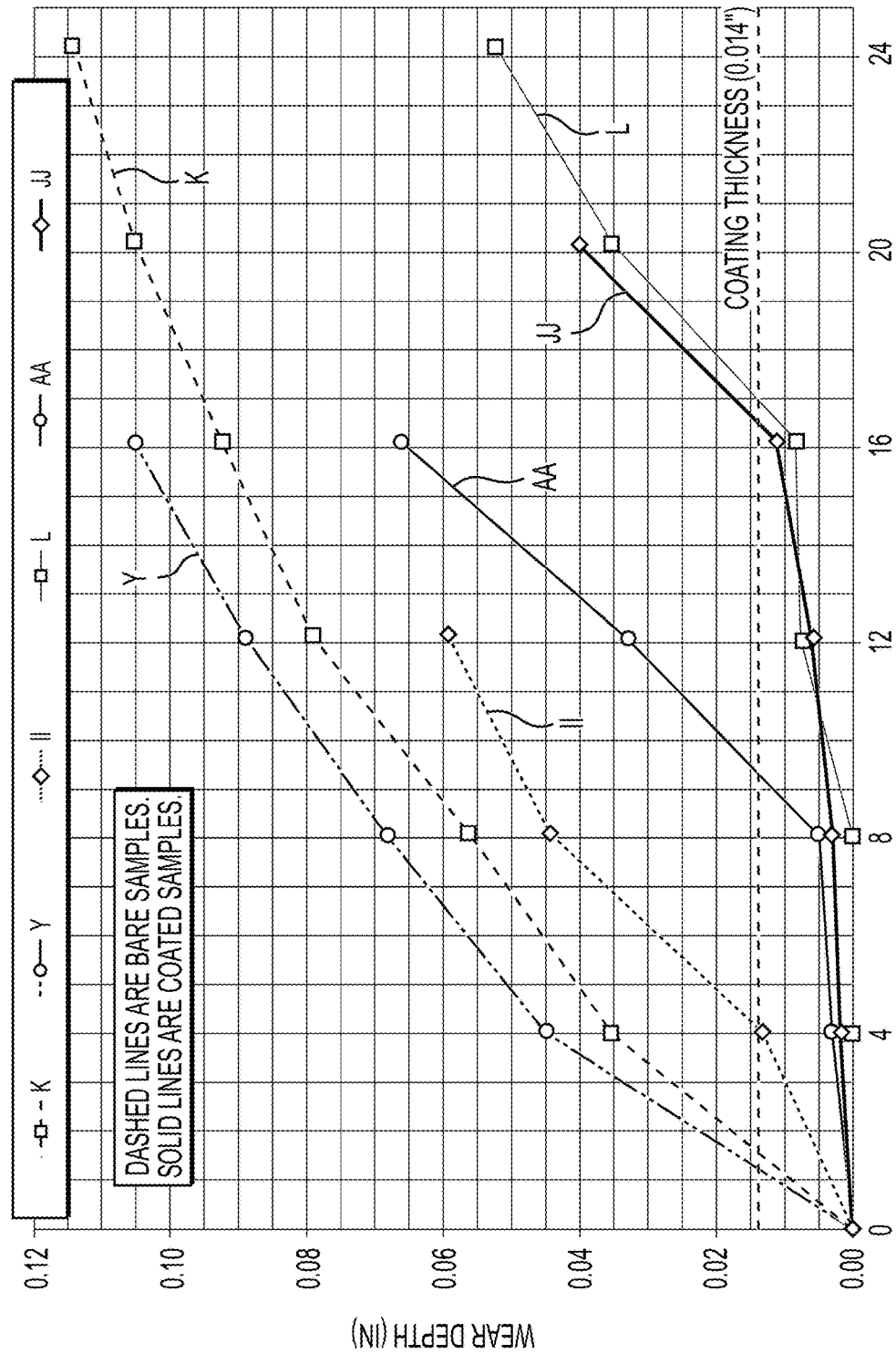
FIG. 20 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at 60 degrees according to the disclosure.

FIG. 20 is a graph of cumulative wear depth (inches (in)) versus time (hours (hr)) of exposure to the test fluid flow of test results from testing uncoated (bare) test samples and coated test samples simulating goat heads, fluid ends, and frac iron exposed to fluid flow at an impingement angle of sixty degrees according to the disclosure. As shown in FIG. 20, the uncoated (bare) samples (Samples K, Y, and II corresponding respectively to the goat head, the fluid end, and the frac iron) reach a wear depth of 0.014 inches within about one and one-half hours (Samples K and Y) or within about four hours (Sample II) of the start of testing. In contrast, the coated samples (Samples L, AA, and JJ corresponding respectively to the goat head, the fluid end, and the frac iron) do not reach a wear depth of 0.014 inches until after about seventeen hours, about nine and one-half hours, and about sixteen and one-half hours of testing, respectively.

Figure 21:
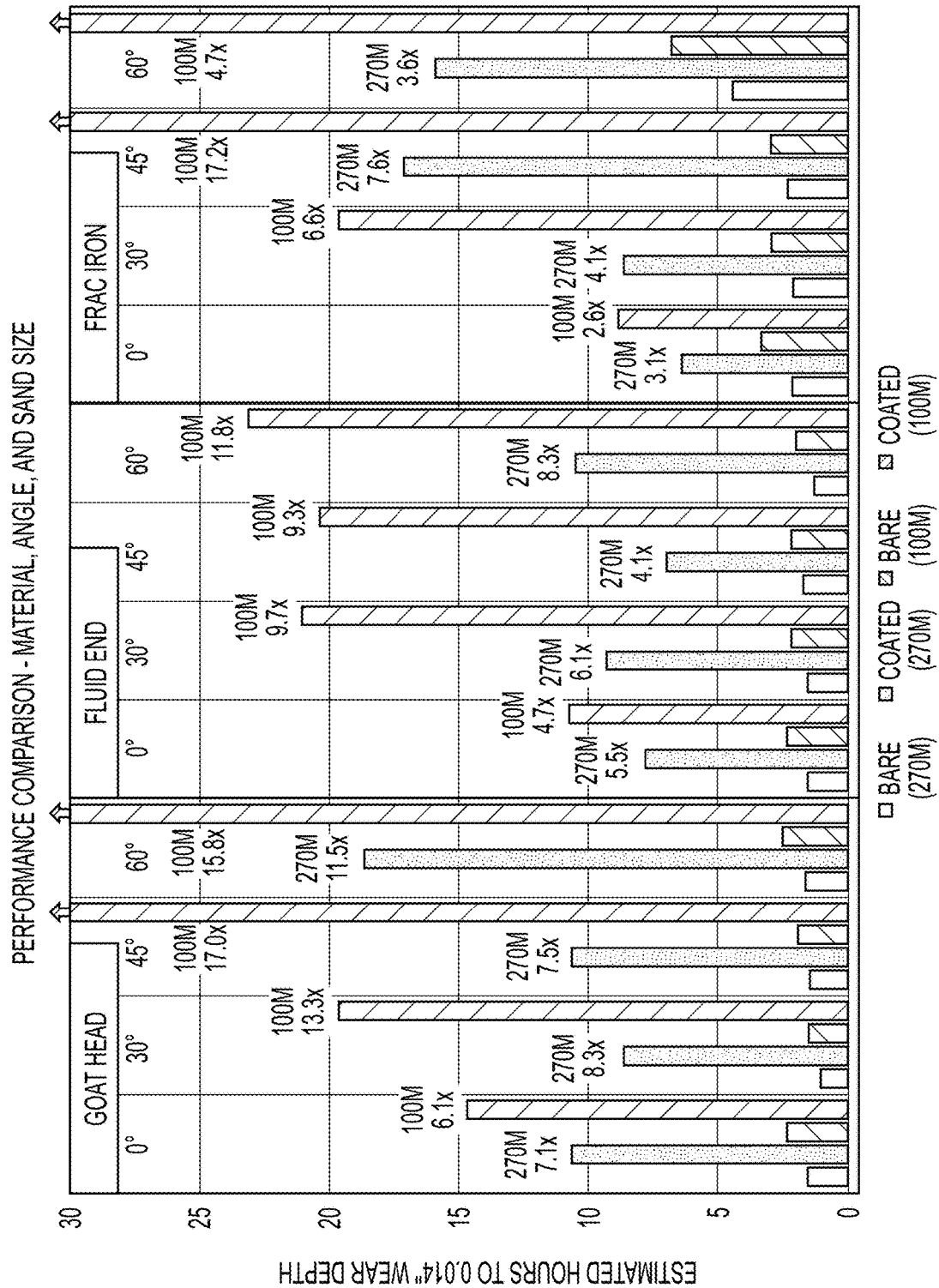
FIG. 21 is a bar graph showing estimated hours to 0.014 inches of wear depth for bare samples and coated samples simulating goat heads, fluid ends, and frac iron exposed to fluid flow at different included angles and for each of two sand sizes (270 mesh and larger 100 mesh) according to the disclosure.

FIG. 21 is a bar graph showing estimated hours to 0.014 inches of wear depth for uncoated (bare) samples and coated samples simulating goat heads, fluid ends, and frac iron exposed to fluid flow at different impingement angles and for each of two sand sizes (the relatively smaller 270 mesh sand and the relatively larger 100 mesh sand) according to the disclosure. In addition, FIG. 21 also shows example comparison factors. For example, the comparison factors may be indicative of a first amount of time during which the coating wears to a first depth divided by a second amount of time during which the fluid handling component without the coating wears to the first depth. For example, the comparison factor may be indicative of the level of wear improvement provided to each of the test samples by a 0.014-inch thick coating layer, including a coating composition consistent with at least some examples described herein relative to the uncoated test samples.

As shown in FIGS. 10-20, graphs of both wear depth and mass loss for the test samples show very similar slopes after the coating layer is penetrated and sand particles begin impacting the bare metal underneath. For the purpose of comparing the relative wear-resistance performance of the uncoated and coated test samples, the time to break through the coating layer was estimated in one of two ways. First, the estimated time for breakthrough was estimated using mass loss data. The slope of mass loss for an initial four-hour window was determined for the uncoated metal. For coated samples, measurable mass loss was negligible until breakthrough occurred. After this point in time, the next mass measurement at the four-hour interval was significantly larger, and the breakthrough was visually observed during an inspection. The uncoated test sample slope was used to extrapolate backward from the first point after breakthrough to find an x-intercept point on the graph, and the time corresponding to the x-intercept point was identified to represent the approximate time of breakthrough based on mass loss. Second, the estimated time for breakthrough was estimated using wear depth data. The wear depth for the test samples was measured. Before coating breakthrough, the wear depth was indicative of a loss in coating thickness (0.014 inches), which is shown in FIGS. 10-12 and 17-20. The slope on the graphs of the uncoated test samples was used to extrapolate backward from the measured wear depth on the graph after breakthrough of the coating layer to estimate the intercept point at which the wear depth equaled 0.014 inches (e.g., see the horizontal line on the graphs of FIGS. 10-12 and 17-20). The time corresponding to the intercept point was used as the estimated time of breakthrough of the coating layer based on wear depth. If the estimated breakthrough time calculated based on mass loss differed from the estimated breakthrough time calculated based on wear depth for a given test sample, the two values were averaged to determine a single breakthrough time for the test sample.

After the breakthrough times were calculated for each of the coated samples, a relative erosion-resistance between the coated and uncoated samples was calculated. A linear interpolation was performed along the uncoated test sample wear depth line to calculate a time to wear through 0.014 inches of the uncoated metal test samples. To determine a comparison factor for the coating, the breakthrough time of the coating layer was divided by the time to reach a wear depth of 0.014 inches for the corresponding uncoated test sample.

As shown in FIG. 21, the comparison factors range from about 3.0 to about 17.5, which is indicative of the level of wear-resistance improvement provided by the coating layers.

For example, as shown in FIG. 21, for the simulated goat head material, at an impingement angle of zero degrees and with the 270 mesh sand, compared to the uncoated test sample, it took the coated test sample 7.1 times longer to reach a wear depth of 0.014 inches (e.g., the comparison factor corresponding to 7.1). In another example, as shown in FIG. 21, for the simulated goat head material, at an impingement angle of forty-five degrees and with the 100 mesh sand, compared to the uncoated test sample, it took the coated test sample 17.0 times longer to reach a wear depth of 0.014 inches (e.g., the comparison factor corresponding to 17.0). For the simulated fluid end material, at an impingement angle of zero degrees and with the 270 mesh sand, compared to the uncoated test sample, it took the coated test sample 5.5 times longer to reach a wear depth of 0.014 inches (e.g., the comparison factor corresponding to 5.5). In another example, as shown in FIG. 21, for the simulated fluid end material, at an impingement angle of sixty degrees and with the 100 mesh sand, compared to the uncoated test sample, it took the coated test sample 11.8 times longer to reach a wear depth of 0.014 inches (e.g., the comparison factor corresponding to 11.8). For the simulated frac iron material, at an impingement angle of forty-five degrees and with the 100 mesh sand, compared to the uncoated test sample, it took the coated test sample 17.2 times longer to reach a wear depth of 0.014 inches (e.g., the comparison factor corresponding to 17.2). With the example comparison factors ranging from a minimum of about 3.0 to a maximum of about 17.5, the coating layer exhibits significant improvement in wear-resistance of the test samples.

Figure 22:
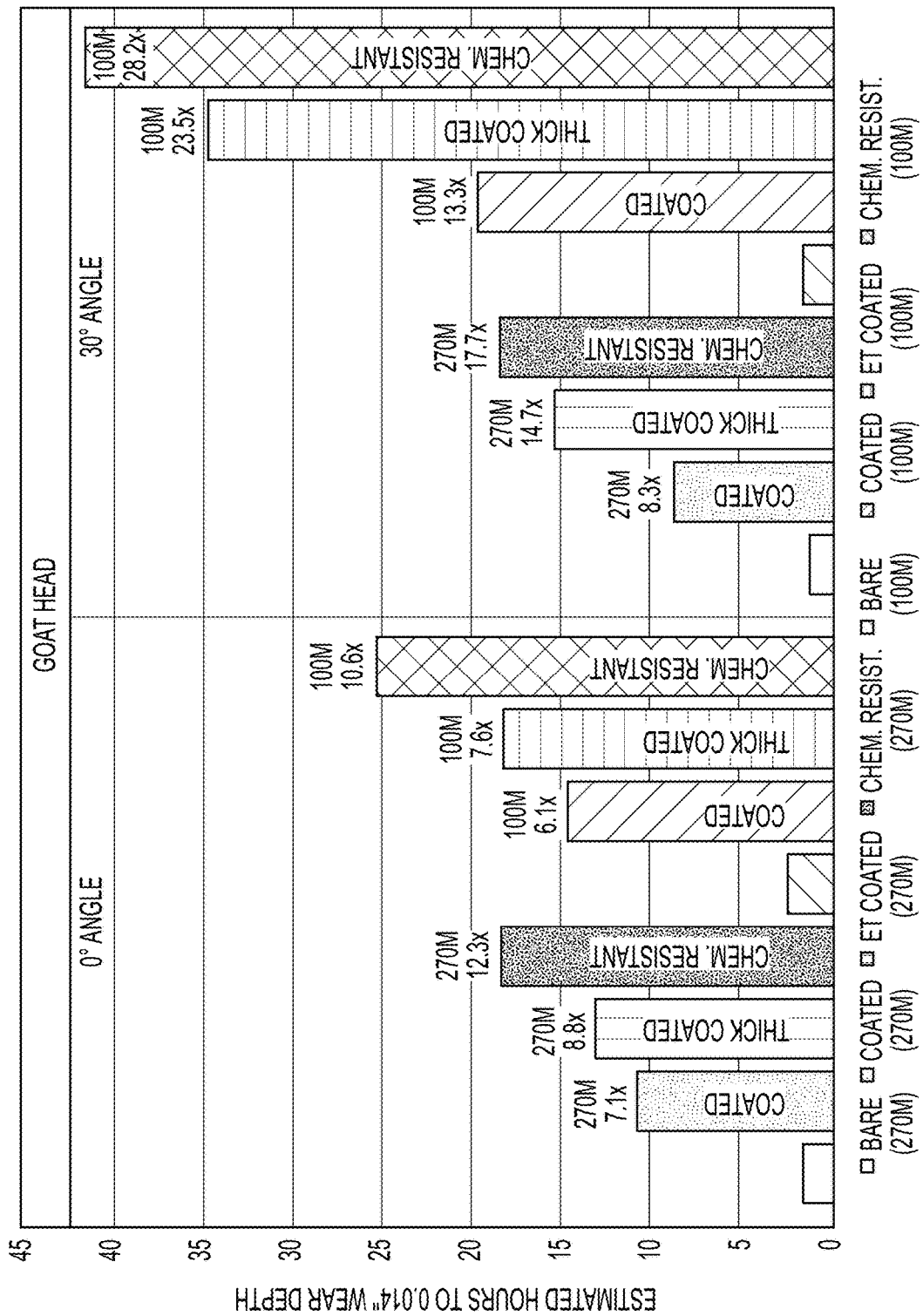
FIG. 22 is a bar graph showing estimated hours to 0.014 inches of wear depth for bare samples, samples having 0.014 inches of depth of coating ("coated"), samples having 0.028 inches of depth of coating ("thick-coated"), and samples coated with a chemical-resistant coating ("chem. resistant"), simulating goat heads exposed to fluid flow at zero and 30 degrees and for each of two sand sizes (270 mesh and larger 100 mesh) according to the disclosure.

FIG. 22 is a bar graph showing estimated hours to 0.014 inches of wear depth for a simulated goat head material for bare samples, samples having 0.014 inches of depth of coating ("coated"), samples having 0.028 inches of depth of coating ("thick-coated"), and samples coated with a chemical-resistant coating ("chem. resistant"), simulating goat heads exposed to fluid flow at zero and thirty degrees and for each of two sand sizes (270 mesh and larger 100 mesh) according to the disclosure. FIG. 22 also shows comparison factors for each of the test samples in a manner similar to FIG. 21. For example, at an impingement angle of zero degrees and with the 270 mesh sand, compared to the uncoated test sample, it took the coated test sample 7.1 times longer to reach a wear depth of 0.014 inches (e.g., the comparison factor corresponding to 7.1). At an impingement angle of zero degrees and with the 270 mesh sand, compared to the uncoated test sample, it took the thick-coated test sample 8.8 times longer to reach a wear depth of 0.014 inches (e.g., the comparison factor corresponding to 8.8). At an impingement angle of zero degrees and with the 270 mesh sand, compared to the uncoated test sample, it took the chemical-resistant coated test sample 12.3 times longer to reach a wear depth of 0.014 inches (e.g., the comparison factor corresponding to 12.3). At an impingement angle of zero degrees and with the 100 mesh sand, compared to the uncoated test sample, it took the chemical-resistant coated test sample 10.6 times longer to reach a wear depth of 0.014 inches (e.g., the comparison factor corresponding to 10.6). At an impingement angle of thirty degrees and with the 100 mesh sand, compared to the uncoated test sample, it took the chemical-resistant coated test sample 28.2 times longer to reach a wear depth of 0.014 inches (e.g., the comparison factor corresponding to 28.2). As shown in FIG. 22, the comparison factors range from a minimum of about 6.0 to a maximum of about 28.5, the coating layers exhibit significant improvements in wear-resistance of the test samples.

Oilfield components, such as fluid ends, are sometimes formed from carbon steel, and more recently, some manufacturers of fluid ends have switched to stainless steel, which may in some instances provide a longer service life as compared to fluid ends formed from carbon steel. Sometimes, a fluid end formed from stainless steel may have up to twice the service life as compared to a comparable fluid end formed from carbon steel. Stainless steel historically tends to be more expensive than carbon steel, sometimes as much as twice as expensive. Coating compositions, coating layers, and/or related methods consistent with at least some of those described herein may be capable of being used with oilfield components (e.g., fluid ends) formed from carbon steel to achieve service lives approaching or exceeding those for comparable oilfield components formed from stainless steel. Thus, at least some examples described herein may be able to reduce expenses associated with purchase, maintenance, production downtime, and/or replacement costs associated with oilfield components and oilfield operations.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This is a continuation of U.S. Non-Provisional application Ser. No. 17/225,743, filed Apr. 8, 2021, titled "METHODS FOR PROVIDING FLEXIBLE AND/OR ELASTIC COATINGS ON OILFIELD OPERATIONAL COMPONENTS," which claims priority to and the benefit of, under 35 U.S.C. § 119(e), U.S. Provisional Application No. 63/008,035, filed Apr. 10, 2020, titled "COATING COMPOSITIONS, COATED OILFIELD OPERATIONAL COMPONENTS, AND RELATED METHODS FOR OILFIELD OPERATIONS," U.S. Provisional Application No. 63/008,038, filed Apr. 10, 2020, titled "METHODS FOR PROTECTING OILFIELD OPERATIONAL COMPONENTS FROM DAMAGE FROM FLUID FLOW," U.S. Provisional Application No. 63/008,042, filed Apr. 10, 2020, titled "COATING AND METHODS FOR EXTENDING SERVICE LIFE OF OILFIELD OPERATIONAL COMPONENTS," U.S. Provisional Application No. 63/008,046, filed Apr. 10, 2020, titled "METHODS FOR PREPARING COATING COMPOSITIONS FOR PROTECTING OILFIELD OPERATIONAL COMPONENTS," U.S. Provisional Application No. 63/008,049, filed Apr. 10, 2020, titled "METHODS FOR PROVIDING FLEXIBLE AND/OR ELASTIC COATINGS ON OILFIELD OPERATIONAL COMPONENTS," U.S. Provisional Application No. 63/065,542, filed Aug. 14, 2020, titled "COATED OILFIELD OPERATIONAL COMPONENTS AND METHODS FOR PROTECTING AND EXTENDING THE SERVICE LIFE OF OILFIELD OPERATIONAL COMPONENTS," U.S. Provisional Application No. 63/065,545, filed Aug. 14, 2020, titled "METHODS FOR PROTECTING OILFIELD OPERATIONAL COMPONENTS FROM DAMAGE FROM FLUID FLOW," U.S. Provisional Application No. 63/065,565, filed Aug. 14, 2020, titled "COATING AND METHODS FOR EXTENDING SERVICE LIFE OF OILFIELD OPERATIONAL COMPONENTS," U.S. Provisional Application No. 63/065,577, filed Aug. 14, 2020, titled "METHODS FOR PREPARING COATING COMPOSITIONS FOR PROTECTING OILFIELD OPERATIONAL COMPONENTS," U.S. Provisional Application No. 63/065,591, filed Aug. 14, 2020, titled "METHODS FOR PROVIDING FLEXIBLE AND/OR ELASTIC COATINGS ON OILFIELD OPERATIONAL COMPONENTS," and U.S. Provisional Application No. 63/198,044, filed Sep. 25, 2020, titled "COATED OILFIELD OPERATIONAL COMPONENTS AND METHODS FOR PROTECTING AND EXTENDING THE SERVICE LIFE OF OILFIELD OPERATIONAL COMPONENTS," the disclosures of all of which are incorporated herein by reference in their entireties.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A method for providing a flexible coating on a surface of a component, the method comprising:
    applying a primer composition to a surface of a component configured to be exposed to a flow of fluid, the primer composition comprising epoxy;
    at least partially curing the primer composition to obtain a primer layer having a dry film thickness ranging from about 20 micrometers to about 100 micrometers;
    applying a first coating composition to the primer layer, the first coating composition comprising titanium dioxide and at least one of trifunctional silane, silanol, or filler;
    at least partially curing the first coating composition to obtain a first coating layer having a dry film thickness ranging from about 100 micrometers to about 250 micrometers;
    applying a second coating composition to the first coating layer, the second coating composition comprising at least one of trifunctional silane, silanol, or filler; and
    at least partially curing the second coating composition to obtain a second coating layer having a dry film thickness ranging from about 100 micrometers to about 250 micrometers, at least one of the primer layer, the first coating layer, or the second coating layer being configured to reduce damage to the component from the flow of the fluid, such that the component exhibits a comparison factor indicative of an increased resistance to wear greater than about 2.

2. The method of claim 1, wherein the comparison factor is indicative of a first amount of time during which a portion of the flexible coating wears to a first depth divided by a second amount of time during which a portion of the component without the flexible coating wears to a second depth equal to the first depth.

3. The method of claim 1, wherein the comparison factor ranges from about 5 to about 30.

4. The method of claim 1, wherein the comparison factor ranges from about 3 to about 12.

5. The method of claim 1, wherein the comparison factor ranges from about 2 to about 20.

6. The method of claim 1, wherein the first coating composition and the second coating composition are substantially the same.

7. The method of claim 1, further comprising:
applying at least one an additional coating composition to the second coating layer, the at least one additional coating composition comprising at least one of trifunctional silane, silanol, filler, or titanium dioxide; and
at least partially curing the at least one additional coating composition to obtain at least one additional coating layer, such that the component exhibits a comparison factor indicative of an increased resistance to wear ranging from about 2 to about 30, and
wherein the total dry film thickness of the first coating layer, the second coating layer, and the at least one additional coating layer ranges from about 500 micrometers to about 1000 micrometers.

8. The method of claim 7, wherein at least two of the first coating composition, the second coating composition, or the at least one additional coating composition are substantially the same.

9. The method of claim 7, wherein applying the at least one additional coating composition comprises applying a third coating composition, and wherein at least partially curing the at least one additional coating composition comprises at least partially curing the third coating composition to obtain a third coating layer having a dry film thickness ranging from about 100 micrometers to about 250 micrometers, such that the component exhibits a comparison factor indicative of an increased resistance to wear ranging from about 2 to about 30.

10. The method of claim 1, wherein the primer composition comprises at least one of an aliphatic amine, epichlorohydrin, bisphenol, silane adhesion promoter, trimethoxysilane, triethoxysilane, or 3-glycidoxypropyltrimethoxysilane.

11. The method of claim 1, wherein at least one of the first coating composition or the second coating composition comprises trifunctional silane comprising at least one of an acetoxy silane, a ketoximino silane, an enoxy silane, an amine silane, an alkoxy silane, or alkenyl silane, ethyl triacetoxysilane, vinyl triacetoxysilane, methyl tris (methyl-ethyl-ketoximino) silane, or vinyl tris (methyl-ethyl-ketoximino) silane.

12. The method of claim 1, wherein at least one of the first coating composition or the second coating composition comprises filler comprising at least one of fumed silica, glass fiber, mica, wollastonite, kaolin, or phylosilicates.

13. The method of claim 1, wherein at least one of the first coating composition or the second coating composition further comprises at least one of a catalyst or a solvent.

14. The method of claim 1, wherein the fluid comprises at least one of water, proppants, thickening agents, or mixtures thereof.

15. The method of claim 1, wherein:
at least one of the first coating composition or the second coating composition comprises trifunctional silane, silanol, and filler,
the trifunctional silane comprises from about 0.01 wt. % to about 20 wt. % of the at least one of the first coating composition or the second coating composition on the basis of non-solvent components,
the silanol comprises from about 40 wt. % to about 99 wt. % of the at least one of the first coating composition or the second coating composition on the basis of non-solvent components;
the filler comprises from about 0.01 wt. % to about 25 wt. % of the at least one of the first coating composition or the second coating composition on the basis of non-solvent components, and
one or more of the trifunctional silane, the silanol, or the filler are configured to cure and form ethyl T-resin units, each of the ethyl T-resin units forming two or more bonds with one or more of other ethyl T-resin units, silanol fluid, fillers, or pigments.

16. A method for providing an elastic coating on a surface of an operational component configured to be exposed to a flow of fluid, the method comprising:
applying a primer composition to an interior surface of an operational component configured to be exposed to a flow of a fluid when in operation, the primer composition comprising epoxy;
at least partially curing the primer composition to obtain a primer layer having a dry film thickness ranging from about 20 micrometers to about 100 micrometers;
applying a first coating composition to the primer layer, the first coating composition comprising titanium dioxide and at least one of trifunctional silane, silanol, or filler;
at least partially curing the first coating composition to obtain a first coating layer having a dry film thickness ranging from about 100 micrometers to about 250 micrometers;
applying at least one additional coating composition to the first coating layer, the at least one additional coating composition comprising at least one of trifunctional silane, silanol, filler, or titanium dioxide; and
at least partially curing the at least one additional coating composition to obtain at least additional coating layer, the total dry film thickness of the first coating layer and the at least one additional coating layer ranging from about 500 micrometers to about 1000 micrometers, and at least one of the primer layer, the first coating layer, or the at least one additional coating layer being configured to reduce damage to the operational component from the flow of the fluid, such that the operational component exhibits a comparison factor indicative of an increased resistance to wear greater than about 2.

17. The method of claim 16, wherein the first coating composition and the at least one additional coating composition are substantially the same.

18. The method of claim 16, wherein applying the at least one additional coating composition comprises applying a second coating composition, and wherein at least partially curing the at least one additional coating composition comprises at least partially curing the second coating composition to obtain a second coating layer having a dry film thickness ranging from about 100 micrometers to about 250 micrometers, such that the operational component exhibits a comparison factor indicative of an increased resistance to wear ranging from about 2 to about 30.

19. The method of claim 18, wherein applying the at least one additional coating composition further comprises applying a third coating composition, and wherein at least partially curing the at least one additional coating composition further comprises at least partially curing the third coating composition to obtain a third coating layer having a dry film thickness ranging from about 100 micrometers to about 250 micrometers, such that the operational component exhibits a comparison factor indicative of an increased resistance to wear ranging from about 2 to about 30.

20. The method of claim 19, wherein at least two of the first coating composition, the second coating composition, or the third coating composition are substantially the same.

21. The method of claim 16, wherein the primer composition comprises at least one of an aliphatic amine, epichlorohydrin, bisphenol, silane adhesion promoter, trimethoxysilane, triethoxysilane, or 3-glycidoxypropyltrimethoxysilane.

22. The method of claim 16, wherein at least one of the first coating composition or the at least one additional coating composition comprises trifunctional silane comprising at least one of an acetoxy silane, a ketoximino silane, an enoxy silane, an amine silane, an alkoxy silane, or alkenyl silane, ethyl triacetoxysilane, vinyl triacetoxysilane, methyl tris (methyl-ethylketoximino) silane, or vinyl tris (methyl-ethyl-ketoximino) silane.

23. The method of claim 16, wherein at least one of the first coating composition or the at least one additional coating composition comprises filler comprising at least one of fumed silica, glass fiber, mica, wollastonite, kaolin, or phylosilicates.

24. The method of claim 16, wherein at least one of the first coating composition or the at least one additional coating composition further comprises at least one of a catalyst or a solvent.

25. The method of claim 16, wherein the fluid comprises an oilfield fluid, and wherein the oilfield fluid comprises at least one of water, proppants, thickening agents, or mixtures thereof.

26. The method of claim 16, wherein:
at least one of the first coating composition or the at least one additional coating composition comprises trifunctional silane, silanol, filler, and titanium dioxide,
the trifunctional silane comprises from about 0.01 wt. % to about 20 wt. % of the at least one of the first coating composition or the at least one additional coating composition on the basis of non-solvent components,
the silanol comprises from about 40 wt. % to about 99 wt. % of the at least one of the first coating composition or the at least one additional coating composition on the basis of non-solvent components, and
the filler comprises from about 0.01 wt. % to about 25 wt. % of the at least one of the first coating composition or the at least one additional coating composition on the basis of non-solvent components.

27. The method of claim 16, wherein: one or more of the first coating composition or the at least one additional coating composition comprises trifunctional silane, silanol, filler, and titanium dioxide; and one or more of the trifunctional silane, the silanol, or the filler are configured to cure and form ethyl T-resin units, each of the ethyl T-resin units forming two or more bonds with one or more of other ethyl T-resin units, silanol, fillers, or pigments.

28. The method of claim 27, wherein the one or more of the first coating composition or the at least one additional coating composition comprises an amount of ethyl T-resin units ranging from about 1.5 wt. % to about 5.0 wt. % of the one or more of the first coating composition or the at least one additional coating composition on the basis of non-solvent components.

29. The method of claim 16, wherein one or more of the first coating composition or the at least one additional coating composition comprises trifunctional silane, silanol, filler, and blue pigment, the blue pigment in an amount ranging from about 1.0 wt. % to about 5.0 wt. % of the one or more of the first coating composition or the at least one additional coating composition on the basis of non-solvent components.

30. The method of claim 16, wherein one or more of the first coating composition or the at least one additional coating composition comprises trifunctional silane, silanol, filler, and titanium dioxide, the titanium dioxide in an amount ranging from about 0.50 wt. % to about 0.90 wt. % of the one or more of the first coating composition or the at least one additional coating composition on the basis of non-solvent components.

\* \* \* \* \*